United States Patent [19]

Kageyama et al.

[11] Patent Number: 5,664,074
[45] Date of Patent: Sep. 2, 1997

[54] PRINT CONTROL APPARATUS WITH ERROR RECOVERY FUNCTION AND ITS PRINT CONTROL METHOD

[75] Inventors: Seiji Kageyama; Tadahiko Asou, both of Yokohama; Chikahiko Nagata, Hadano, all of Japan

[73] Assignees: Hitachi, Ltd., Tokyo; Hitachi Microsoftware Systems, Inc., Yokohama, both of Japan

[21] Appl. No.: 936,659

[22] Filed: Aug. 28, 1992

Related U.S. Application Data

[63] Continuation-in-part of Ser. No. 605,280, Oct. 30, 1990.

[30] Foreign Application Priority Data

Aug. 30, 1991 [JP] Japan ............... 3-219606

[51] Int. Cl.[6] ............................................. G06K 15/00
[52] U.S. Cl. ............................................. 395/113; 395/115
[58] Field of Search ........................... 395/113, 114, 395/115, 101, 117; 364/519

[56] References Cited

U.S. PATENT DOCUMENTS

| | | | |
|---|---|---|---|
| 4,979,132 | 12/1990 | Sugiomoto | 395/113 |
| 4,992,958 | 2/1991 | Kageyama et al. | 364/519 |
| 5,018,081 | 5/1991 | Yamaguchi et al. | 395/113 |
| 5,131,077 | 7/1992 | Indei | 395/115 |
| 5,220,645 | 6/1993 | Nakajima | 395/113 |

*Primary Examiner*—Raymond J. Bayerl
*Assistant Examiner*—Steven P. Sax
*Attorney, Agent, or Firm*—Antonelli, Terry, Stout & Kraus, LLP.

[57] ABSTRACT

In a print control apparatus, even when an error such as a paper jam or the like which needs the reprint occurs in a printer, in order to perform an error recovery to generate the accurate reprint result, for preparation of the error recovery, a command buffer preserving section to preserve commands and drawing attribute parameters of each page head (or a command file preserving section or a page buffer preserving section to preserve a drawing dot image) and a preservation command buffer use a redrawing or reprint preparing section to perform the error recovery by using the preserved contents (or a preservation command file uses a redrawing or reprint preparing section or a preservation page buffer reprinting section) are provided in the print control apparatus. When the error which needs the reprint occurs, even for a command of the type such that the drawing attribute parameters are handed over between pages, the accurate reprint is executed by using the preserved contents.

21 Claims, 39 Drawing Sheets

| WRITING MODE | PRESENT TOTAL FILE WRITING AMOUNT |
|---|---|
| 1 | VALID COMMAND AMOUNT IN COMMAND WORK |
| 2 | VALID COMMAND AMOUNT IN COMMAND WORK<br>+ COMMAND BUFFER RESIDUAL PRINT COMMAND SIZE<br>+ DRAWING ATTRIBUTE WORK TABLE DATA AMOUNT |
| 3 | VALID COMMAND AMOUNT IN COMMAND WORK<br>+ COMMAND BUFFER RESIDUAL PRINT COMMAND SIZE |

1st PAGE

3910

2nd PAGE

3920

3rd PAGE

3930

3rd PAGE

3940

PRINT CONTROL APPARATUS WITH ERROR RECOVERY FUNCTION AND ITS PRINT CONTROL METHOD

CROSS-REFERENCES TO RELATED APPLICATION

This is a continuation-in-part of the patent application (Ser. No. 07/605,280) filed on Oct. 30, 1990.

BACKGROUND OF THE INVENTION

The invention relates to a print control apparatus and its print control method and, more particularly, to an error recovery system of a paper jam error or the like occurring in a shuttle printer or a page printer such as a laser printer, an LED (Light Emitting Diode) printer, an LCS (Liquid Crystal Shutter) printer, or the like.

Hitherto, an disclosed in JP-A-60-257262 (hereinafter, referred to as a first prior art), a printer has command buffers of the number as many as commands of the maximum number of sheets (hereinafter, simply referred to as a maximum holding number) which can be simultaneously print processed in the printer, in which each command buffer is used to hold a print command transmitted from a host computer until the completion of the paper discharge as a normal end of the printing process of the print command. When an error such as a paper jam or the like which needs the reprint occurs, causes of the error are eliminated and then the print command after the time point of the occurrence of the error is read out from the command buffer and the print is again executed and the error recovery is performed.

In JP-A-3-155974 (hereinafter, referred to as a second prior art), when an error such as a paper jam or the like occurs in a printer, the printer notifies the kind of error occurring in a host computer and the page in which such an error has occurred. The host computer which has received such a notification again transmits a print command after the page having the error to the printer for the error which needs the reprint, thereby enabling the printer to reprint the pages after the error occurring portion.

In JP-A-3-224778 (hereinafter, referred to as a third prior art), when an error such as paper jam or the like occurs in a printer, the printer notifies the kind of error which has occurred in a host computer, the host computer which has received such a notification again transmits the print command train after the head page constructing a document for the error which needs the reprint.

For such a retransmitted print command train, the printer executes the following processes with regard to the pages before the page having the error.

(1) When a command is determined to be a setting command of attribute parameters by a command interpretation, the command is executed, so that the attribute parameters are set into a table called an attribute parameter table. The attribute parameters include a paper size, a line pitch, a character pitch, a character kind, a character size, a line type, and the like.

(2) However, when the command is for drawing a character, a figure (straight line, arc, circle, polygon, or the like), an image, or the like, the command is not executed.

(3) The printing process about the page buffer is not activated as well.

With respect to the pages after the page in which the error has occurred, the printer executes both of the image drawing process and the printing process in the ordinary manner.

According to the above first prior art, for instance, in a laser printer having a printing speed of 20 sheets/min, the papers in a range from about ten to twenty sheets are substantially simultaneously concerned with the printing process, so that the maximum holding number lies within a range from about 10 to 20. A capacity of the print command per paper is equal to about two Mbytes in case of transmitting the image of one page of the A4 size as image data of a density of 400 dots/inch. Therefore, in this case, a memory of at least about 20 to 40 Mbytes is necessary as a special command buffer only for use of the error recovery mentioned above, so that there is a problem such that the costs remarkably increase. According to the first prior art, nothing is considered with respect to a point that the drawing attribute parameters are handed over between the pages. Therefore, even if the print command is preserved, in case of performing the error recovery using the preserved print command from the page having the error as a start page, the attribute parameters until the error occurring page are not handed over, so that there is also a problem such that the result of the reprint from the error occurring page cannot be printed as an original page by the attribute parameters before the occurrence of the error.

According to the second prior art, when the reprint is executed, the host computer again transmits the print command train after the error occurring page to the printer. However, even when the host computer again transmits the print command train after the error occurring page, the values of the attribute parameters which have been set and updated by the print command train before the error occurring page cannot be recognized by only the retransmitted print command train, so that there is a problem such that the inherent print by the attribute parameters before the error occurs cannot be performed.

According to the third prior art, with respect to the page before the error occurring page, the printer interprets the command as mentioned above and, in case of the setting command of the attribute parameters, the printer executes such a setting command and doesn't execute the command to draw an image and the printing process. Such a processing method is hereinafter called a command read skipping process. Such a command read skipping process is a complicated process. That is, when a plurality of printer escape sequence commands which are peculiar to the respective companies and a plurality of page describing languages such as Post Script (registered trade name of Adobe Systems Co., Ltd.) and Interpress (registered trade name of Xrox Co., Ltd.) are supported as various kinds of drawing commands, it is necessary to execute such a read skipping process with respect to each of various kinds of drawing commands, so that there is a problem such that a development program amount increases.

The above problems are large subjects in, particularly, a print control apparatus which executes the drawing process and the printing process as a multi task construction in a concurrent or parallel manner.

SUMMARY OF THE INVENTION

It is an object of the invention to solve the above problems and to realize a printing apparatus and a print control method which can generate an accurate print result without executing a vain reprint even when an error such as a paper jam or the like which needs the reprint occurs in a printer as mentioned above, by a small memory capacity and simple processes.

To accomplish the above object, a print control apparatus according to the invention includes;

① a communication control section which receives from a host computer a print command train having at least drawing commands which are arranged in accordance with the order of print pages and indicate drawing information such as characters, a figure, an image, etc. and an attribute parameter setting command which is arranged at an arbitrary position and indicates a format or the like to draw the image drawing information, as image data, regarding the drawing commands after the attribute parameter setting command;

② a command buffer section for storing the received print command train;

③ a drawing processing section for sequentially reading the print command train from the command buffer section and executing a drawing process in accordance with the print command train in the normal state and for again sequentially reading out the print command train after the page which is not yet discharged at a time point of the occurrence of an abnormality and executing a drawing process in accordance with the print command train in an abnormality occurring state;

④ a page buffer section for storing dot image data drawn by the drawing processing section;

⑤ a print processing section for instructing the printer control section to print the dot image data stored in the page buffer section;

⑥ a printer control section for reading out the dot image data from the page buffer section and executing a print control to a printer engine section in accordance with an instruction from the print processing section;

⑦ an abnormality processing section for monitoring an abnormality of the printer engine section and for activating a reprinting process in the drawing processing section in the case where an abnormality which needs the reprint occurs; and ⑧ an attribute parameter table section for at least storing the attribute parameters set in accordance with the print command train read out in the drawing processing section until all of the pages regarding the attribute parameters are discharged, wherein when the abnormality occurs, the drawing processing section executes the drawing process by the attribute parameters of the page to be again drawing processed which have been stored in the attribute parameter table section. The above method is hereinafter called a command buffer preserving method.

In the command buffer preserving method, for instance, when the drawing processing section detects a page changing condition in the drawing process, the drawing processing section activates the print processing section with respect to a page buffer whose drawing has been completed. The print processing section instructs the printer control section to execute the print with respect to the page buffer section. The printer engine section executes the print by the control of the printer control section. The abnormality monitoring section detects an error regarding the printer and newly activates the drawing processing section in case of an error such as a paper jam or the like which needs the reprint. The activated drawing processing section executes the interpretation and execution of the command of the page having the error in the command buffer section in accordance with the attribute parameters stored in the attribute parameter table section together with, for instance, the value of a read pointer indicative of the reading position from the command buffer. According to the command buffer preserving method, the accurate print result can be generated by preparing the command buffers of only a capacity (for instance, about 2 Mbytes in case of the A4 size and 100 dots/inch mentioned above) which is necessary when the capacity is largest for one paper.

According to the command buffer preserving method as described above, since the attribute parameters are stored and managed separately from the print command train, by merely preparing the command buffers by only the capacity which is necessary when the capacity is largest for one paper, the accurate print result can be generated at low costs because there is no need to prepare the special command buffers of the number only for the error recovery as many as the maximum holding number as in the first prior art. On the other hand, since the drawing attribute parameters at the start of the drawing of each page have been preserved in the command buffer discharge queue section, even for a command of the type such that the drawing attribute parameters are handed over between the pages, the print result doesn't differ from the inherent print upon error recovery. The reliability and use efficiency of the print control apparatus can be improved.

To accomplish the above object, a print control apparatus according to the invention includes:

① a communication control section which receives from a host computer a print command train indicative of drawing information such as characters, a figure, an image, or the like and attribute parameter setting information indicative of a format or the like to draw the drawing information as image data;

② a command buffer section for storing the received print command train;

③ a drawing processing section for sequentially reading out the print command train from the command buffer section and executing a drawing process every page in accordance with the print command train;

④ a page buffer section for storing dot image data drawn by the drawing processing section until at least the print of the relevant page is finished;

⑤ a print processing section for instructing the printer control section to print with respect to the dot image data stored in the page buffer section;

⑥ a printer control section for reading out the dot image data from the page buffer section and executing a print control to a printer engine section in accordance with an instruction from the print processing section;

⑦ an abnormality processing section for monitoring an abnormality of the printer engine section and for activating a reprinting process of the printer control section when an abnormality which needs the reprint occurs; and ⑧ a page buffer number preserving section for preserving a page buffer number indicative of a memory position of a discharge waiting page in the page buffer, wherein when the abnormality occurs, the printer control section reads out the dot image data of the page in which the abnormality has occurred from the page buffer number of the abnormality occurring page in the page buffer number preserving section and executes a print control of the printer engine section. This method is hereinafter called a page buffer preserving method.

According to the page buffer preserving method, for instance, when the drawing processing section detects a page changing condition in the drawing process, the drawing processing section activates the print processing section with respect to the page buffer in which the drawing has been completed and preserves the print page buffer number of the page as an object to be printed. The drawing processing section instructs the printer control section to print with respect to the relevant portion in the page buffer section. The printer engine section executes the print by the control of the printer control section. The abnormality monitoring section detects an error regarding the printer and, when it is determined that the detected error is such as a paper jam or the like which needs the reprint, the abnormality monitoring section executes a reprinting process of the page with the error in the page buffer by the page buffer number preserved. With respect to only the page in which the completion of the print has finally been confirmed, the image data is cleared to zero from the page buffer section.

According to the page buffer preserving method as mentioned above, since the buffer areas in which the paper discharge has been finished can be sequentially cleared, by preparing the page buffers of the number as many as only the capacity which is necessary when the capacity is largest for one paper whose print has been finished, there is no need to prepare the special command buffers of the number only for the error recovery as many as the maximum holding number as in the first prior art. Thus, the accurate print result can be generated at low costs. Since the drawing result itself has been preserved in the page buffer section, even for the command of the type such that the drawing attribute parameters are handed over between the pages, the print result doesn't differ from the inherent print upon error recovery. The reliability and use efficiency of the print control apparatus can be improved.

To accomplish the above object, in addition to the command buffer preserving method, the print control apparatus according to the invention further comprises:

① a secondary memory device for storing the print command train received from the command buffers as a plurality of command files in which the print commands of the respective pages have been described;

② a command file preservation control section for controlling the writing and reading operations of the command files; and ③ a command file management table section for managing the memory positions of the command files in the secondary memory device, wherein when the abnormality processing section activates the reprinting process of the drawing processing section, the command file preservation control section reads out the command files of the page which needs the reprint from the secondary memory device into the command buffers by recognizing the memory position by the command file management table section, and the drawing processing section executes the drawing process to reprint by the print command train newly stored in the command buffers. This method is hereinafter called a command file preserving method.

According to the command file preserving method, for instance, when the drawing processing section stores a predetermined amount of commands into the command work areas in the command buffer reading process, the contents are stored as command files into the secondary memory device. When the drawing section detects the page changing conditions, the drawing processing section stores the values of the present drawing attribute parameters as attribute files for the next page into the command file section and activates the printing process of the print processing section with respect to the page buffer in which the drawing has been completed. After the print processing section instructed the printer control section to print with regard to the page buffer section, the abnormality processing section detects the error about the printer and, when it is determined that the detected error is an error such as a paper jam or the like which needs the reprint, the drawing processing section is newly activated. The activated drawing processing section, for instance, copies the contents of the attribute parameter file for the first preservation page into the present attribute parameter table for the drawing process and stores the content of the preservation command file into the command buffer section and executes the interpretation and execution of the commands in the command buffer section in accordance with the attribute parameters in the present attribute parameter table.

According to the command file preserving method as mentioned above, the command buffer capacity can be further reduced that of the command buffer preserving method (the apparatus can operate even in case of at most one byte) and there is need to prepare the special command buffers of the number only for the error recovery as many as the maximum holding number as in the first prior art. On the other hand, since the drawing attribute parameters at the time of the start of the drawing of each page have been preserved in the attribute parameter file for each other, even for the command of the type such that the drawing attribute parameters are handed over between the pages, the print result doesn't differ from the inherent upon error recovery. The reliability and use efficiency of the print control apparatus can be improved. In addition, by also using a plurality of kinds of error recovering modes, the error recovery of the high performance and high reliability can be also provided to the user in accordance with the use situation of the secondary memory device. Further, since the registration data such as fonts/external characters, formats, and the like has been commonly preserved with respect to a plurality of pages, the file capacity for preservation can be reduced. Therefore, the print control apparatus of a high cost performance can be realized.

According to the above command file preserving method, in place of the command with respect to each page, dot image data as a result of the drawing into the page buffers is preserved and the error can be also recovered by using the dot image data. This method is hereinafter called a drawing image file preserving method.

According to the drawing file preserving method, in the page buffer preserving method, the dot image data as a result of the drawing of the page buffers is further preserved as files into the secondary memory device, so that the command buffer capacity can be further reduced.

In all of the above methods, it is possible to solve the problems such as increase in processing burden of the host computer, modification of the program, and the like in the second prior art. Further, since the command read skipping in the third prior art can be eliminated, an increase in program amount of the print control apparatus can be eliminated.

BRIEF DESCRIPTION OF THE DRAWINGS

The present invention will be more apparent from the following detailed description, when taken in conjunction with the accompanying drawings, in which.

DESCRIPTION OF THE PREFERRED EMBODIMENTS

Figure 1:
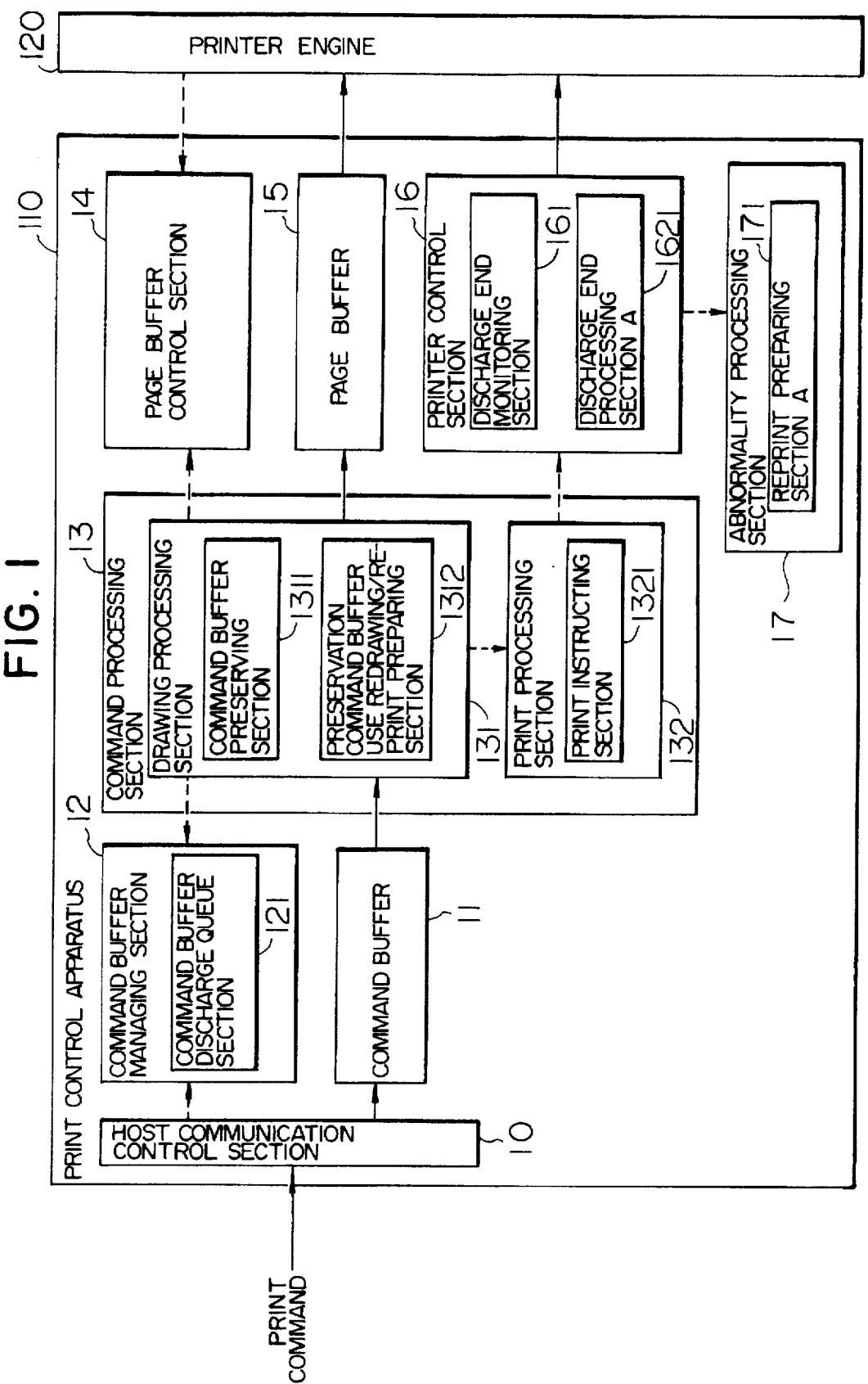
FIG. 1 is a constructional diagram showing the first embodiment of the invention.

The first embodiment of the invention will be first described.

First, a construction of a print control apparatus 10 according to the embodiment will be described with reference to a constructional diagram of FIG. 1. The print control apparatus 110 includes: a host communication control section 10; a command buffer 11; a command buffer managing section 12; a command processing section 13; a page buffer control section 14; a page buffer 15; a printer control section 16, and an abnormality processing section 17. The host communication control section 10 receives a print command from a host computer 100 (not shown) and stores into the command buffer 11. The print command is also simply referred to as a command hereinafter. In the diagram, a solid line indicates the flow of print data and a broken line indicates the flow of control information.

An example of a print command train which is transmitted from the host computer 100 to the print control apparatus 110 will now be described with reference to FIG. 38. The print command train includes a document head section 3800, a first page section 3810, a second page section 3820, a third page section 3830, . . . , and the like. Further, the document head section 3800 includes a reset command 3801 to initialize attribute parameters and the like. The first page section 3810, second page section 3820, and third page section 3830 includes: a train of setting commands of various kinds of attribute parameters and a train of various kinds of drawing commands to designate the drawing and print contents of the first to third pages; and page changing commands 3819, 3829, and 3839 to indicate delimiters of pages. In the example, as setting commands of the attribute parameters, there are shown a paper size setting command 3811, a print sheet number setting command 3812, a character kind setting command 3813, character size setting commands 3814 and 2824, a line width setting command 3816, a line type setting command 3817, and a painting pattern setting command 382A. However, arbitrary attribute parameters regarding the drawing and print can be also set by using the setting commands of the various kinds of parameters. In the example, character code trains 3815, 3825, and 3835 to instruct the drawing of a character train, arc drawing commands 3818 and 3838, and a polygon painting command 382B are shown as drawing commands. However, an arbitrary character, figure, or image can be drawn by using the above drawing commands. In the example, the page changing commands 3819, 3829, and 3839 showing clearly the page delimiters are arranged at the end of each page section. However, in place of the page changing commands, the page delimiters can be also tacitly shown. As examples of the tacit page delimiters, there are a paper size changing command, a print sheet number setting command, a printing direction (portrait=vertical length/landscape=lateral length) designating command, an automatic page change, and the like. The paper size changing command, the print sheet number setting command, and the printing direction designating command can be designated only once in one page. When any one of those commands exists in the page, it is possible to decide that the page must be changed to the next page. When the character drawing is instructed and lines to be printed exceed a line length per a paper, in which the automatic page change denotes a function the print control apparatus executes (a) the print of ones of the lines to be printed for the line length, (b) the page change, and (c) the print of the remaining lines on the next page.

Figure 38:
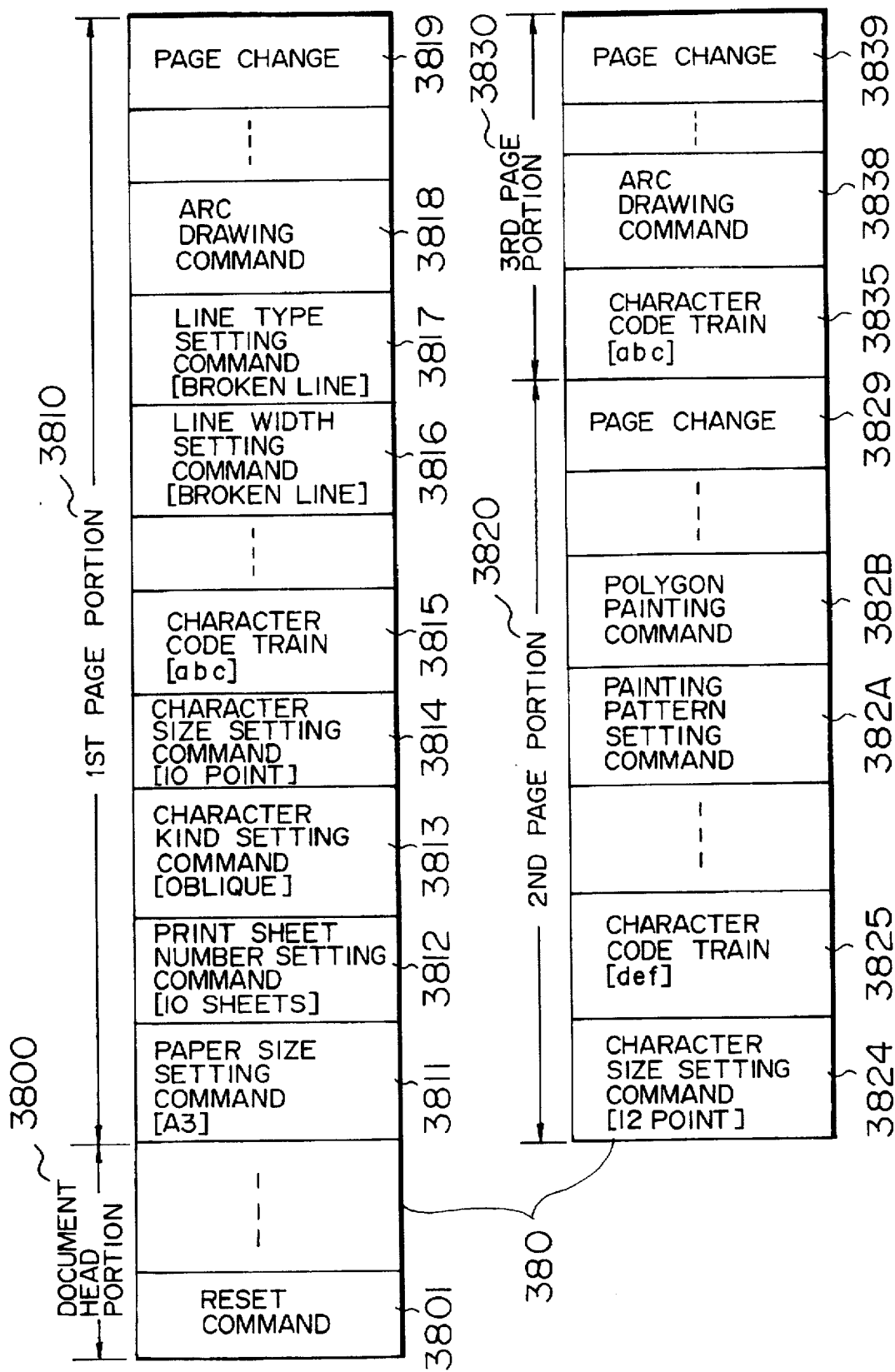
FIG. 38 is a diagram showing an example of a print command train which is used in the invention.
Figure 39A:
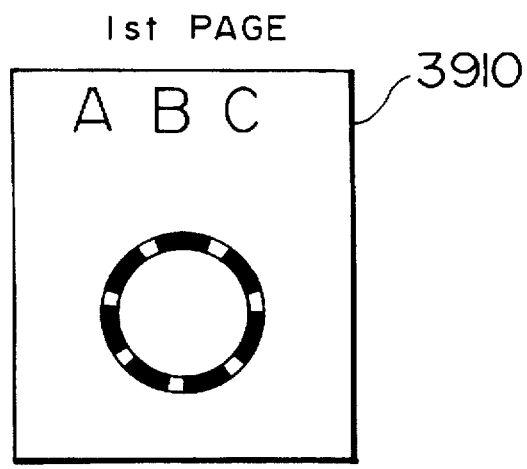
FIGS. 39A, 39B, 39C, and 39D are diagrams showing examples of the print results in the normal print and the print results in the reprint in the case where attribute parameters are not considered.
Figure 39B:
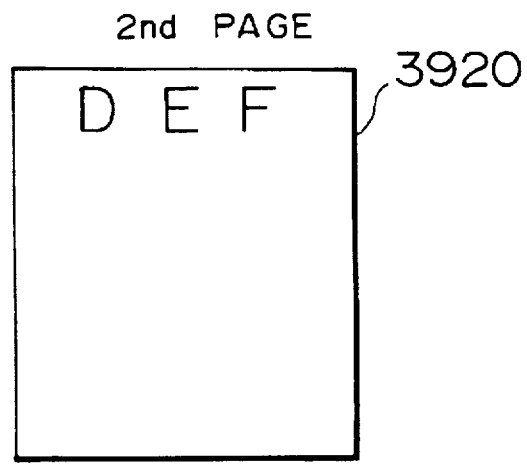
Figure 39C:
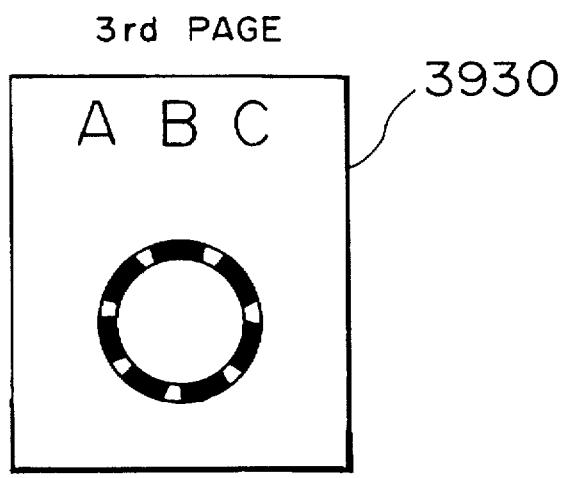
Figure 39D:
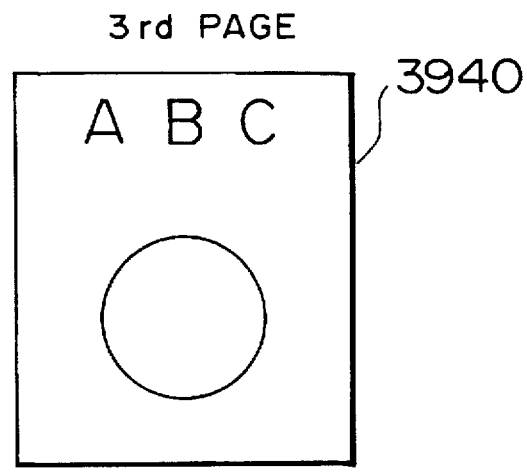

FIGS. 39A to 39D show the print results by the print control apparatus 110 and the printer engine 120 for the print command trains shown in FIG. 38. Reference numerals 3910, 3920, and 3930 denote print results in the case where the first, second, and third pages have normally been printed.

The attribute parameter setting command can be set at an arbitrary position independent of the page delimiter positions. The attribute parameter values which have once been set are maintained until they are subsequently reset or are initialized by the reset command. Therefore, after the first and second pages were normally printed by the printer engine, when a print error such as a paper jam or the like occurs during the print of the third page, if the reprint is executed in accordance with the command train for the third page and the following pages without considering the attribute parameters, the result of the reprint differs from the original print before the error occurs. As a result of the reprint with respect to the third page in such a case, it is printed as shown by reference numeral 3940 and differs from the inherent print result 3930.

The command buffer managing section 12 controls pointers for reading out and writing from/into the command buffer 11 and preserves the content of the command buffer 11. Therefore, a command buffer management table section, which will be explained hereinlater and shown in FIG. 2, in the command buffer managing section 12 (in FIG. 1, only a command buffer discharge queue section as an important portion is shown) is used.

The command processing section 13 includes a drawing processing section 131 and a print processing section 132. The drawing processing section 131 reads out a command from the command buffer 11 and interprets and executes the command. As a result of the execution of the command, a character, figure, image, or the like is drawn as dot image data in the page buffer 15. When the page changing condition is satisfied during the execution of the command, the drawing of the page is completed and the print processing section 132 is activated with regard to the page buffer for whose content the drawing has been completed. A section 1311 for preserving the content of the command buffer and a section 1312 for preparing redrawing/reprint by use of the preserved content of the command buffer are provided in the drawing processing section 131. The content of the command buffer is preserved in the preserving section 1311 on a page unit basis for preparation of the error recovery until the end of paper discharge is confirmed. The preparing section 1312 performs the reprint by using the commands preserved in the command buffer 11.

The print processing section 132 instructs the printer control section 16 to print by using the print instructing section 1321.

The page buffer 15 is constructed by a bit map memory and ordinarily has capacity for one or a plurality of pages as an object/objects of the drawing as mentioned above. The page buffer control section 14 controls the page buffer 15.

When the printer control section 16 receives a print instruction from the print processing section 132, the section 16 generates a series of print commands to a printer engine 120 through a printer engine interface. After that, a reading circuit in the printer control section 16 reads out the content of the page buffer in which print data has been drawn and supplies to the printer engine 120. The printer engine 120 executes a printing process and prints the content onto a paper. A discharge end monitoring section 161 and a discharge end processing section A 1621 are provided in the printer control section 16. The section 161 monitors the end of discharge of the printed paper from the printer engine 120 and activates the processing section A 1621 at the time point of the detection of the end of paper discharge.

The section 17 executes abnormality processing for various kinds of abnormalities detected by the respective sections of the print control apparatus 110. A reprint preparing section A 171 is provided for the abnormality processing section 17, thereby preparing for the reprint when the error which needs the reprint is detected.

Figure 2:
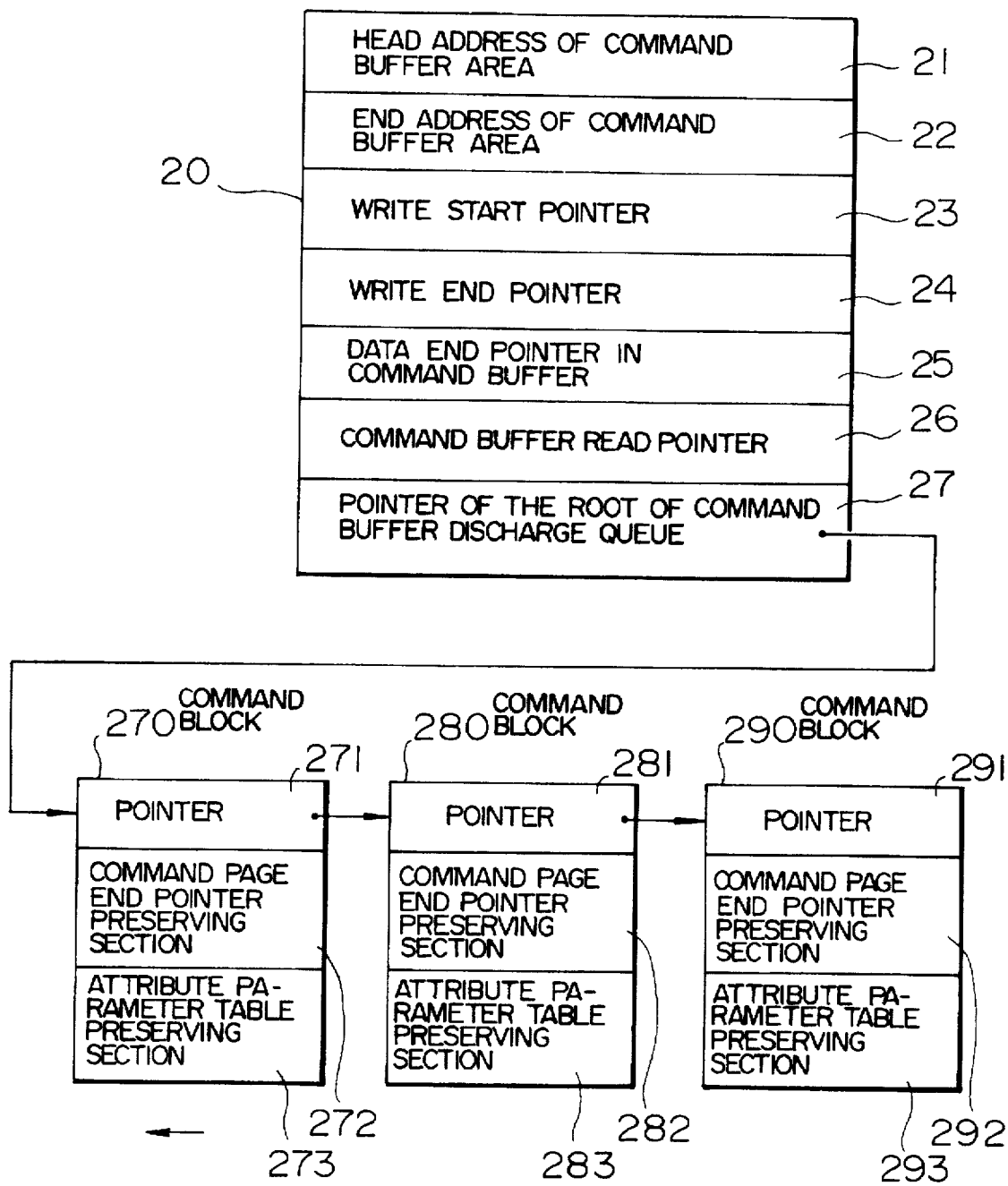
FIG. 2 is a diagram for explaining a command buffer management table section in the first embodiment of the invention.

The content of a command buffer management table section 20 will now be described with reference to FIG. 2. The management table section 20 includes: a head address 21 of a command buffer area; an end address 22 thereof; a write start pointer 23; a write end pointer 24; a data end pointer 25 in the command buffer; a command buffer read pointer 26; and a pointer 27 of the root of a command buffer discharge queue. Among them, the write start pointer 23, the write end pointer 24 and the data end pointer 25 are used to control the writing operation of the command to the command buffer 11 by the host communication control section 10 or the like. The command buffer read pointer 26, the data end pointer 25, the write start pointer 23 and the like are used to control the reading operation of the commands from the command buffer 11 by the drawing processing section 131.

The root pointer 27 is a pointer for the root of the command buffer discharge queue section 121. Constructing objects called command blocks are connected to the pointer 27 one after another. Each command block has a pointer (271, 281, 291) to the next command block as a first element, a section (272, 282, 292) for preserving a command page end pointer as a second element, and a section (273, 283, 293) for preserving an attribute parameter table as a third element. That is, the queue section 121 in FIG. 1 is constructed by the root pointer 27 and those command blocks.

An operating procedure in a normal state of the print control apparatus 110 will now be described with reference to FIG. 3.

First, the print control apparatus 110 receives print command trains from the host computer 100 by using a command receiving section in the host communication control section 10 and stores into the command buffer 11 (301). The print command trains are used to describe a document of one or more logical pages. Each logical page is defined by one or more print command trains.

The print command trains stored in the command buffer 11 are read out sequentially by the drawing processing section 131 in accordance with the receiving order (302). After that, each of them is interpreted and executed. Thus, a character, figure, image, or the like is drawn in the page buffer 15 (303). When the page changing condition is satisfied during the execution of the commands, the drawing processing section 131 activates the preserving process (304) and the print processing section 132 (305). The print processing section 132 generates a print instruction to the printer control section 16 (307). After that, the section 132 enters the discharge end waiting state (308). The printer control section 16 executes the above operating procedure for the printer engine 120 and the content which has been drawn in the page buffer is consequently supplied as a video signal to the printer engine 120 (309). The printer control section 16 activates a timer for monitoring the discharge end of a paper at the start time point of the output of the page buffer content (310). For instance, according to a construction shown in FIG. 5, which will be explained hereinafter, when the time-out of the discharge end monitoring timer is detected, the timer control section 5115 activates the discharge end process 1 in the printer control section 16 (3121). In the discharge end process 1, the foregoing processes are executed. As one of them, the print processing section 132 in the discharge end waiting state is canceled from such a state (313). Thereafter, the print end page number is updated (314).

An operating procedure in an abnormal state of the print control apparatus 110 will now be described with reference to FIG. 4. It is now assumed that the same processes in steps 301 to 309 as those in FIG. 3 have been executed. In this instance, it is assumed that a paper jam error has occurred in the printer engine 120 (321). The printer engine 120 notifies the occurrence of the error to the printer control section 16 in accordance with the printer engine interface (322). The control section 16 notifies the kind of error to the abnormality processing section 17 to activate it (323). As error kinds, there are "paper jam", "door open", and the like as errors which need the reprint, and "no paper", "no toner", "defective printer mechanism", and the like as errors which don't need the reprint.

The abnormality processing section 17 executes the following processes.

(1) The processes of the print processing section 132 and drawing processing section 131 are interrupted (324, 325).

(2) The occurrence of error is notified to the host computer 100 through the host communication control section 10 (326, 327).

(3) A check is made to see if the error detected is an error such as a paper jam which needs the reprint or not. If YES, the following processes are executed.

(3-1) All of the processes of the print processing section 132 and drawing processing section 131 are forcedly finished (all of the present processes are canceled. When they are restarted, those processing sections are set into a state in which the retry of the processes are necessary from the beginning) (3281).

(3-2) As a reprint preparation 1, a check is made to see if the command indicating that the paper discharge is incompleted has been preserved in the command buffer or not. If YES, a reprint error flag is set to ON (3291).

(3-3) The process of the drawing processing section 131 is activated (3301).

(4) The print control apparatus 110 executes an operating procedure in the normal state hereinafter. That is, the drawing processing section 131 executes the drawing (331) and the activation (332) of the print processing section. The print processing section 132 executes the process such as a print instruction (334) or the like.

The print control apparatus can be also realized as an expanded function to the invention (U.S. Pat. No. 4,992,958 which issued from to U.S. patent application Ser. No. 07/373,262 or U.S. patent application Ser. No. 08/003,943, now U.S. Pat. No. 5,265,209, which is a continuation of U.S. patent application Ser. No. 07/605,280, now abandoned) which has already been filed by the applicant of the invention shown in FIG. 5. Namely, the processes of the drawing processing section 131 and print processing section 132 are set to a multi task construction, thereby also enabling those processes to be executed in a concurrent or parallel manner. In such a case, the component elements in FIG. 1 are made to correspond to component elements in FIG. 5 in the following manner and are realized as one function.

(1) Host computer 100→host computer 510

(2) Host communication control section 10→host communication control section 5118

(3) Command buffer 11→command buffer 511

(4) Command buffer managing section 12→e.g., host communication control section 5118

(5) Drawing processing 131→drawing task processing section 5131.

(6) Print processing section 132→print task processing section 5132

(7) Page buffer control section 14→page buffer control section 5116.

(8) Page buffer 15→page buffer 514

(9) Printer control section 16→printer control section 5117.

(10) Abnormality processing section 17→realized as one of the functions of the printer control section 5117, the print task processing section 5132, the drawing task processing section 5131, etc.

(11) Printer engine 120→printer engine 516.

Figure 5:
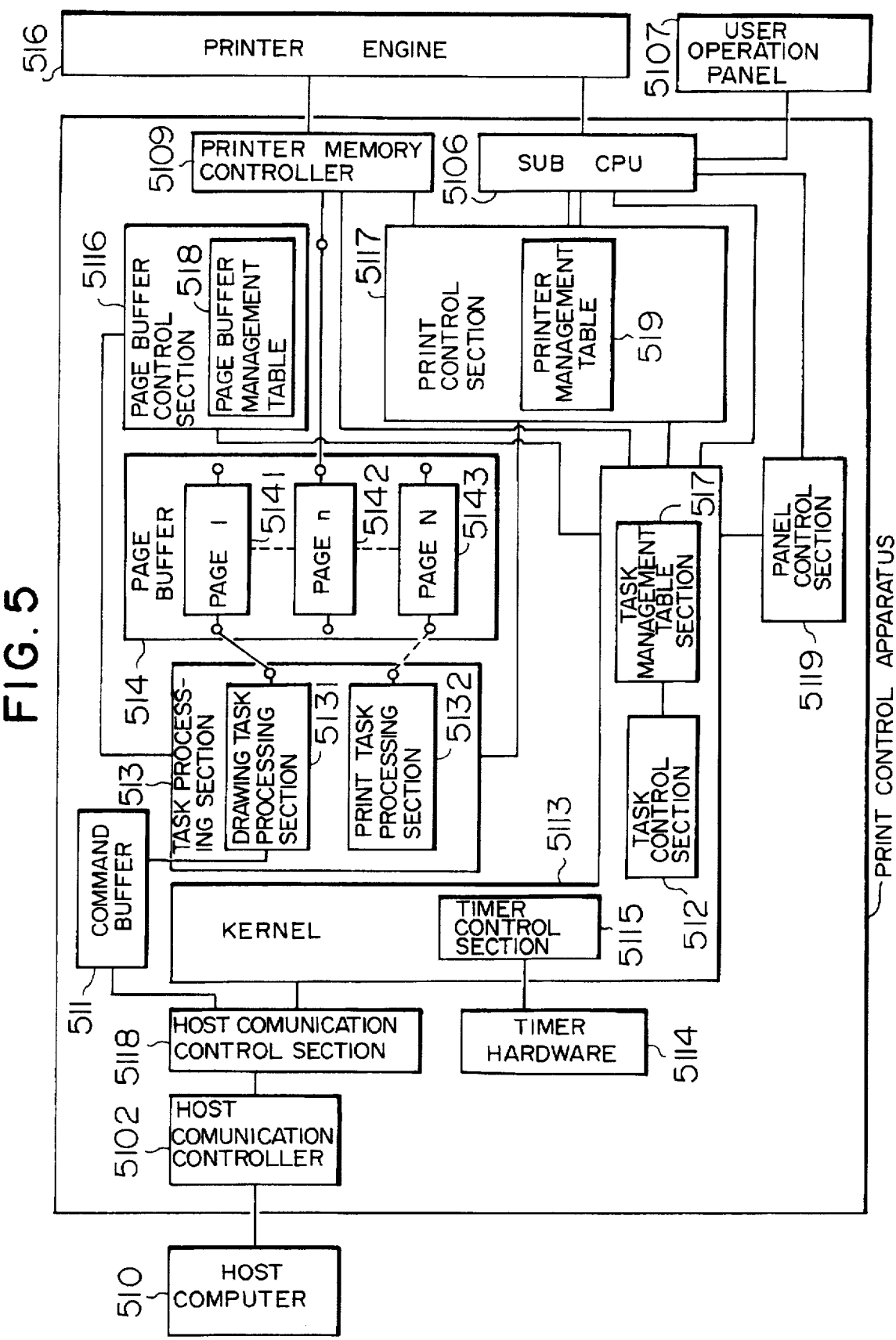
FIG. 5 is a constructional diagram in the case of applying a multi task control method in the first and second embodiments of the invention.

As component elements in FIG. 5, there are used component elements designated by reference numerals which are obtained by adding "5" to uppermost digits the reference numerals in FIG. 1 as the reference numerals in the above invention which has already been filed.

According to the above realizing method, since a CPU, a printer engine, and a page buffer (which can be also constructed for a plurality of pages) can be used without a blank time, the print throughputs in the normal state and upon error recovery can be improved and the print can be realized at the higher speed of the printer engine.

A processing procedure of each section of the print control apparatus 110 will now be described with reference to FIGS. 6 to 12.

Figure 6:
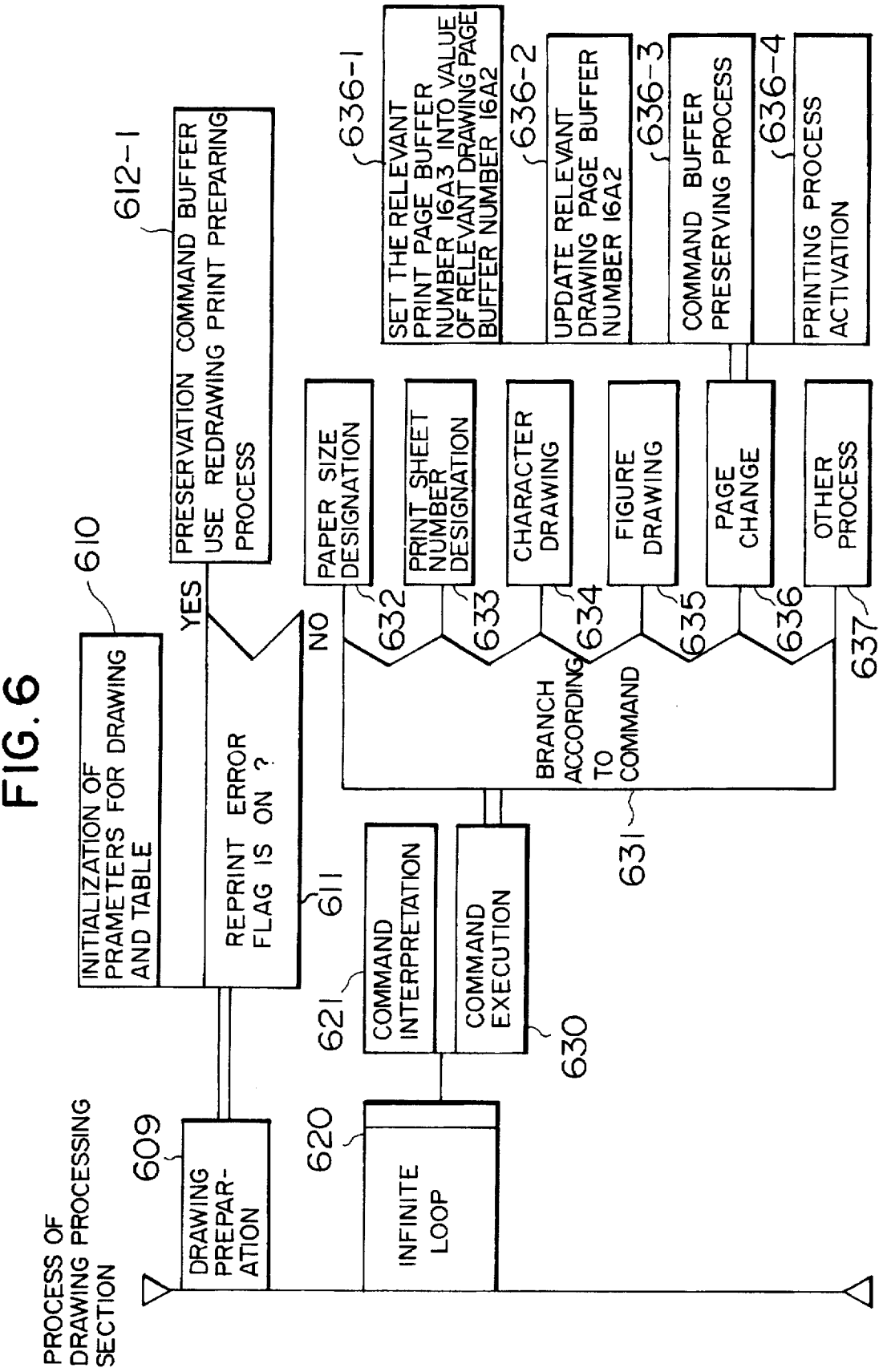
FIGS. 6, 7, 8, 9, 10, 11, and 12 are diagrams for explaining a processing procedure of each section in a print control apparatus in the first embodiment of the invention.

The processing procedure of the drawing processing section 131 will be first explained with reference to FIG. 6. First, various kinds of parameters for drawing and a table which are provided in the drawing processing section 131 are first initialized (6110) by the drawing preparation (6109). As one of them, a check is made to see if the reprint error flag is ON or not (6111). When it is ON, the following three items are executed by the preparing section 1312 as preparing processes for redrawing/reprint by use of the preserved content in the command buffer (6112-1).

(1) The value of the command read pointer 26 indicative of the reading position of the command buffer is preserved as a value of the second element (the preserving section 272 for the command page end pointer) of the head command block of the command buffer discharge queue.

(2) Among the various kinds of parameters for drawing, the value of the current drawing attribute parameter is preserved as a value of the third element (the preserving section 273 for the attribute parameter table) of the head command block of the discharge queue.

(3) The reprint error flag is set to OFF.

After completion of the drawing preparation, the command interpretation (6121) and command execution (6130) are repeated through an endless loop as drawing processes (6120).

In the command execution 6130, a branching process is executed in accordance with the commands (6131). The designation of the paper size (6132), the designation of the number of print sheets of paper (6133), the drawing of a character (6134), the drawing of a figure (6135), the page change (6136), and other process (6137) are executed. In the page change (6136), the processes as indicated by reference numerals 6136-1, 6136-2, 6136-3, 6136-4, and the like are executed. Among them, the processes other than the process 6136-3 are substantially similar to those in case of the invention which has already been filed. In the preserving process (6136-3) of the content of the command buffer, by the preserving section 1311, the command block having the current command buffer read pointer as a second element and the current drawing attribute parameter value as a third element is connected to the end of the discharge queue 121. In the print processing activation (6136-4), the print processing section 132 is activated with respect to the page buffer for which the drawing has been performed.

The processing procedure of the print processing section 132 will now be described with reference to FIG. 7. In this process, the reservation of the printer (709), the confirmation of the ready state (710), the confirmation of the paper feed section and paper discharge section (711), the instruction of the paper feed section and paper discharge section (712), the instruction of the print (714), the shift to the discharge end waiting state (715), printer free (717), and the end of task (718) are sequentially executed. The contents of those processes are substantially similar to those in the case of the foregoing inventions (disclosed in JP-A-2-70465 and JP-A-3-178466). The reservation of the printer (709), the printer free (717), and the task end (718) are necessary when the multi task method is realized.

The interrupting processing procedure in the printer control section 16 will now be described with reference to FIG. 8. In the interrupting process, in accordance with interruption factors (810), the output of a vertical sync signal (811), the activation of the discharge end monitoring timer (812), and the output of the video signal (813) are executed, the abnormality process is executed (814), and processes regarding the other interruption factors are executed (815). The contents of processes in the above routine are also substantially similar to those in the case of the foregoing inventions (disclosed in JP-A-2-70465 and JP-A-3-178466).

Figure 9:
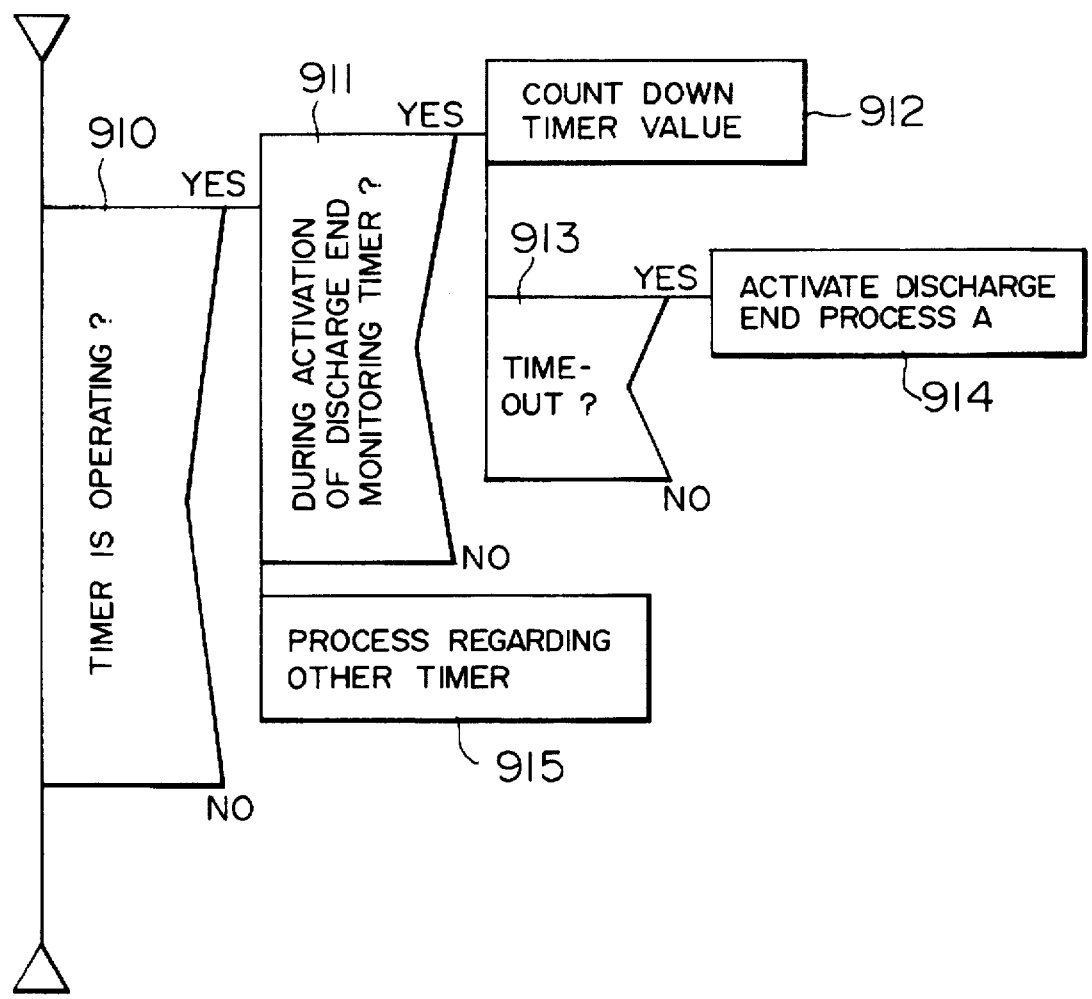

The processing procedure in a timer control section 5115 will now be described with reference to FIG. 9.

When the timer is operating (910), a process regarding each timer item is executed (911 to 915). With regard to the discharge end monitoring timer, the timer value is counted down (912). When the time-out of the timer is detected (913), the discharge end process A 1621 is activated (914).

Figure 10:
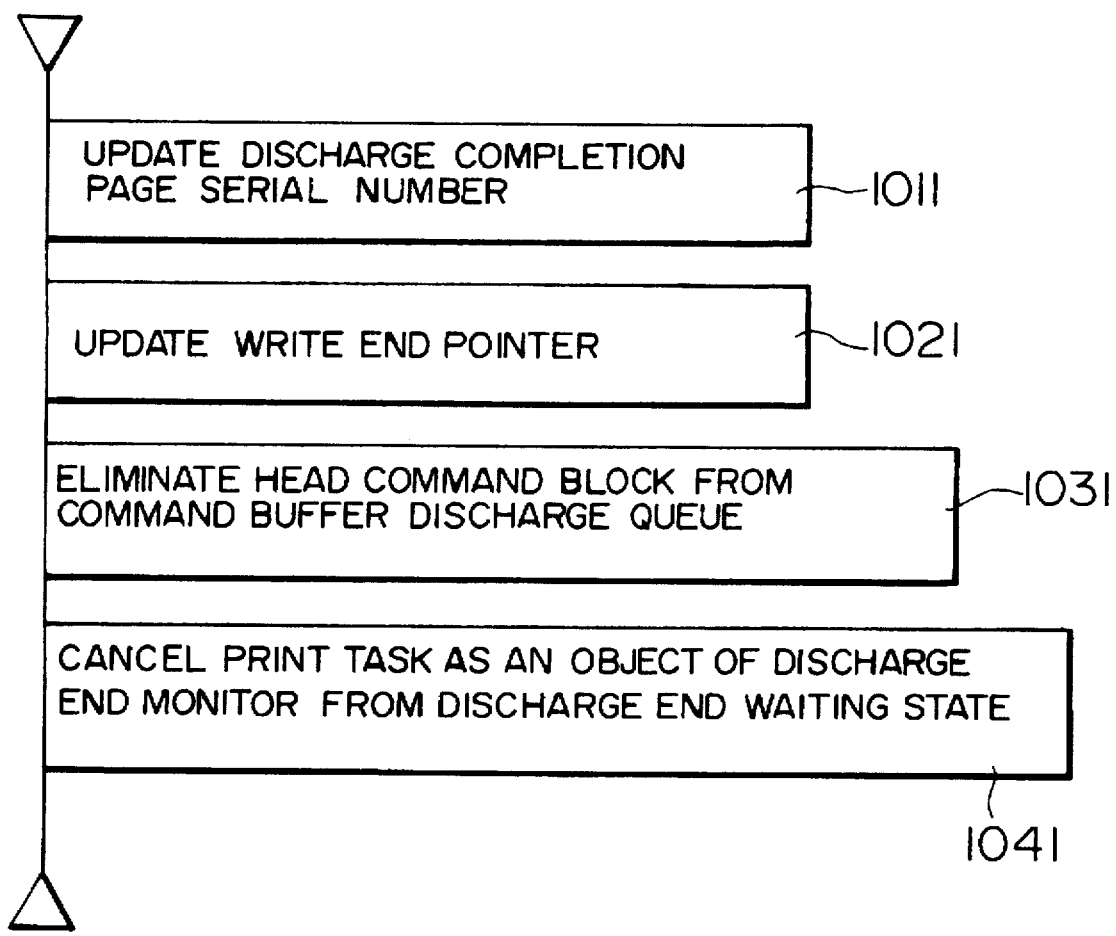

The processing procedure of the discharge end process A (1621) will be described with reference to FIG. 10. In this process, after the serial number of a page for which discharge operation is completed is updated (1011), the value of the write end pointer indicative of the end position of the content written into the command buffer is updated to the value of the command page end pointer stored in the preserving section as a second element of the head command block of the discharge queue (1021). Subsequently, the head command block is removed from the discharge queue (1031). After that, the print task as an object of the discharge end monitor is released from the discharge end waiting state (1041).

Figure 11:
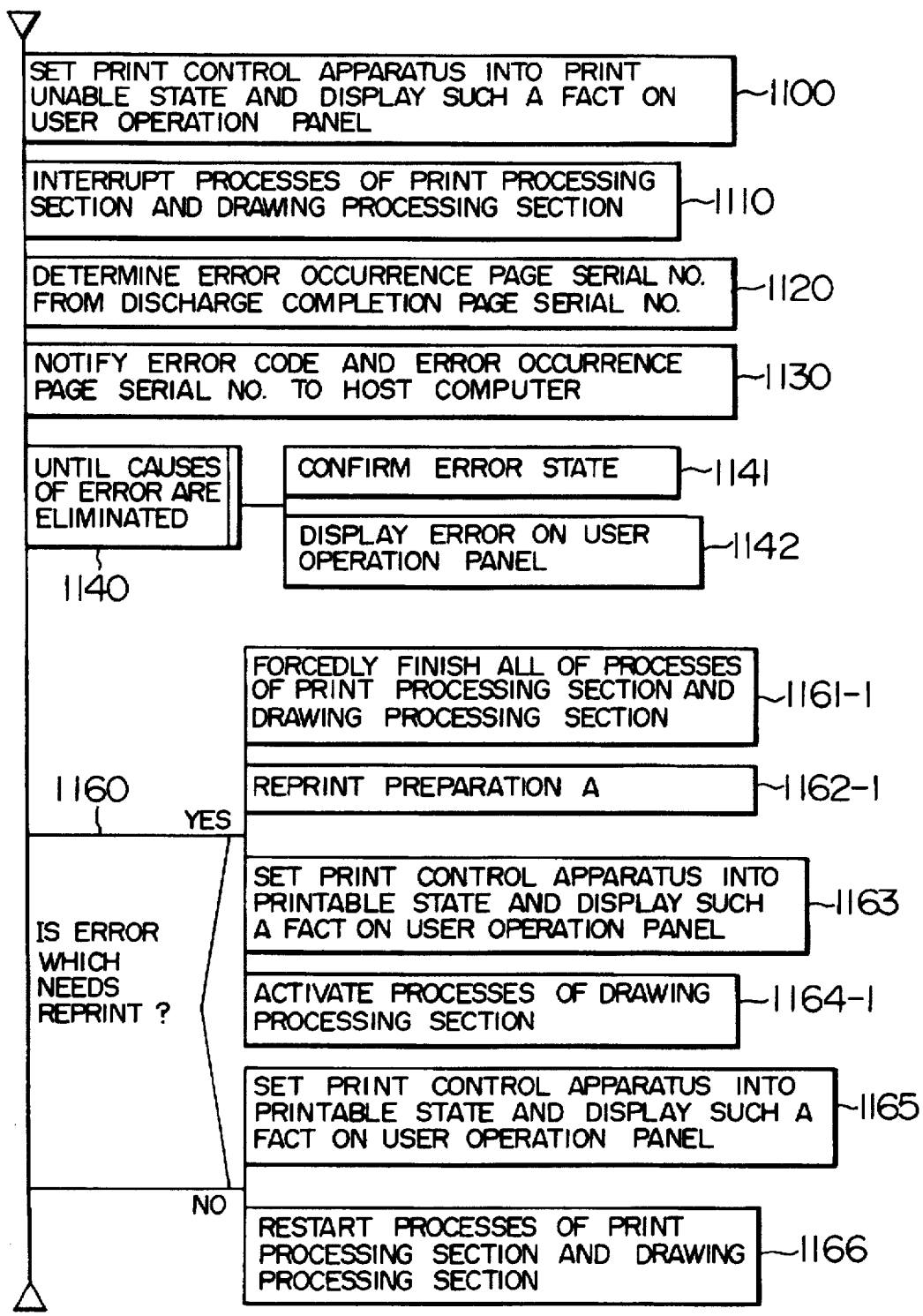

The abnormality processing section 17 executes the following processing procedures as shown in FIG. 11.

(1) The state of the print control apparatus is set into the print disable state and this fact is displayed on a user operation panel (1100).

(2) The processes of the print processing section and drawing processing section are interrupted. In case of the multi task construction, a plurality of print tasks and one or more drawing tasks are interrupted (1110).

(3) The serial number of the page in which the error has occurred is determined from the discharge completion page serial number (1120).

(4) The error code and the error occurring page serial number are notified to the host computer 100 through the host communication control section 10 (1130).

(5) Until the causes of the error are removed (1140), the error state of the printer is confirmed (1141) and the confirmed latest error is displayed on a user operation panel section 5107 (1142).

(6) A check is made to see if the detected error is one such as paper jam or printer door open during the printing operation which needs the reprint or not (1160). If YES, the following processes are executed.

(6-1) All of the processes of the print processing section 132 and drawing processing section 131 are forcedly finished (1161-1).

Figure 12:
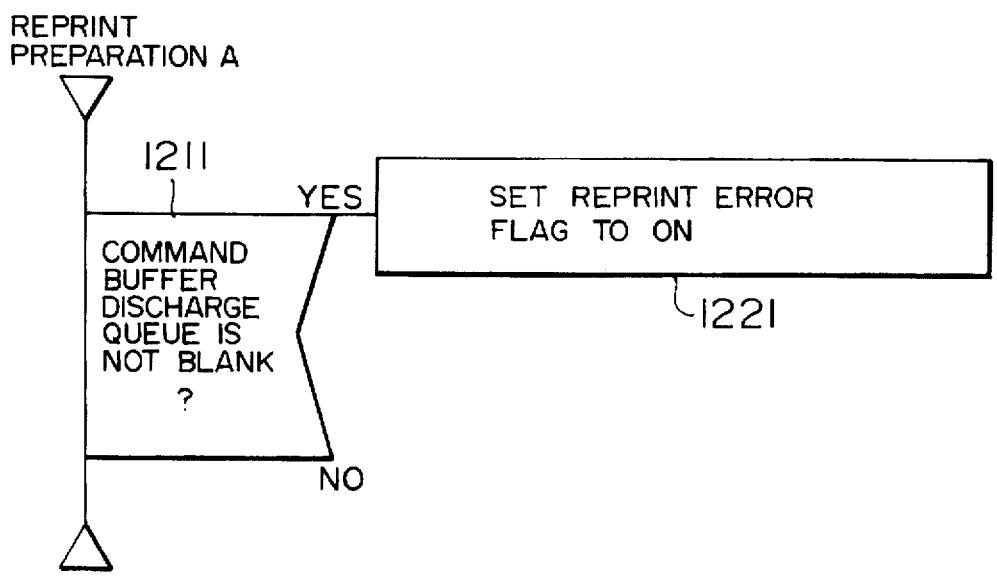

(6-2) The reprint preparation A is executed (1162-1). In the reprint preparation 1, as shown in FIG. 12, a check is made to see if the command indicative of the incompletion of the paper discharge has been preserved in the command buffer or not by discriminating whether the discharge queue is not blank or not (1211). When such a command has been preserved, the reprint error flag is turned ON (1221).

(6-3) The state of the print control apparatus 110 is set into the printable state (online) and this fact is notified to the user operation panel section 5107 (1163).

(6-4) The process of the drawing processing section 131 is activated (1164-1).

(7) When the detected error is not one which needs the reprint, the following processes are executed.

(7-1) The state of the print control apparatus 110 is set into the printable state (online) and this fact is displayed on the user operation panel section 5107 (1165).

(7-2) The processes of the print processing section and the drawing processing section are restarted (1166).

After the absence of the printer error was detected in the abnormality processing section, for instance, the reprint can be also activated by an instruction from the host computer 510 or by an instruction from a panel control section 5119.

The processing procedure of the host computer 100 will now be described with reference to FIG. 13. In this process, when there is a print instruction from the user (1330), the print command train is read out from a memory section of the host computer (1331). The print command train is transmitted to the print control apparatus (1332). When an error occurs in the printer (1340), the apparatus waits for an error recovery instruction from the user (1341) and, thereafter, a restart instructing command is transmitted to the print control apparatus 110 (1342).

The processing procedures 1340, 1341, and 1342 are used in the case of transmitting the error recovery instruction to the print control apparatus after waiting for the error recovery instruction from the user. The above procedure is not used in such an error that after the causes of the error were removed, the print control apparatus is automatically recovered without waiting for the error recovery instruction from the user. When the error notification is received (1350), the error is displayed by the display section of the host computer (1351).

Figure 14:
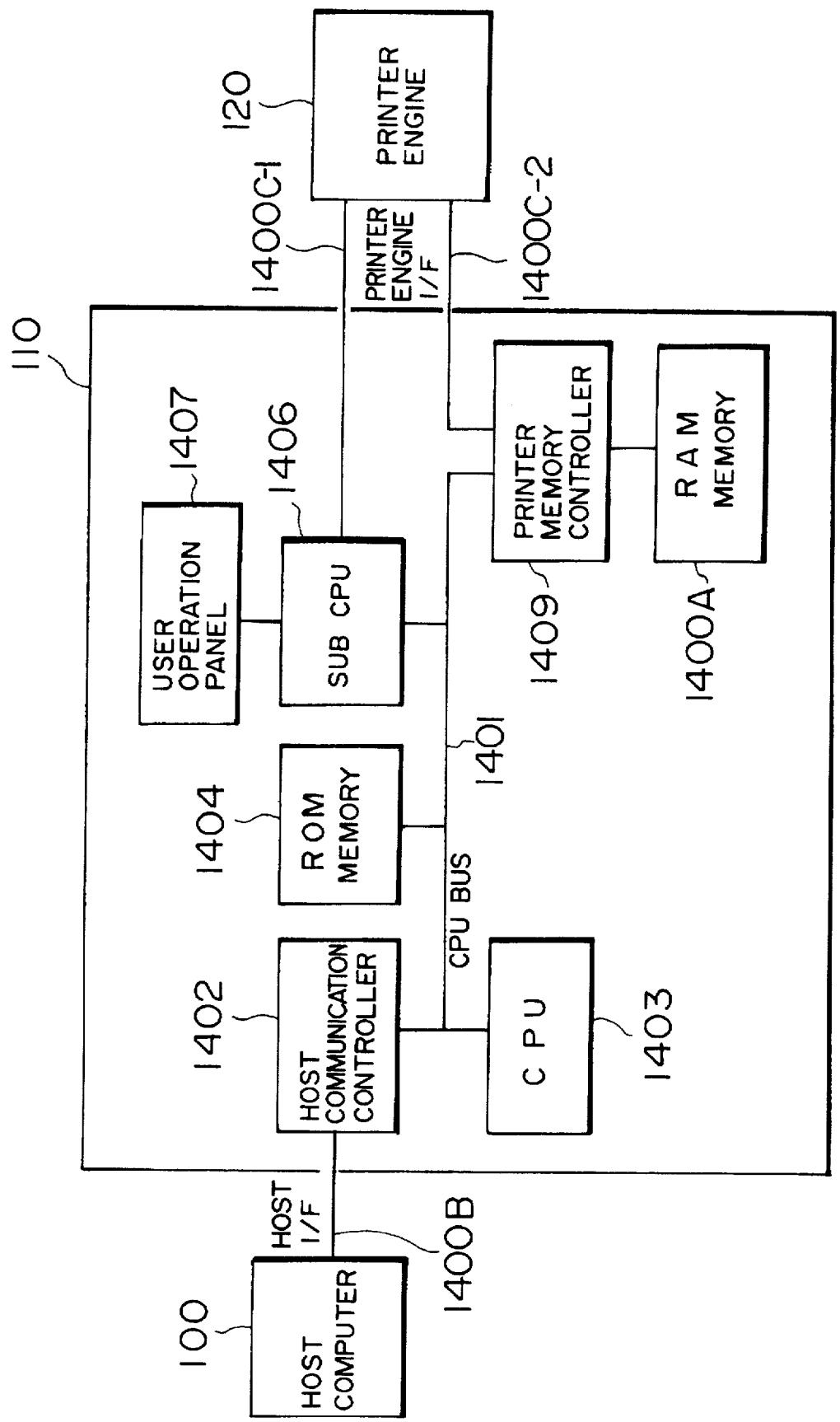
FIG. 14 is a diagram for explaining a hardware construction of the invention.

A hardware construction of the print control apparatus 110 will now be described with reference to FIG. 14. The print control apparatus 110 includes: a CPU bus 1401; a host communication controller 1402; a CPU 1403; ROM 1404; a sub CPU 1406; a user operation panel 1407; a printer memory controller 1409; and a RAM 1400A. The CPU bus 1401 includes various kinds of input/output signals (address signal, data signal, and other control signals) of the CPU 1403.

The CPU 1403 transmits and receives data to/from the peripheral controllers 1402, 1406, 1409, and the like and the memories 1404, 1400A, and the like through the CPU bus 1401. The host communication controller 1402 is for the print control apparatus 110 to communicate with the host computer 100. As a physical interface (I/F) of the above communication (referred to as a host I/F), an SCSI (Small Computer System Interface), RS232C, RS422, GP-IB (General Purpose—Interface Bus), Centronics, HDLC (High-Level Data Link Control), etc. can be used. A proper one of them is installed as a hardware logic of the controller 1402 in accordance with the kind of physical I/F which is used. An initial program loader IPL of the print control apparatus 110 and a part of character fonts are stored in the ROM 1404. In the RAM 1400A, there are stored: (a) a control program of the print control apparatus 120; (b) remaining character fonts; (c) a command buffer section memory; (d) a page buffer section memory; and (e) various kinds of management tables such as page buffer management table, a task management table, and the like and the other. Among them, (a) and (b) are stored by downloading from the host computer 100 by the IPL program. On the other hand, (a) and (b) can be also previously stored into the ROM 1404 without storing into the RAM 1400A. On the contrary, all of the character fonts can be also stored into the RAM 1400A without storing any of them into the ROM 1404. The sub CPU 1406 executes transmitting and receiving processes between the sub CPU 1406 and the user operation panel 1407 and printer engine 120 in accordance with instructions of the CPU 1403. The printer memory controller 1409 executes the process to read out the content of the RAM 1400A (ordinarily, content of the page buffer) to the printer engine 120 and executes the control (refresh or the like) of the DRAM memory in the case where the RAM 1400A is composed of a DRAM. The reading process is executed by using an internal DMA (Direct Memory Access) function. At a time point at which the reading operation of the data for one page from the page buffer is finished, the printer memory controller 1409 asserts an interruption signal (a part of the signals on the CPU bus 1401) to the CPU 1403 and activates a page buffer reading end interrupting process by the CPU.

The print control apparatus 110 executes the communication with the printer engine 120 by the sub CPU 1406 through a signal line 1400C-1 and by the printer memory controller 1409 through a signal line 1400C-2 in accordance with an I/F called a printer engine I/F. In the case where the printer engine 120 is a shuttle printer, the printer memory controller 1409 converts the format of the content of the page buffer 15 and, thereafter, supplies to the printer engine 120 through the signal line 1400C-2. In the case where the printer engine is a laser printer, the printer memory controller 1409 parallel-to-serial converts the content of the page buffer and, thereafter, supplies to the printer engine through the signal line 1400C-2. In the case where the printer engine is the shuttle printer, the signal line 1400C-1 is used to receive a signal indicative of the page head position and the like from the printer engine. In the case where the printer engine is the laser printer, the signal line 1400C-1 is used for the sub CPU 1406 to transmit a command for inquiry or instruction to the printer engine 120 and to convey a command for receiving a response status from the printer engine 120, status transmission/reception signals, and a control signal for controlling a reading procedure to read out the content of the page buffer 15 to the printer engine 120.

In the embodiment, it is sufficient to prepare the command buffer having the capacity which is necessary to store the print commands for one sheet of paper. There is no need to prepare the special command buffers dedicated for the error recovery and having the capacity for the maximum number of pages to be preserved, as in the first prior art. Therefore, the cost performance of the print control apparatus can be raised. Since the drawing attribute parameters at the start of the drawing of each page have been preserved in the command buffer discharge queue, even for a command of such a type that the drawing attribute parameters are handed over between the pages, the print result doesn't differ from the inherent print upon error recovery. The reliability and use efficiency of the print control apparatus can be improved. It is also possible to eliminate the increase in processing burden of the host computer and the modification of the program in the second prior art. The command read skipping process in the third prior art can be omitted, so that the increase in development program amount of the print control apparatus can be avoided.

The second embodiment of the invention will now be described. First, a construction of a print control apparatus in the embodiment will now be described with reference to a constructional diagram of FIG. 15. A print control apparatus 1510 includes: a host communication control section 150; a command buffer 151; a command processing section 153; a page buffer control section 154; a page buffer 155; a printer control section 156; and an abnormality processing section 157.

The host communication control section 150 executes processes similar to those in the first embodiment (in case of FIG. 1). The command processing section 153 includes a drawing processing section 1531 and a print processing section 1532. The drawing processing section 1531 also executes processes similar to those in the first embodiment (in case of FIG. 1) and reads out a command from the command buffer 151 and interprets and executes. In the command execution, when the page changing condition is met, the drawing of the page is finished and the print processing section 1532 is activated with respect to the page buffer for which the drawing has been performed. The print processing section 1532 instructs the printer control section 156 to print by using a print instructing section 15321.

Further, a page buffer preserving section 15322 and a preserved page buffer releasing section 15323 are provided in the print processing section 1532. The content of the page buffer is preserved in the section 15322 for error recovery. The section 15323 releases the preserved content of the page buffer at the end of the paper discharge. The page buffer control section 154, the page buffer 155, and the printer control section 156 also execute functions similar to those in the first embodiment. A page buffer discharge queue section 1541 as a series of constructing objects called print blocks is provided in the page buffer control section 154. Each print block has a page buffer number as a second element and a print task number as a third element and is used to manage the preservation and release of the content of the page buffer for error recovery.

A discharge end monitoring section 1561 and a discharge end processing section B 15622 are provided in the printer control section 156. The section 1561 monitors the end of paper discharge from a printer engine 1520 of a print paper and activates the discharge end processing section B 15622 at the time point when the end of paper discharge is detected.

The section 157 executes abnormality processes for various kinds of abnormalities detected by respective sections of the print control apparatus 1510. A section 1572 is provided in the abnormality processing section 157 and executes the reprint by using the preserved content of the page buffer preserved at the time of the detection of the error which needs the reprint.

Figure 16:
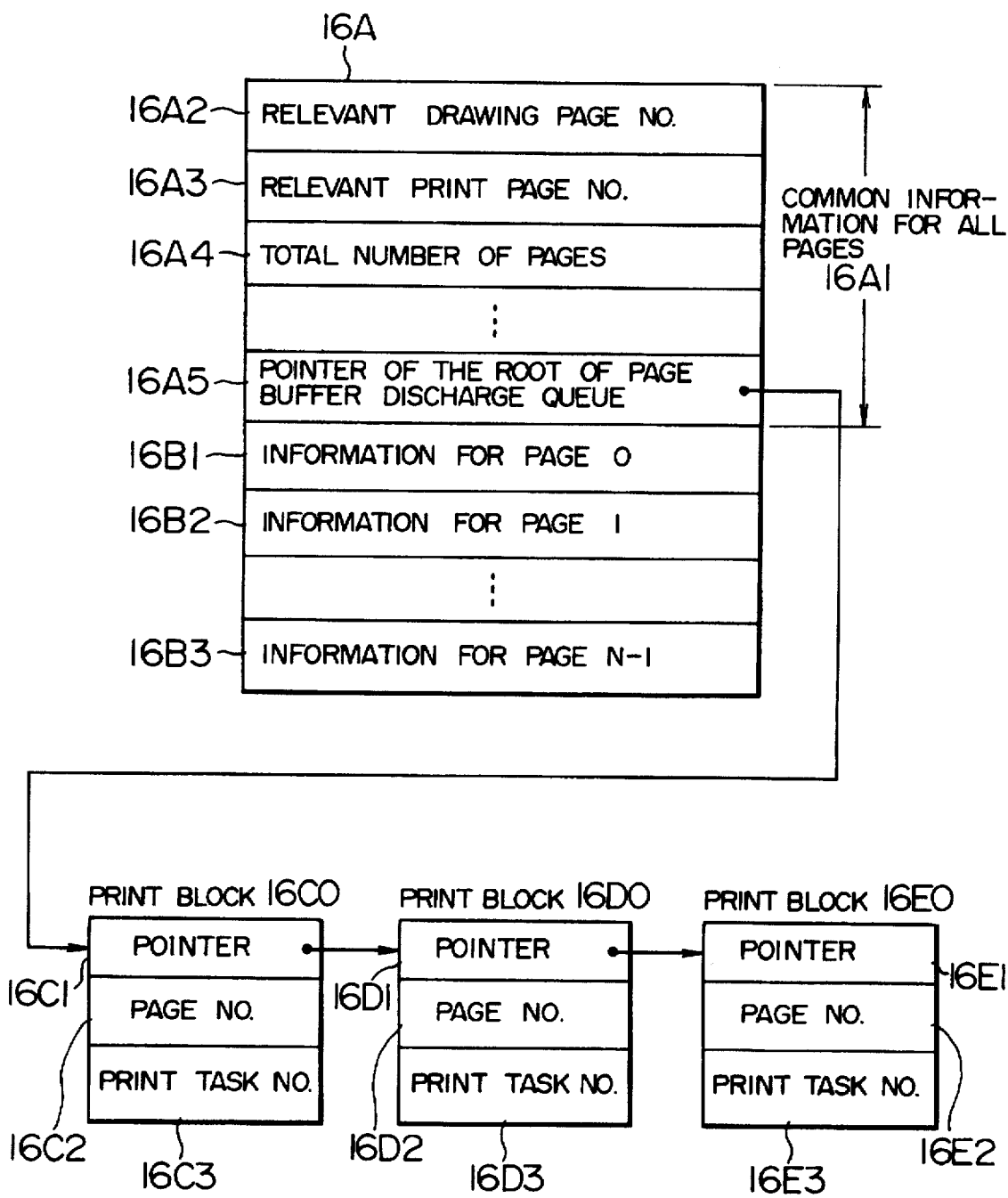
FIG. 16 is a diagram for explaining a page buffer management table section in the second embodiment of the invention.

The content of a page buffer management table section 16A will now be described with reference to FIG. 16. The management table section 16A is used to manage the page buffer for one or more pages and includes: common information 16A1 for the whole page buffer; information 16B1 for the page 0; information 16B2 for the page 1; . . . ; and information 16B3 for the page N-1. N denotes the total number of pages and is described as one item in the common information 16A1 for whole page buffer as will be explained hereinlater. The common information 16A1 for the whole page buffer includes: a relevant drawing page number 16A2; a relevant print page number 16A3; a total number (N) of pages 16A4; a pointer 16A5 of the root of a page buffer discharge queue; and the like. Among them, the contents other than the pointer 16A5 of the root of the page buffer discharge queue are similar to those in the foregoing invention which has been filed.

The pointer 16A5 of the root of the page buffer discharge queue is a pointer of the root of the page buffer discharge queue 15A1. Constructing objects called print blocks (16C0 to 16E0) are connected to the pointer 16A5 one after another. Each print block (16C0 to 16E0) has a pointer (16C1, 16D1, 16E1) to the next print block as a first element, a page number (16C2, 16D2, 16E2) as a second element, and a print task number (16C3, 16D3, 16E3) as a third element. The page number of the second element and the print task number of the third element are obtained by recording the task number of the print task and the print page number as an object for print into the print block at the time point at which each print task instructs the print regarding a certain page. Such a recording is canceled at the time point at which the above print is normally finished and the printed paper is normally discharged. When an error which needs the reprint occurs, the error recovery process is executed by using such a recording.

Figure 17:
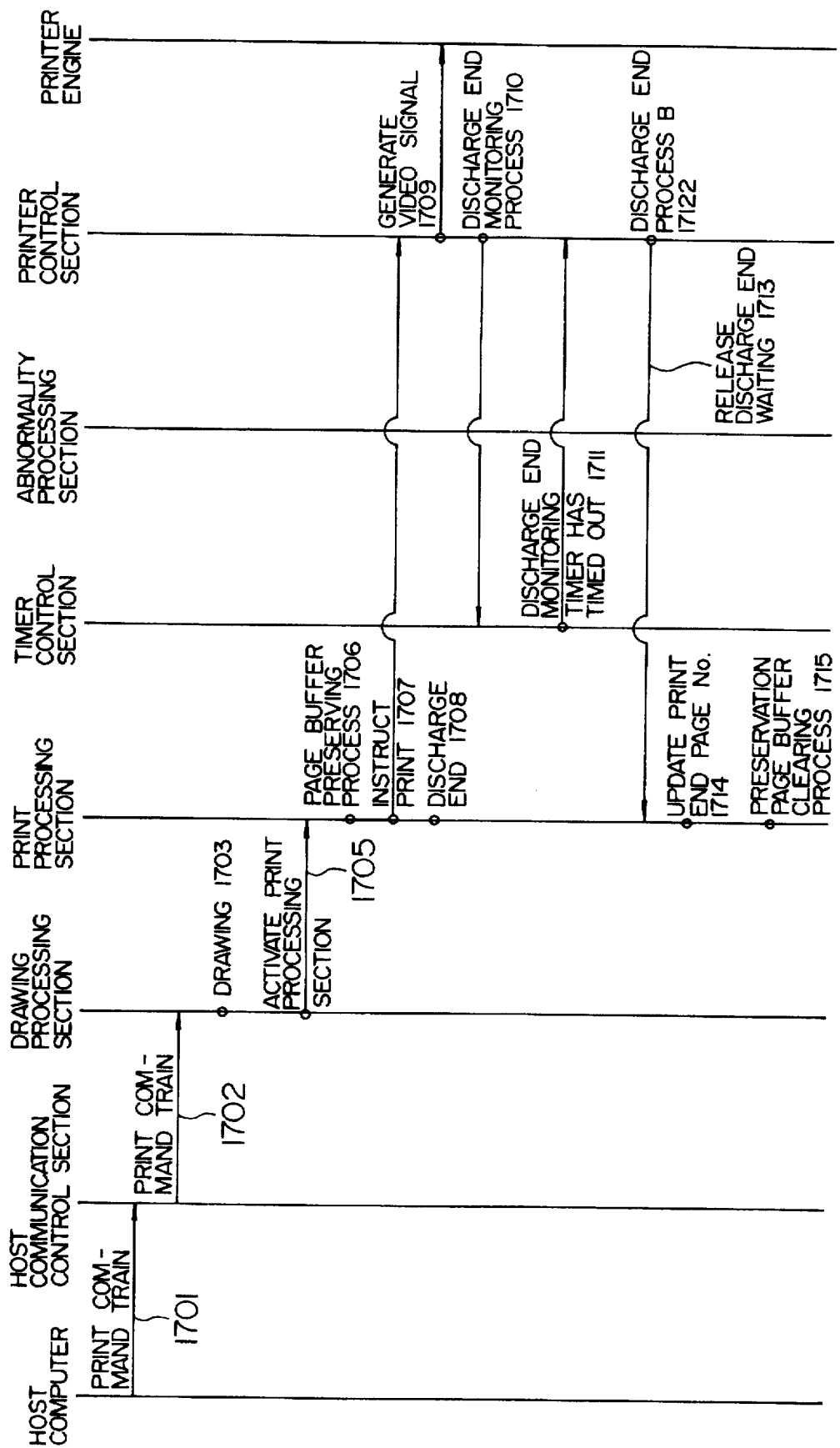
FIGS. 17 and 18 is a diagram for explaining operating procedures in a normal state in the second embodiment of the invention.

The operating procedure in the normal state of the print control apparatus will now be described with reference to FIG. 17.

Figure 3:
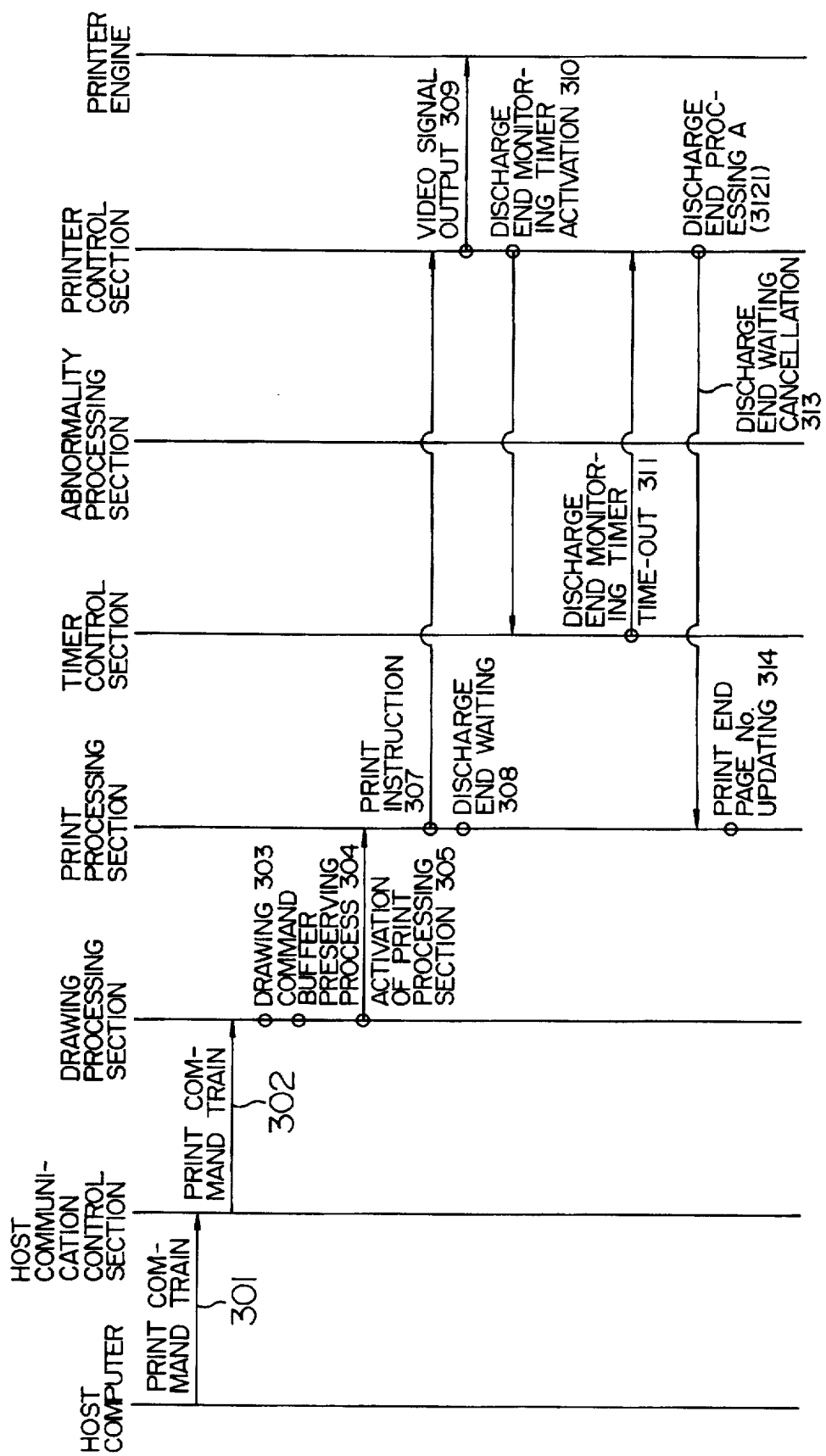
FIG. 3 is a diagram for explaining an explaining as operating procedure in a normal state in the first embodiment of the invention.

The procedures from the reception and storage of the print command train (1701) to the drawing (1703) are the same as those in case of the first embodiment (FIG. 3). Thereafter, in the embodiment, the print processing section is activated (1705) without performing the command buffer preserving process (3041). The print processing section 1532 executes the page buffer preserving process (1706) and generates the print instruction to the printer control section 156 (1707) and then enters the discharge end waiting state (1708). Hereinafter, the activation of the discharge end monitoring timer (1710), the cancellation of the discharge end waiting state (1713), and the updating of the print end page number (1714) are executed by the same procedures as those in case of the first embodiment (FIG. 3). Subsequently, the print processing section 1532 executes a preservation page buffer clearing process (1715) and finishes a series of normal printing procedure.

Figure 18:
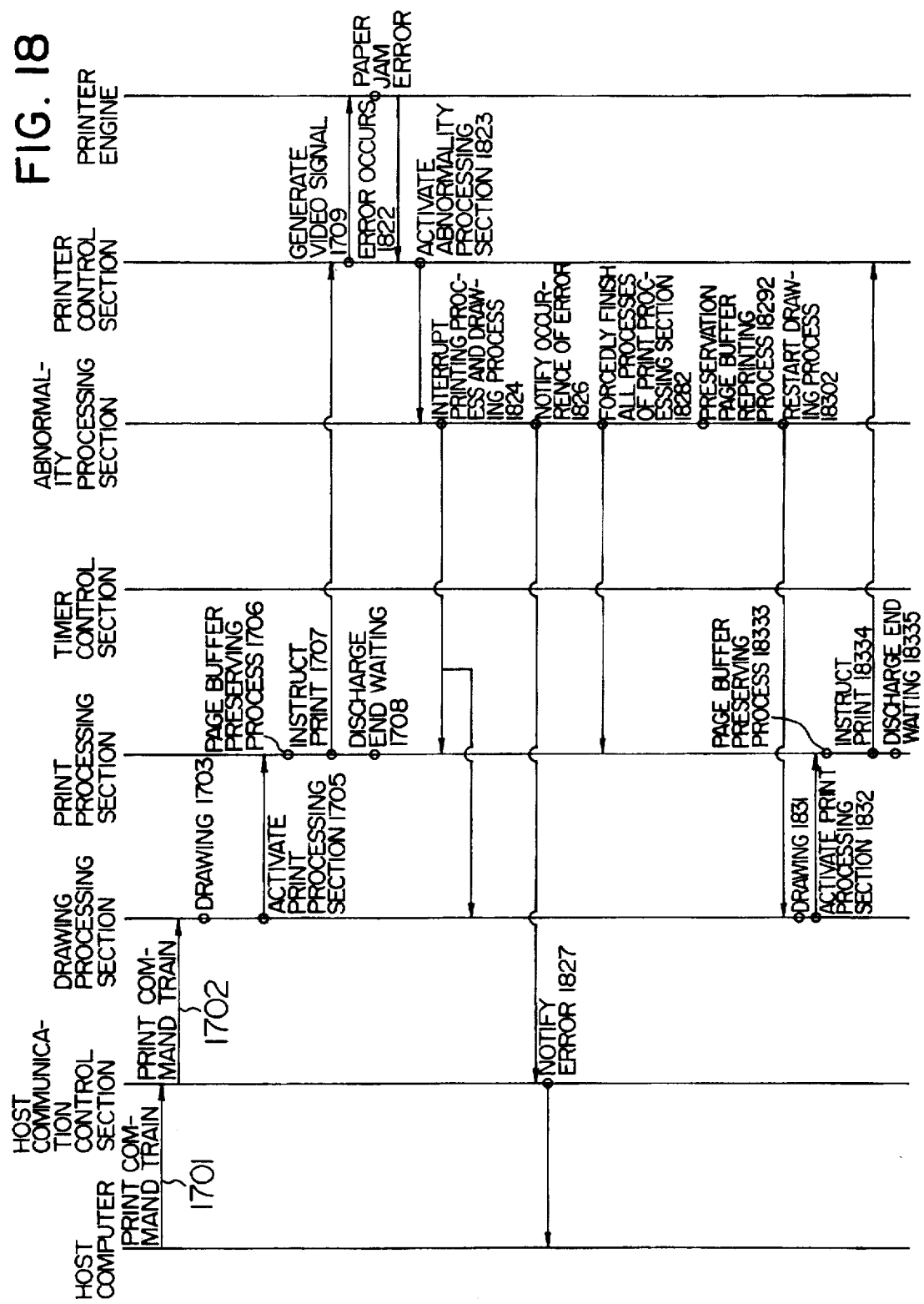

The operating procedure in an abnormal state of the print control apparatus will now be described with reference to FIG. 18. The procedures after completion of the reception and storage of the print command train (1701) until the notification of the error to the host computer 100 (1827) are substantially the same as those in case of the first embodiment (FIG. 4). Thereafter, in the embodiment, the following processes are executed.

(1) A check is made to see if the detected error is one such as a paper jam which needs the reprint or not. If YES, the following processes are executed.

(1-1) All of the processes of the print processing section 1532 are forcedly finished. The embodiment differs from the first embodiment in a point that the processes of the drawing processing section are not forcedly finished (the processes so far are not cleared but are only interrupted) (18282).

(1-2) A reprinting process is executed and a check is made to see if any page in which the paper discharge is not completed yet have been preserved in the page buffer 155 or not. If YES, the print task processing section is activated with respect to all of the preserved page (18292).

(1-3) The processes of the drawing processing section 1531 are restarted. Since the drawing process is not forcedly finished in step (1-1) as in the first embodiment, it is sufficient to restart those processes and there is no need to activate them (18302).

(2) The print control apparatus 1510 execute the operating procedure in the normal state hereinbelow.

That is, the drawing processing section 1531 executes the drawing (1831) and the activation of the print processing section (1832). The print processing section 1532 executes the processes such as instruction of the print (1833) and the like.

Figure 15:
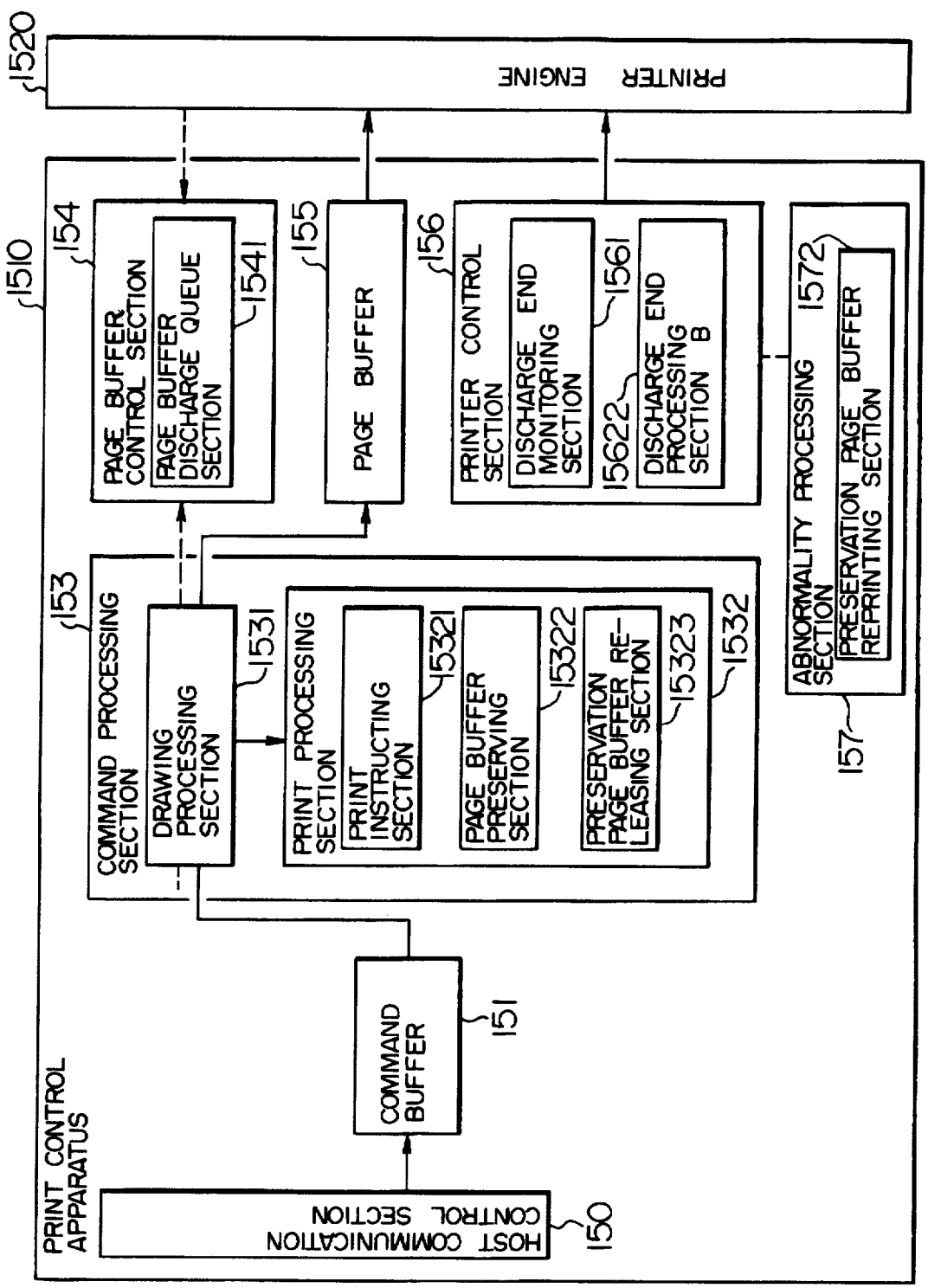
FIG. 15 is a constructional diagram showing the second embodiment of the invention.

In a manner similar to the case of the first embodiment, the second embodiment can be also realized as expanded functions to the invention shown in FIG. 5 which has already been filed. Namely, the processes of the drawing processing section and the print processing section can be executed as a multi task construction in a concurrent or parallel manner. In such a case, the component elements in FIG. 15 are made correspond to the component elements in FIG. 5 in a manner similar to the case of the first embodiment. According to the above realizing method, since the CPU, the printer engine, and page buffer (also constructed by a plurality of pages) can be used without a blank time, the print throughputs in the normal state and the error recovery are improved and the print at the highest speed of the printer engine can be realized.

Figure 19:
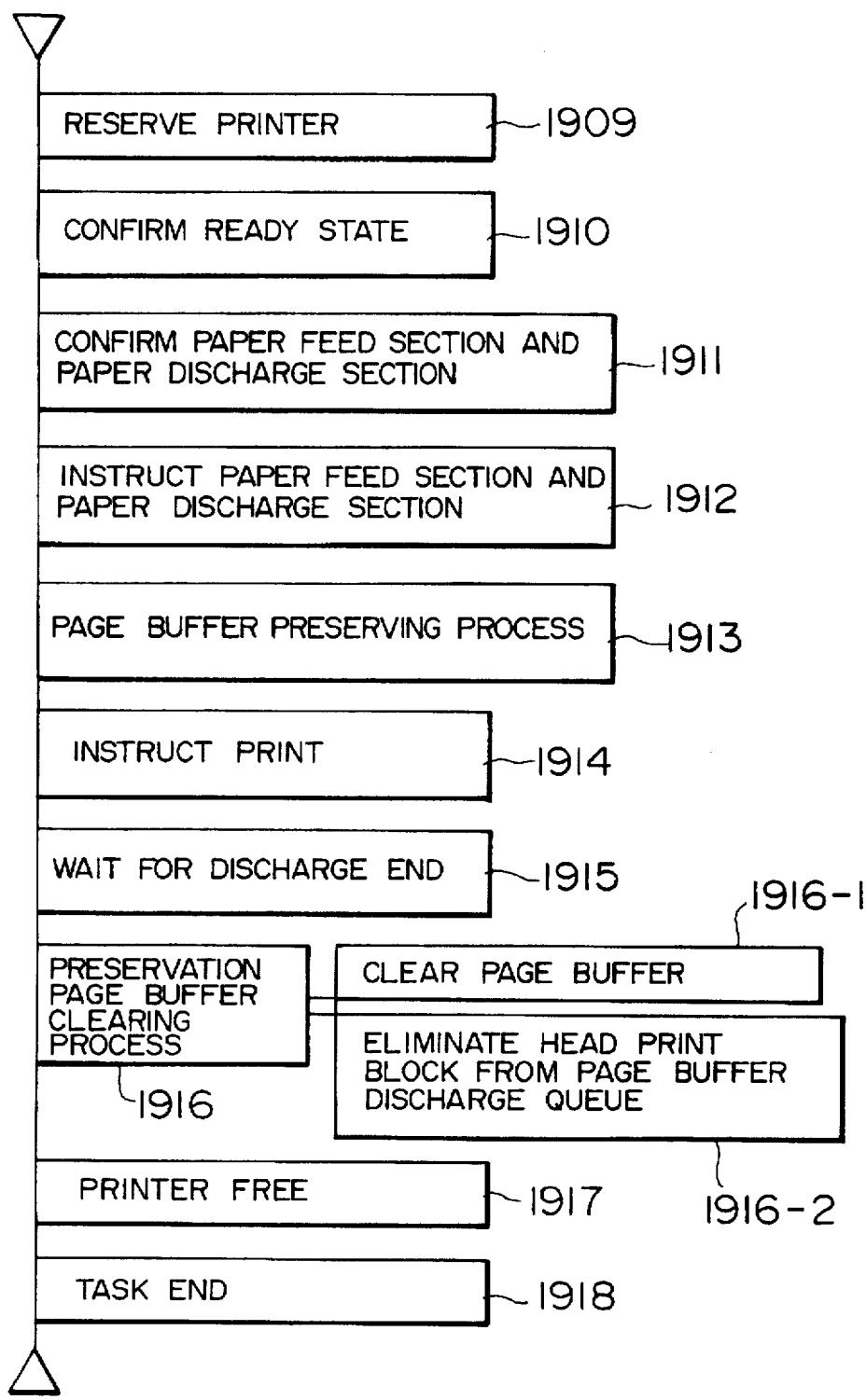
FIGS. 19, 20, 21, and 22 are diagrams for explaining a processing procedure of each section in a print control apparatus in the second embodiment of the invention.

A processing procedure of each section in the print control apparatus will now be described with reference to FIG. 19.

The processing procedure of the drawing processing section 1531 is substantially the same as in case of the first embodiment (FIG. 6) except the following two points.

(1) The processes (611, 612-1) after the discriminating step regarding whether the reprint error flag is ON or not are deleted from the drawing preparation (609).

(2) The command buffer preserving process (636-3) is deleted from the page changing process.

The processing procedure of the print processing section 1532 will now be described with reference to FIG. 19. In this processing procedure, the reservation of the printer (1909), the confirmation of the ready state (1910), the confirmation of the paper feed section and paper discharge section (1911), and the instruction of the paper feed section and paper discharge section (1912) are executed and, thereafter, the page buffer preserving process (1913) is executed. In the page buffer preserving process (1913), the print block 16C0 and the like in which the relevant print page number 16C2 of the object to be printed is provided as a second element and the print task number 16C3 to execute the printing process is provided as a third element are connected to the end of the command buffer discharge queue 1541. The content of the page buffer is preserved. Subsequently, the print processing section 1532 instructs the printer control section 156 to print regarding the page by using the print instructing section 15321 (1914). In the above print instruction, however, the printer control section 156 is instructed in such a mode as to preserve the content of the page buffer without clearing to 0. After the print was instructed, the print processing section 1532 is set into the paper discharge end waiting state (1915). The print processing section which has been released from the discharge end waiting state by the discharge end process 2, which will be explained hereinlater, executes the preservation page buffer clearing process (1916) by using the preservation page buffer releasing section 15323. In the preservation page buffer clearing process (1916), the zero-clearing process of the page buffer for the page number recorded in the second element of the head print block of the page buffer discharge queue section (1916-1) and the removing of the head print block from the page buffer discharge end queue (1916-2) are executed. In case of using a variable length page buffer control method (U.S. patent application Ser. No. 08/003, 943, now U.S. Pat. No. 5,265,209, which is a continuation of U.S. patent application Ser. No. 07/605,280, now abandoned) as an invention which has already been filed by the same inventors as the present invention, the pages of the number which is decided by the paper size are cleared.

After that, the print processing section 1532 sequentially executes the printer free (1917) and the task end (1918). The interrupting processing procedure in the printer control section 156 is similar to that in case of the first embodiment (FIG. 8). The processing procedure in the timer control section is similar to that in case of FIG. 9 except a point that the discharge end process 2 is activated in place of the discharge end process A (914 in FIG. 9) when the discharge end monitoring timer has timed out.

Figure 20:
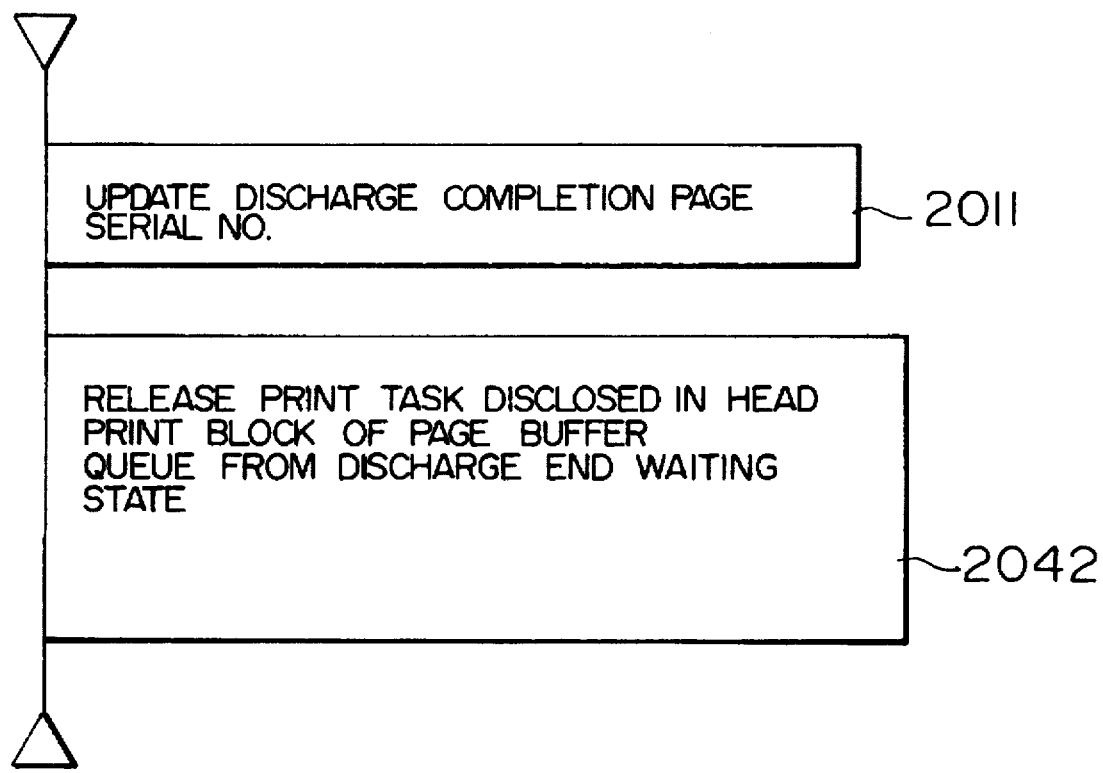

The processing procedure of the discharge end process B (corresponding to 15622 and 17122) will now be described with reference to FIG. 20. In the processing procedure, after the serial number of the page in which the paper discharge had been completed was updated (2011), the discharge end waiting state of the print processing section is canceled with respect to the print task of the task number recorded as a third element in the head print block of the page buffer discharge queue (2042).

Figure 21:
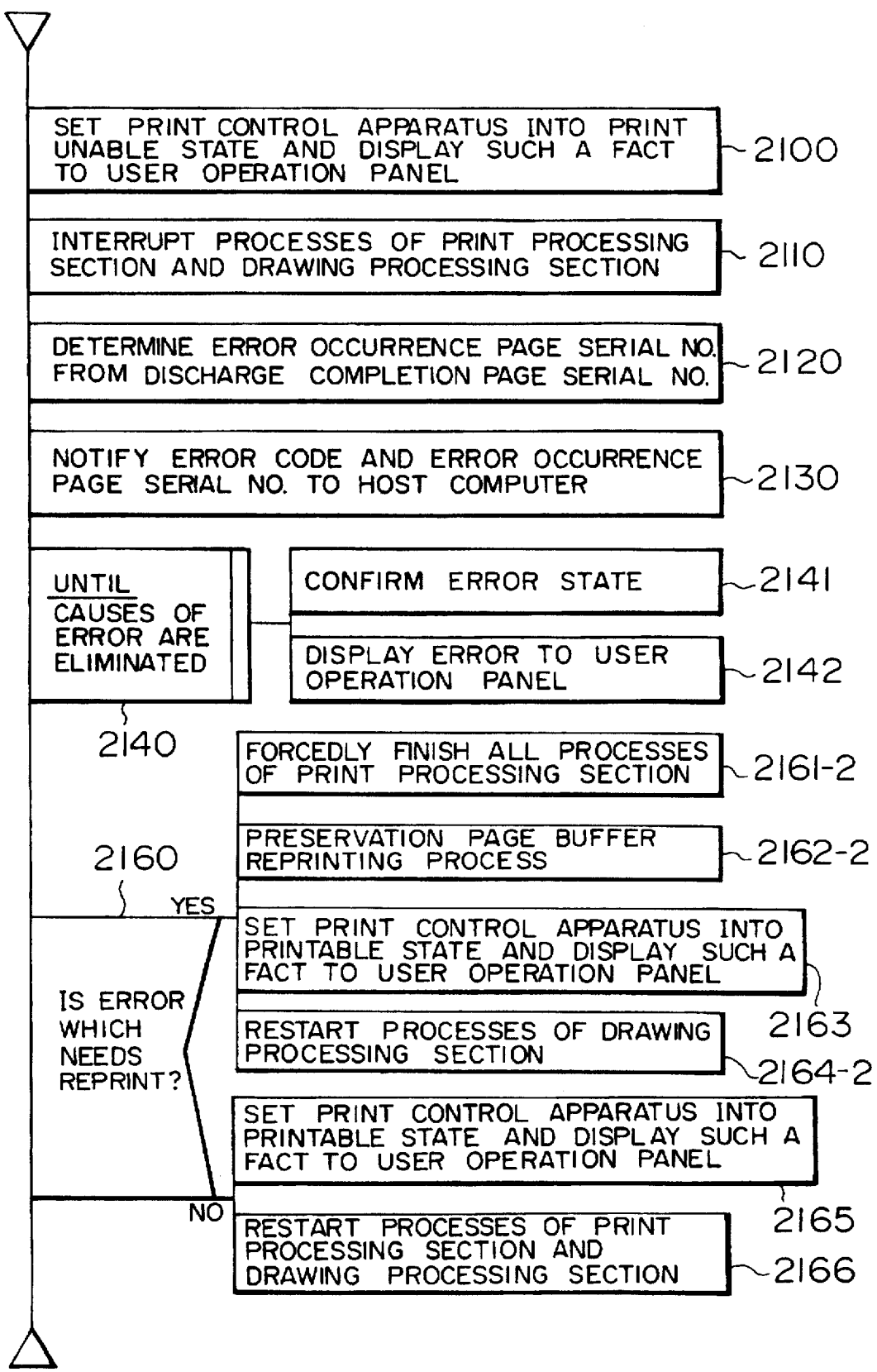

The processing procedure of the abnormality processing section 157 will now be described with reference to FIG. 21. After the process (2100) to set the print control apparatus into the printable state or the like, the confirmation of the printer error state (2141) until the causes of the error are eliminated and the display of the confirmed error to the user operation panel section 5107 (2142) are substantially the same as those in case of the first embodiment. The abnormality processing section 157 subsequently executes the following processes.

(1) A check is made to see if the detected error is one such as paper jam or printer door open during the printing operation which needs the reprint or not (2160). If YES, the following processes are executed.

(1-1) All of the processes of the print processing section 1532 are forcedly finished (2161-2).

Figure 22:
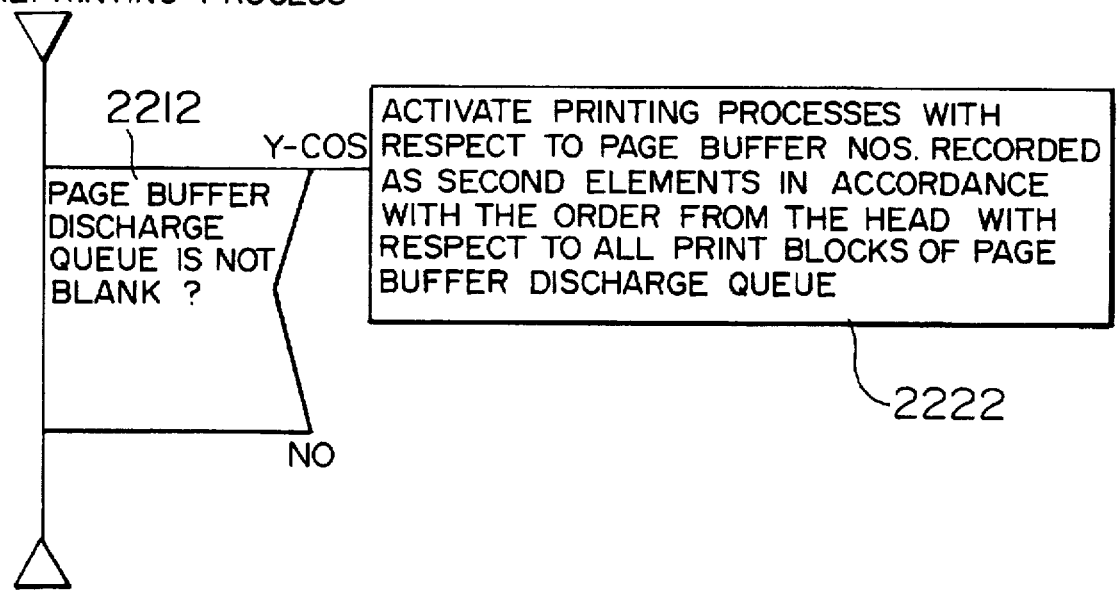

(1-2) The preservation page buffer reprinting process is executed (2162-2). In the preservation page buffer reprinting process, as shown in FIG. 22, a check is made to see if the drawing content in which the paper discharge is not completed yet has been preserved in the page buffer or not by discriminating whether the page buffer discharge queue is blank or not (2212). If it is not blank, the printing processes are activated with respect to the page numbers recorded as second elements in accordance with the order from the head with regard to all of the print blocks of the page buffer discharge queue (2222).

(1-3) The print control apparatus 1510 is set into the printable state (online) and such a fact is displayed to the user operation panel section 5107 (2163).

(1-4) The processes of the drawing processing section 131 are restarted (2164-2).

(2) When the detected error is not one which needs the reprint, the following processes are executed.

(2-1) The print control apparatus 1510 is set into the printable state (online) and such a fact is displayed on the user operation panel section 5107 (2165).

(2-2) The processes of the print processing section and the drawing processing section are restarted (2166).

Figure 13:
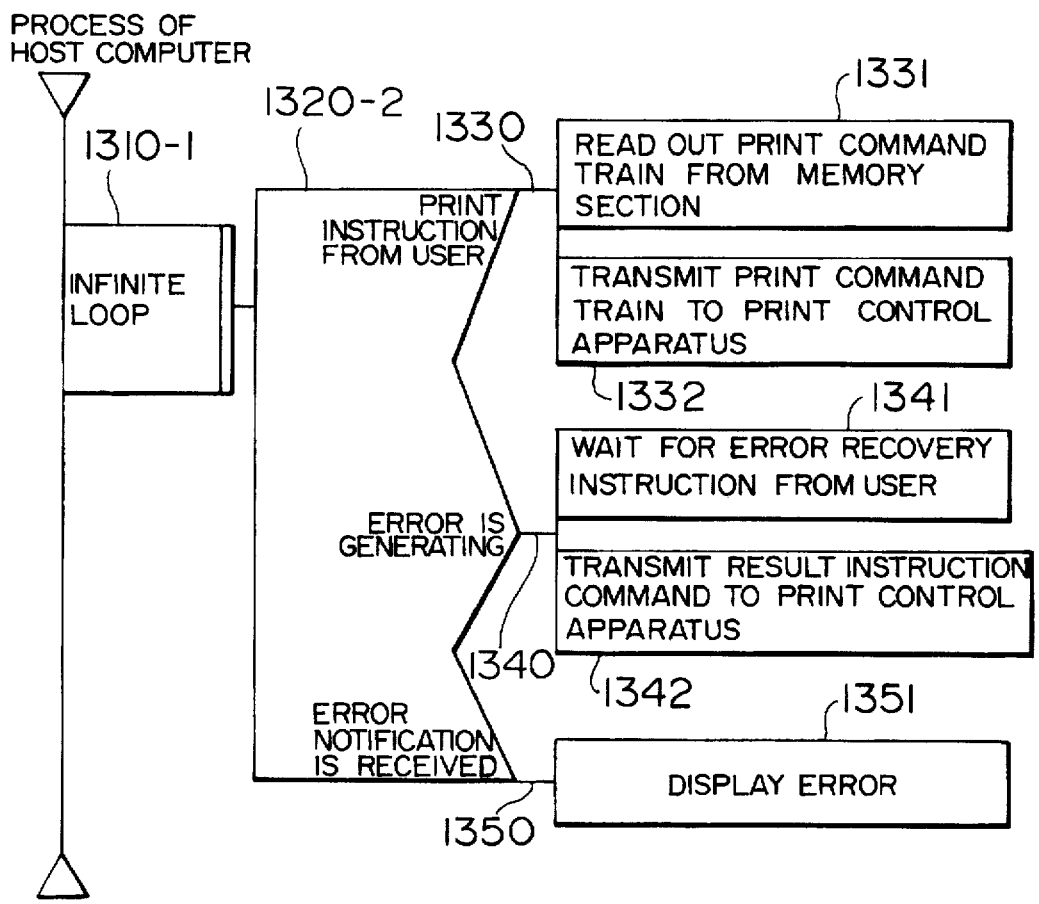
FIG. 13 is a diagram for explaining a processing procedure of a host computer in the invention.

The processing procedure of the host computer 100 is similar to that in case of FIG. 13. The hardware construction of the print control apparatus 1510 is also similar to that in case of FIG. 14.

In the second embodiment, it is sufficient to merely prepare capacity of the page buffer corresponding to the number of pages for one paper and there is no need to prepare the special command buffer dedicated for the error recovery and having the capacity for the maximum number of papers as in the first prior art, so that the C/P (costs to performance) ratio of the print control apparatus can be raised. On the other hand, since the drawing result itself has been preserved in the page buffers, even for the command of the such a type that drawing attribute parameters are handed over between the pages, the print result doesn't differ from the inherent print upon error recovery and the reliability and use efficiency of the print control apparatus can be raised. In addition, the increase in processing burden of the host computer and the modification of the program in the second prior art can be also eliminated. Further, since the command read skipping process in the third prior art can be eliminated, the increase in development program amount of the print control apparatus can be eliminated.

The third embodiment of the invention will now be described.

Figure 23:
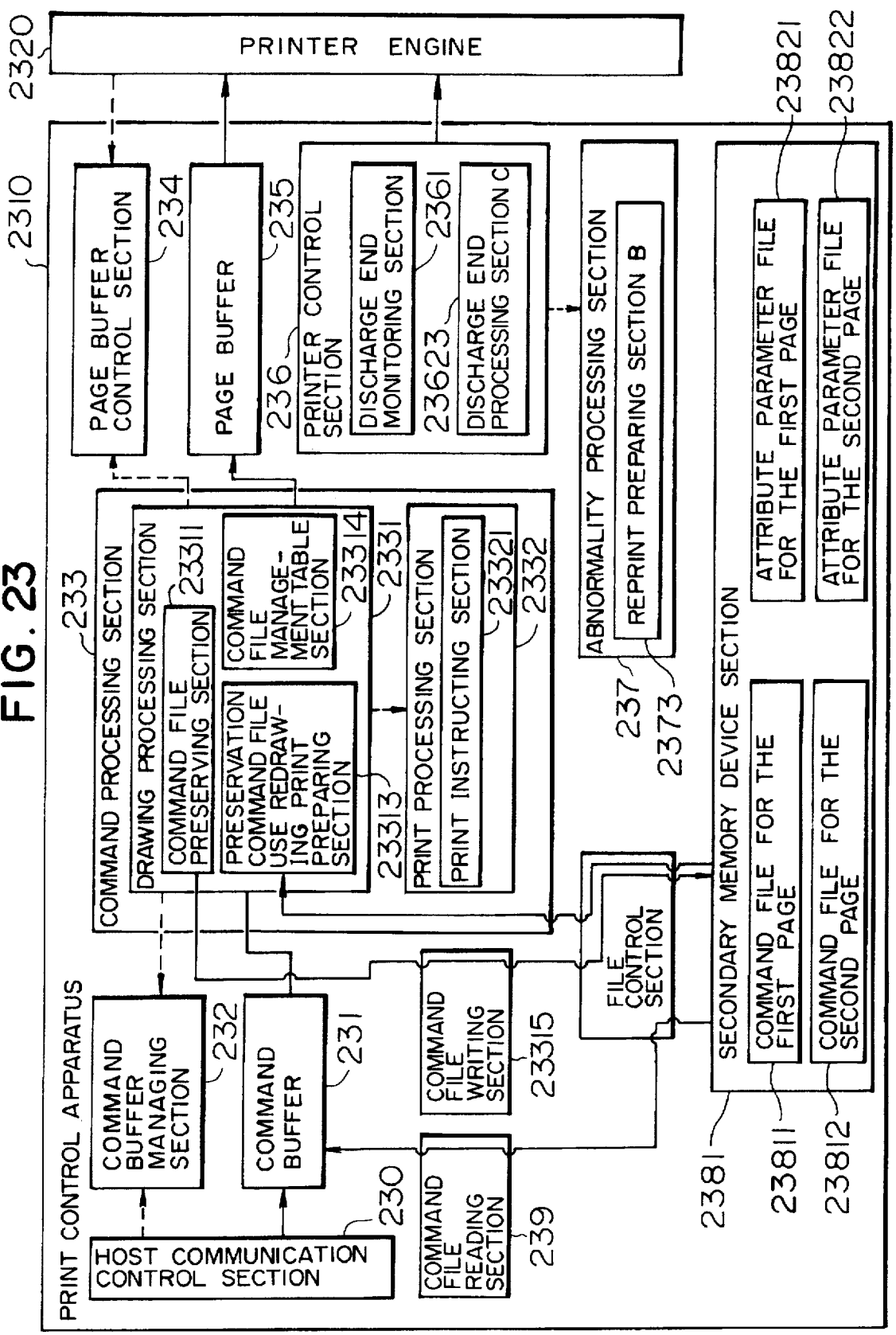
FIG. 23 is a constructional diagram showing the third embodiment of the invention.

A construction of a print control apparatus in the third embodiment will be first explained with reference to a constructional diagram of FIG. 23. A print control apparatus 2310 includes: a host communication control section 230; a command buffer 231; a command buffer managing section 232; a command processing section 233; a page buffer control section 234; a page buffer 235; a printer control section 236; an abnormality processing section 237; a file control section 238; a command file writing section 23315; a command file reading section 239; and a secondary memory device 2381.

The host communication control section 230 and the command buffer managing section 232 execute processes similar to those in the first embodiment (in case of FIG. 1). However, the command buffer discharge queue section 121 in FIG. 1 is not provided in a command buffer management table section of the command buffer managing section 232.

The command processing section 233 includes a drawing processing section 2331 and a print processing section 2332. The drawing processing section 2331 also executes processes similar to those in the first embodiment (in case of FIG. 1) and reads out the command from the command buffer 231 and interprets and executes. When the page changing condition is met during the execution of the command, the drawing of the page is finished and the print processing section 2332 is activated with respect to the page buffer for which the drawing has been performed. A command file preserving section 23311, a preparing section 23313 for using the preserved content of command files to prepare for redrawing/reprint, and a command file management table section 23314 are provided in the drawing processing section 2331. The command file preserving section 23311 preserves the content of the command file for each page and the attribute parameter file at the start of the drawing of each page into the secondary memory device 2381 for preparation of the error recovery by using the command file writing section 23315. The preparing section 23313 prepares for the reprint by using the preserved command files. The command file management table section 23314 receives the command file name and attribute parameter names about each page and describes as a queue according to the order of the pages to be printed in order to manage the command files.

The print processing section 2332 instructs the printer control section 236 to print by using a print instructing section 23321 in a manner similar to the case of the first embodiment. The page buffer control section 234, the page buffer section 235, and the printer control section 236 also execute functions similar to those in case of the first embodiment.

A discharge end monitoring section 2361 and a discharge end processing section C 23623 are provided in the printer control section. The discharge end monitoring section 2361 monitors the end of paper discharge from a printer engine 2320 of the print paper and activates the discharge end processing section C 23623 at a time point of the detection of the end of paper discharge.

The abnormality processing section 237 executes abnormality processes for various kinds of abnormalities detected by respective sections in the print control apparatus 2310. A reprint preparing section B 2373 is provided for the abnormality processing section 237, thereby preparing for the reprint when the error which needs the reprint is detected.

The secondary memory device 2381 has a memory medium such as a magnetic disk, a floppy disk, a semiconductor memory disk, or the like, thereby allowing the command file for each page and the attribute parameter file to be stored into the memory medium.

The file control section 238 controls each file in the secondary memory device 2381. Therefore, supervisor calling interfaces (hereinafter, simply abbreviated to SVC) such as open, close, read, write, and the like are provided to the processes (2331 and 2332) in the command processing section and to the command file reading section 239.

As mentioned above, the command file writing section 23315 writes the command file for each page and the attribute parameter file at the start of the drawing of each page into the secondary memory device 2381. The command file reading section 239 reads out the commands from the preserved command file for each page and stores into the read command buffer section 231 in the recovery process with respect to the error which needs the reprint.

Figure 24:
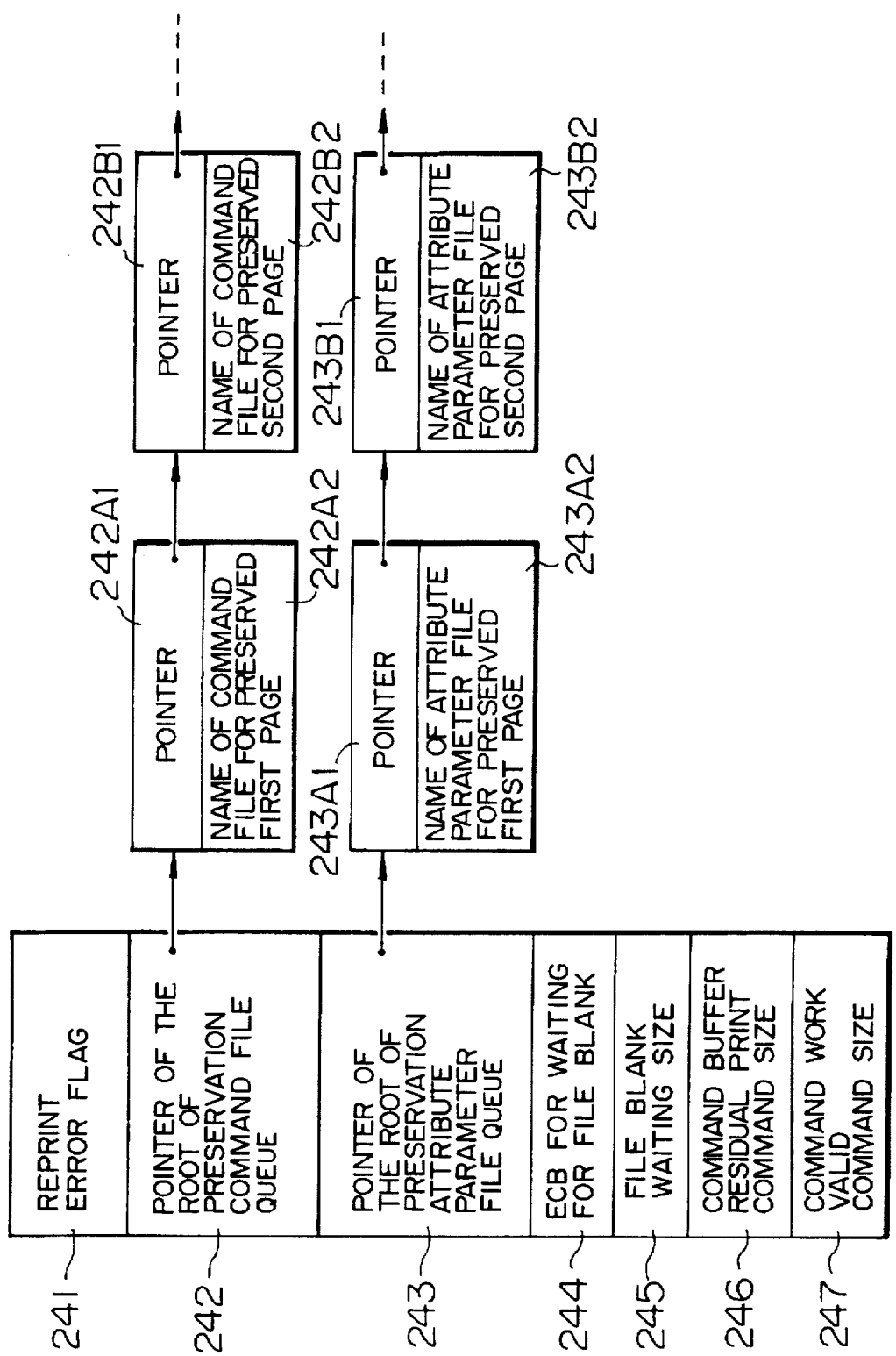
FIG. 24 is a diagram for explaining a command file management table section in the third embodiment of the invention.

The content of the command file management table section 23314 will now be described with reference to FIG. 24. The management table section 23314 includes: a reprint error flag 241; a pointer 242 of the root of a preservation command file queue; a pointer 243 of the root of a preservation attribute parameter file queue; an ECB (abbreviation of Event Control Block) 244 for waiting a file blank; a file blank waiting size 245; a size of print command remaining in the command buffer 246; and a command work valid command size 247. Among them, the reprint error flag 241 has a value of 0 or 1. The value "0" indicates the case where the error which needs the reprint doesn't occur. The value "1" indicates the case where such an error has occurred.

Names (242A2, 242B2, etc.) of the command files in which the preserved commands about each page have been stored are described as the preservation command file queue in the order of the pages which are received and printed. On the other hand, names (243A2, 243B2, etc.) of the attribute parameter files in which the preservation attribute parameters regarding each page have been preserved are described as the preservation attribute parameter file queue in the order of the pages which are received and printed.

The command file writing section 23315 executes a writing process into the files for preparation of the error recovery. The ECB 244 for waiting the file blank mentioned above is provided in order to set the command file writing processing section into the file blank waiting state in the case of exceeding a limit value for writing and preserving in the writing process and to control the release from such a waiting state in the case where an enough blank has yielded in the file for preservation.

Figure 37:
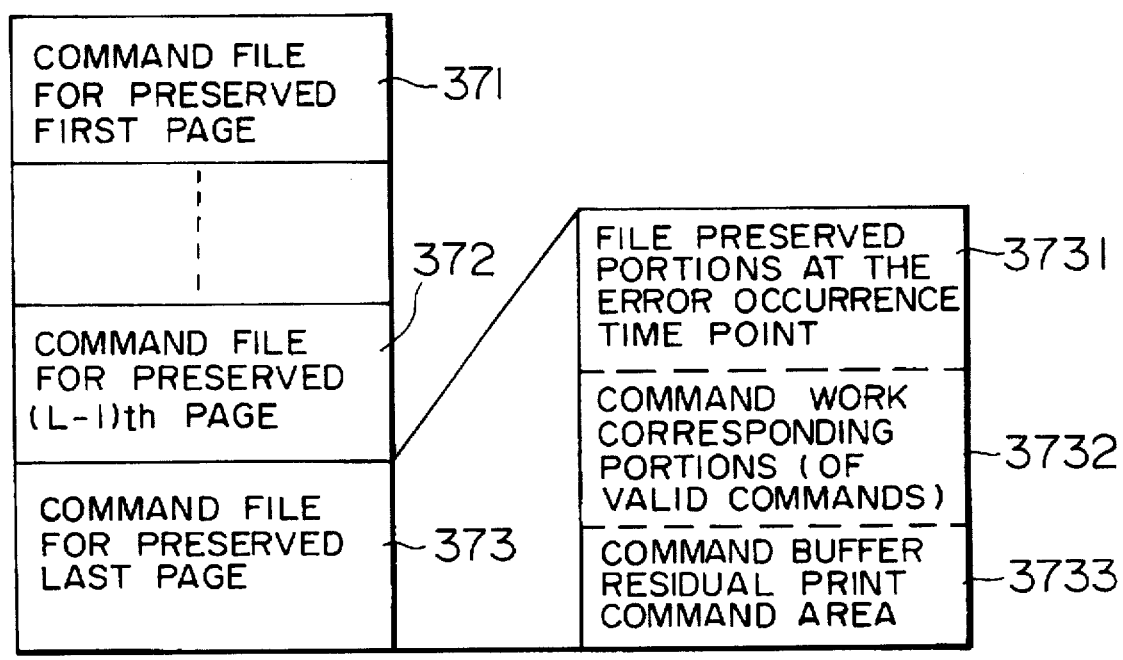
FIG. 37 is a diagram for explaining a preserving state of each page correspondence command data into a file in the third embodiment of the invention.

The file blank waiting size 245 is an area to describe the blank size to be waited for in the above file blank waiting state. The print command size 246 and the command work valid command size 247 are areas to describe the capacities of a portion 3733 and a portion 3732 in FIG. 37, which will be explained hereinlater.

Figure 25:
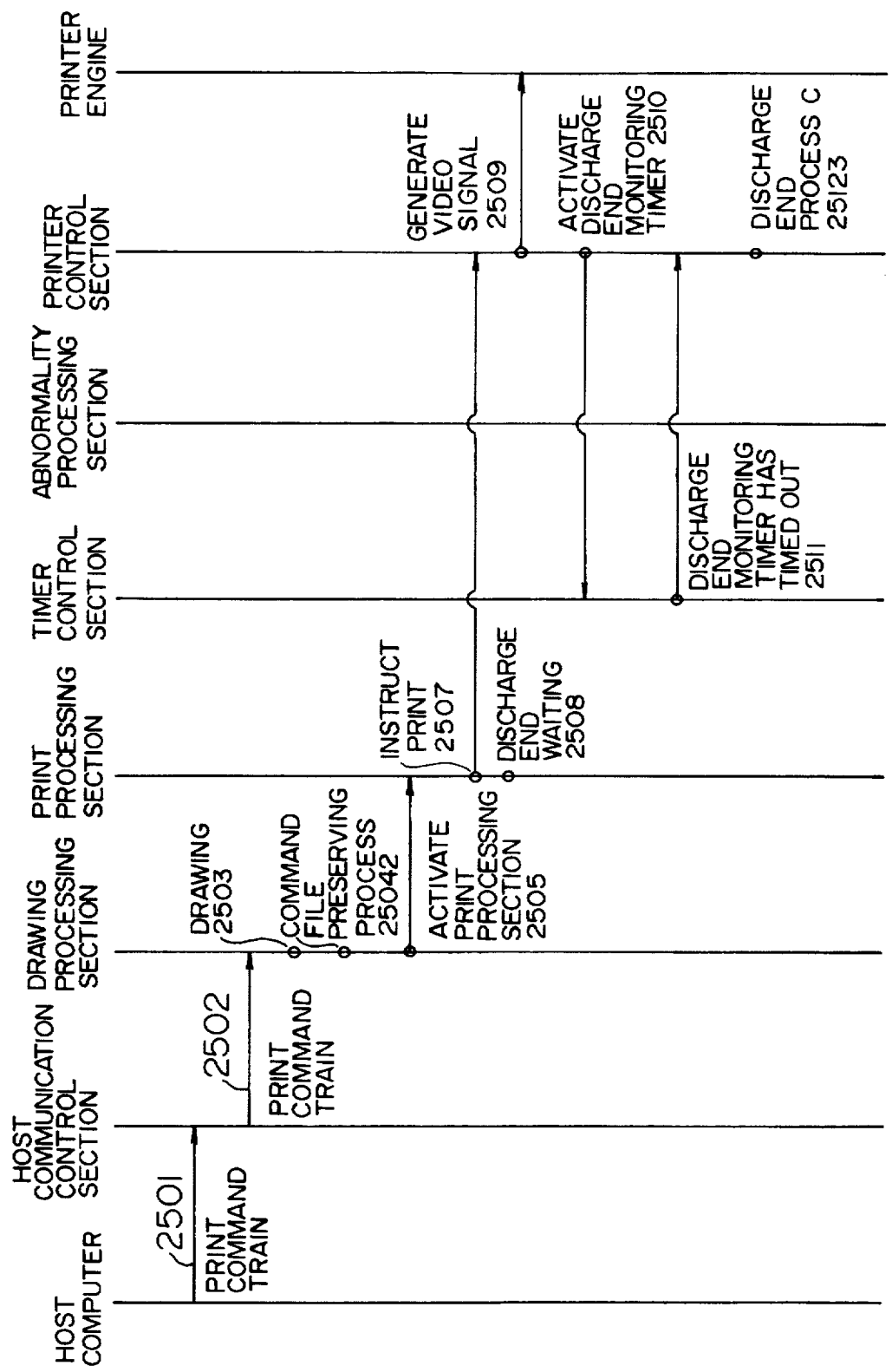
FIG. 25 is a diagram for explaining an operating procedure in a normal state in the third embodiment of the invention.

The operating procedure in the normal state of the print control apparatus will now be described with reference to FIG. 25.

The procedures from the reception and storage (2501) of the print command train to the drawing (2503) are the same as those in case of the first embodiment (FIG. 3). Thereafter, in the embodiment, in place of the command buffer preserving process (3041), the command file preserving process (25042) is executed and the print processing section is activated (2505). Thereafter, the processes from the generation (2507) of the print instruction to the printer control section 236 by the print processing section 2332 to the updating (2514) of the print end page number are executed in accordance with substantially the same procedure as that in case of the first embodiment (FIG. 3) except that the discharge end process C 25123 is executed in place of the discharge end process A (3121) in FIG. 3 by the printer control section 236.

In the discharge end process C 25123, the substances and names of the command files for the preserved head page are respectively deleted from the secondary memory device 2381 and the command file management table section 23314 with reference to the command file management table section 23314. Further, the substances and names of the attribute parameter files for the preserved head page are also deleted from the secondary memory device 2381 and the command file management table section 23314. Then, in the discharge end process C (25123), a check is made to see if the command file writing section 23315 is in the file blank waiting state or not. If YES, a check is made to see if the blanks as much as the file blank waiting size 245 have yielded by the above deletion or not. If YES, the command file writing section 23315 is released from the foregoing file blank waiting state.

Figure 4:
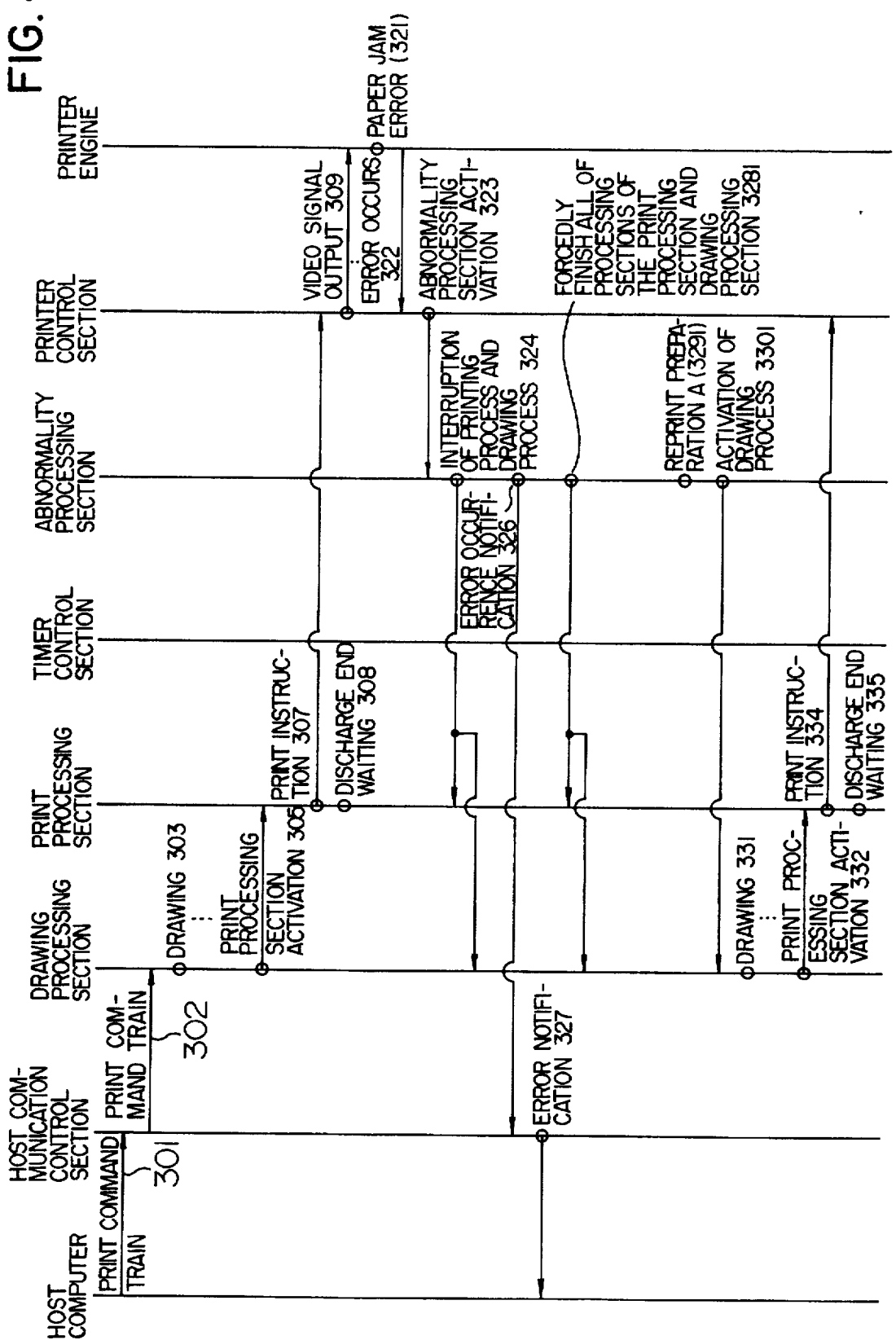
FIG. 4 is a diagram for explaining an operating procedure in an abnormal state in the first and third embodiments of the invention.

The operating procedure in the abnormal state of the print control apparatus is similar to that in case of FIG. 4 except that the reprint preparation B (not shown) is executed in place of the reprint preparation A (3291) in FIG. 4. In the reprint preparation B, a check is made to see if the command files in which the paper discharge is not completed yet have been preserved in the command files or not, by discriminating whether the foregoing preservation command file queue is blank or not. If YES, the reprint error flag is set to ON and then the command file writing section 23315 is activated in the writing mode 3. The writing mode is an input mode to select and instruct the file writing content by the command file writing section 23315 upon activation of the above processing procedure and will be explained hereinlater with reference to FIGS. 29 and 30.

The embodiment can be also realized as an expanded function to the invention which has already been filed in a manner similar to the case of the first embodiment. That is, the processes of the drawing processing section and the print processing section can be set to a multi task construction and can be also executed in a concurrent or parallel manner. In this case, the component elements in FIG. 23 are made correspond to the component elements in FIG. 26 in a manner similar to the case of the first embodiment. In the embodiment, the following processes to make correspond are further executed.

(1) File control section 238→file control section 26121

(2) Secondary memory device 2381→secondary memory device 26122

(3) Command file writing section 23315→command file write task processing section 26134

(4) Command file reading section 239→command file read task processing section 26133

According to the above realizing method, since the CPU, the printer engine and the page buffer (can be also constructed by a plurality of pages) can be used without an idle time, the print throughputs in the normal state and upon error recovery can be improved and the print at the highest speed of the printer engine can be realized.

Figure 26:
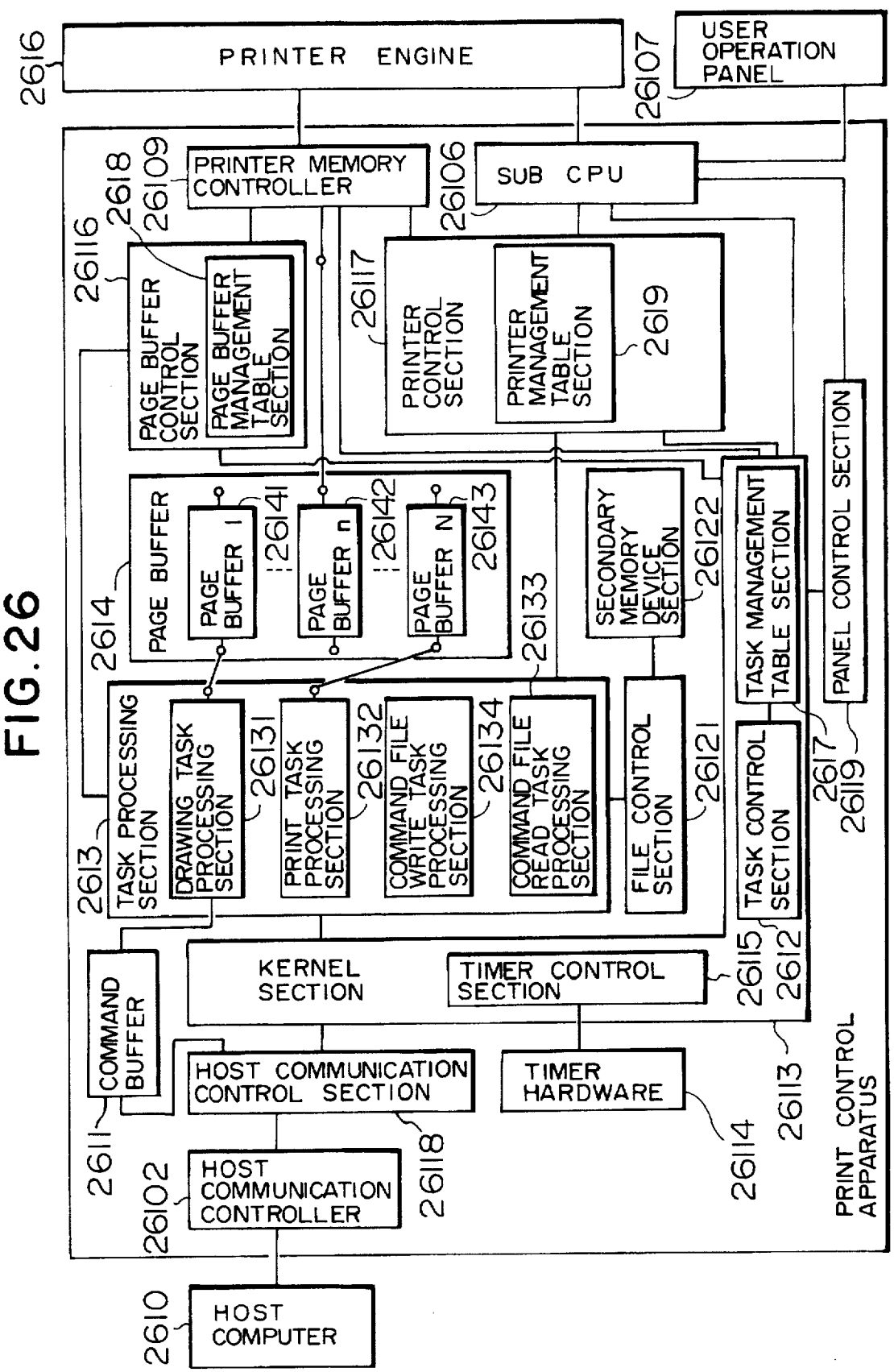
FIG. 26 is a constructional diagram in case of applying a multi task control method in the third embodiment of the invention.

A processing procedure of each section of the print control apparatus will now be described with reference to FIGS. 27 to 37. Although the case where the print control apparatus is set to the multi task configuration as shown in FIG. 26 will be described, the invention can be also similarly realized with respect to the case of the configuration of FIG. 23. In the description, each processing section is written like the drawing task processing section 26131 (drawing processing section 2331). That is, first, the processing section in case of FIG. 26 having the multi task construction is written and the processing section in case of FIG. 23 is written in the parentheses.

Figure 27:
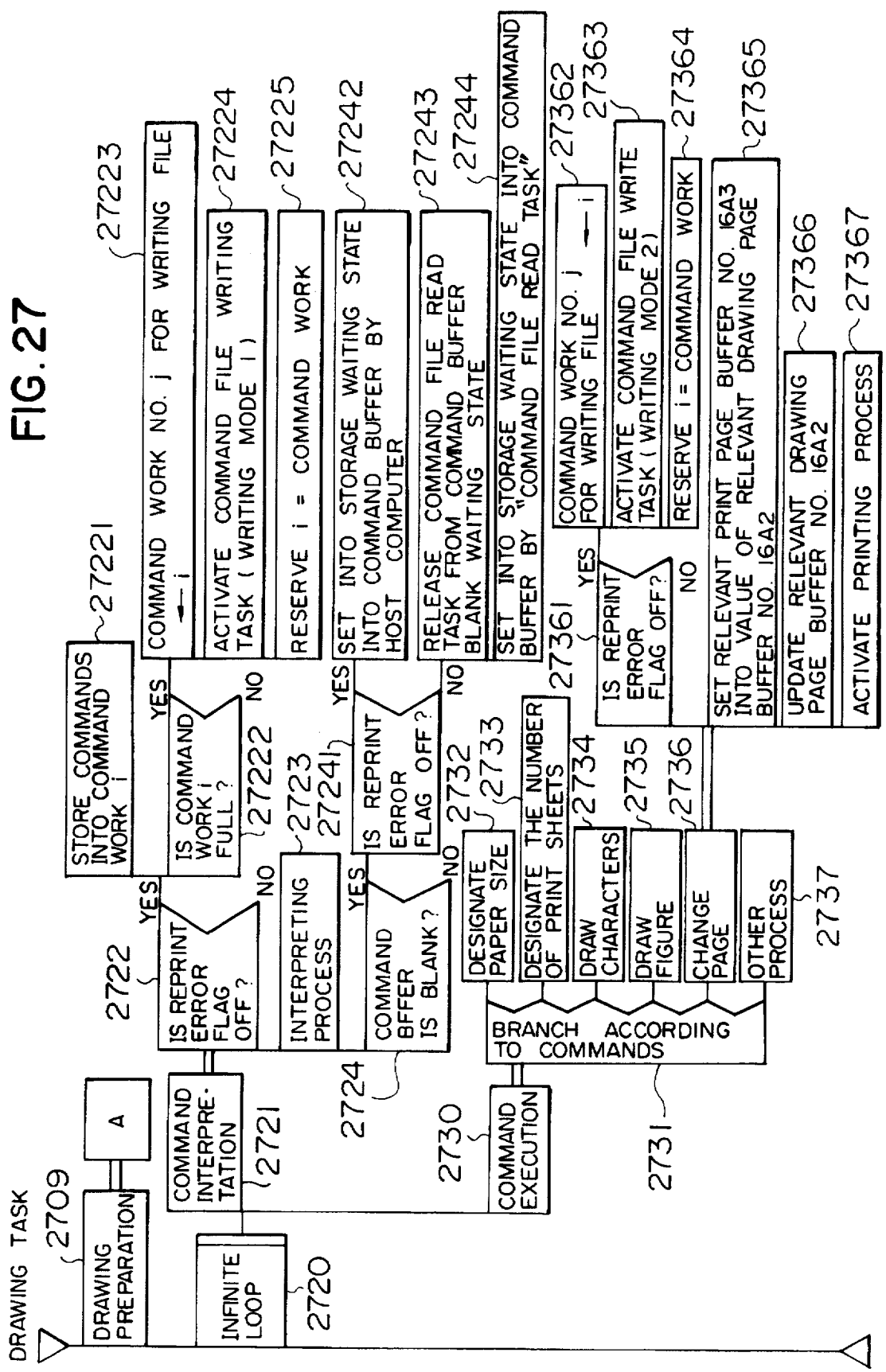
FIGS. 27, 28, and 29 are diagrams for explaining a processing procedure of each section of a print control apparatus in the third embodiment of the invention.
Figure 28:
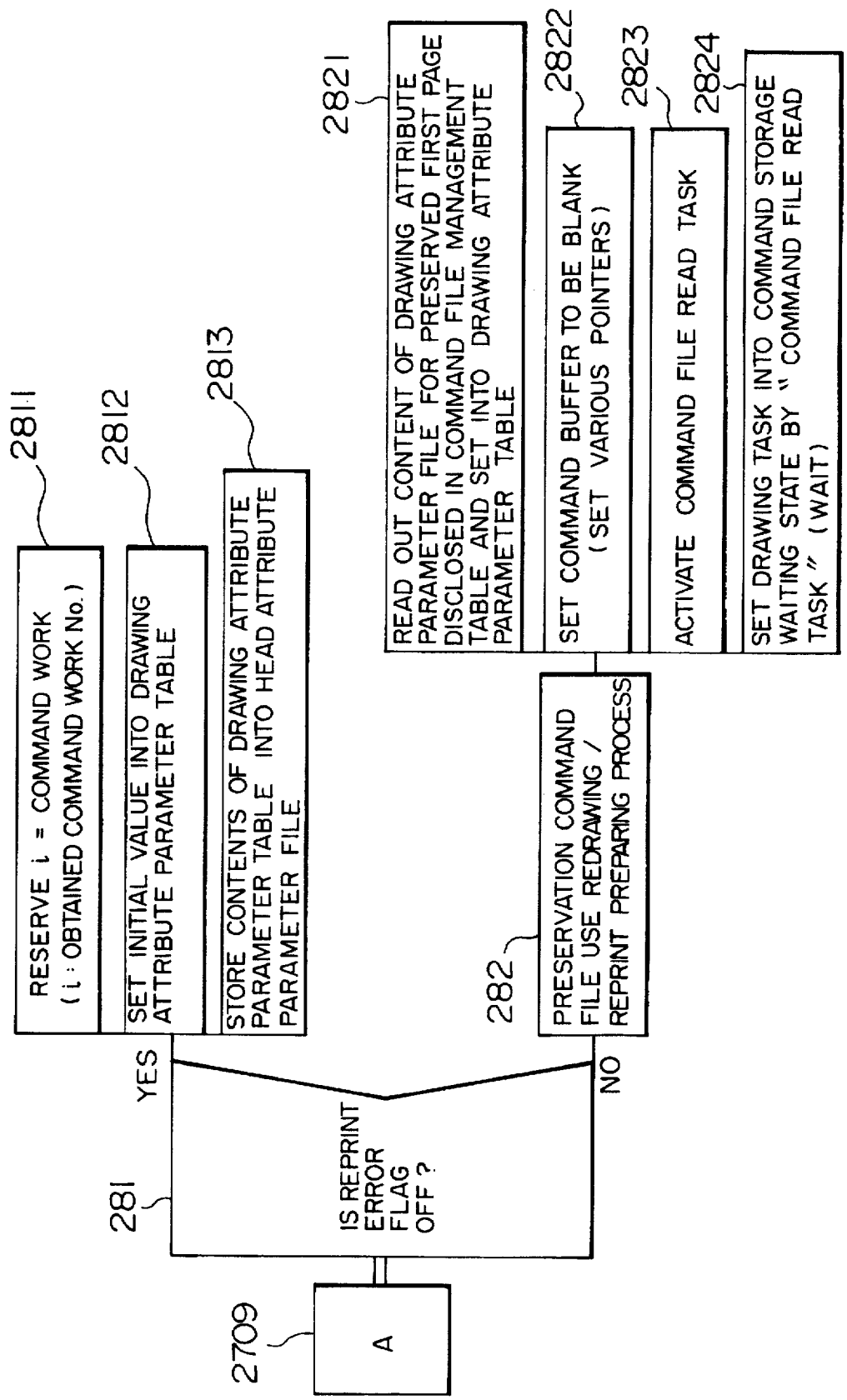

The processing procedure of the drawing task processing section 26131 (drawing processing section 2331) will be first described with reference to FIGS. 27 and 28. First, the initialization and the like of various kinds of parameters for drawing are executed by the drawing preparation (2709). In the drawing preparation (2709), as shown in FIG. 28, a check is made to see if the reprint error flag 241 is OFF or not (281). If it is OFF, the following three items are executed.

(1) The command work is obtained by using the command work reserving function. The obtained command work number is set to i. The command work indicates a buffer memory to assist the storage of the commands to the file and will be explained hereinlater with reference to FIG. 27 (2811).

(2) The initial values are set into the drawing attribute parameter table to describe various kinds of parameters for drawing (2812).

(3) The attribute parameter file for the first page of a document is formed and stored. As a content of the attribute parameter file for the first page, the content of the drawing attribute parameter table is stored (2813).

When the reprint error flag 241 is ON, the following four items are executed as a process for using preserved command file to prepare redrawing/reprint by the preparing section 23313 (282).

(1) The content of the file of the attribute parameter file name (243A2) for the preserved first page disclosed in the command file management table section is read out from 23821 within the secondary memory device 2381 and is set as a value of the drawing attribute parameter table in the drawing task processing section 26131 (drawing processing section 2331) (2821).

(2) The command buffer 231 is set into the blank state. Actually, the content is not cleared to 0 but the various pointers (23 to 26 and the like) are merely reset (2822).

(3) The processes by the command file read task processing section 26133 (command file reading section 239) are activated (2823).

(4) The processes of the drawing task processing section 26131 (drawing processing section 2331) are set into the command buffer storage waiting state by the command file read task processing section 26133 (command file reading section 239) (2824).

In the processing steps 2823 and 2824, a task priority of the command file read task processing section 26133 is set to the same priority as that of the drawing task processing section 26131. This is because after the command file read task was activated, the drawing task is set into the command storage waiting state, thereby subsequently allowing the command file read task to be executed. As an execution control method of the task using the task priority, a method similar to that disclosed in the invention which has already been filed is used.

In a manner similar to the case of the first embodiment, after completion of the drawing preparation, the interpretation of the command (2721) and the execution of the command (2730) are repeated as drawing processes through an endless loop (2720). In the embodiment, in the command interpretation (2721), the commands are sequentially stored into the command work area from the command buffer. When a predetermined amount of commands are stored in the command work area, the contents of the command work area are sequentially stored into the command file by using the command file preserving section 23311 of the drawing task processing section 26131 (drawing processing section 2331). The command file is stored as individual file with respect to each page of the document in the following manner as will be explained in detail hereinlater. First, a check is made to see if the reprint error flag 241 is OFF or not (2722). If YES, the commands are stored into a command work area i from the command buffer (27221). A check is made to see if the command work area i is full or not (27222). If YES, the following three items are executed.

(1) The command work area number j for writing the file is set into i as the command work area number which has been obtained just before (27223).

(2) The processes by the command file write task processing section 26134 (command file writing section 23315) are activated in the writing mode 1 (27224).

(3) The command work area is obtained by using the command work area reserving function and the derived command work area number is set to i (27225).

After completion of the processes 2722 to 27225, in a manner similar to the case of the first embodiment, the drawing task processing section 26131 (drawing processing section 2331) executes the interpreting process of the command (2723). After completion of the interpreting process 2723, a check is made to see if the command buffer is blank or not (2724). If YES, a check is made to see if the reprint error flag 241 is OFF or not (27241). If YES, namely, when the error which needs the reprint doesn't occur yet, the drawing task processing section 26131 (drawing processing section 2331) is set into the command buffer storage waiting state by the host computer 2610 (27242). When the reprint error flag 241 is ON, that is, when the error which needs the reprint has occurred and the apparatus is in the error recovery mode using the preserved file content, the command file read task processing section 26133 (command file reading section 239) is released from the command file blank waiting state (27243). Thereafter, the drawing task processing section 26131 (drawing processing section 2331) is set into the command buffer storage waiting state by the command file read task processing section 26133 (command file reading section 239) (27244). Thereafter, in a manner similar to the case of the first embodiment, the drawing task processing section 26131 (drawing processing section 2331) executes the command (2730). In the embodiment, the command buffer preserving process (636-3) provided in the first embodiment is deleted from the page changing procedure (2736). In place of the command buffer preserving process, as shown in FIG. 27, a check is made to see if the reprint error flag 241 is OFF or not (27361). If YES, the following three items are executed.

(1) The command work area number j for writing the file is set into i as the command work area number which has been obtained just before (27362).

(2) The command file write task processing section 26134 (command file writing section 23315) is activated in the writing mode 2 (27363).

(3) The command work area is obtained by using the command work area reserving function and the derived command work area number is set to i (27364).

Figure 7:
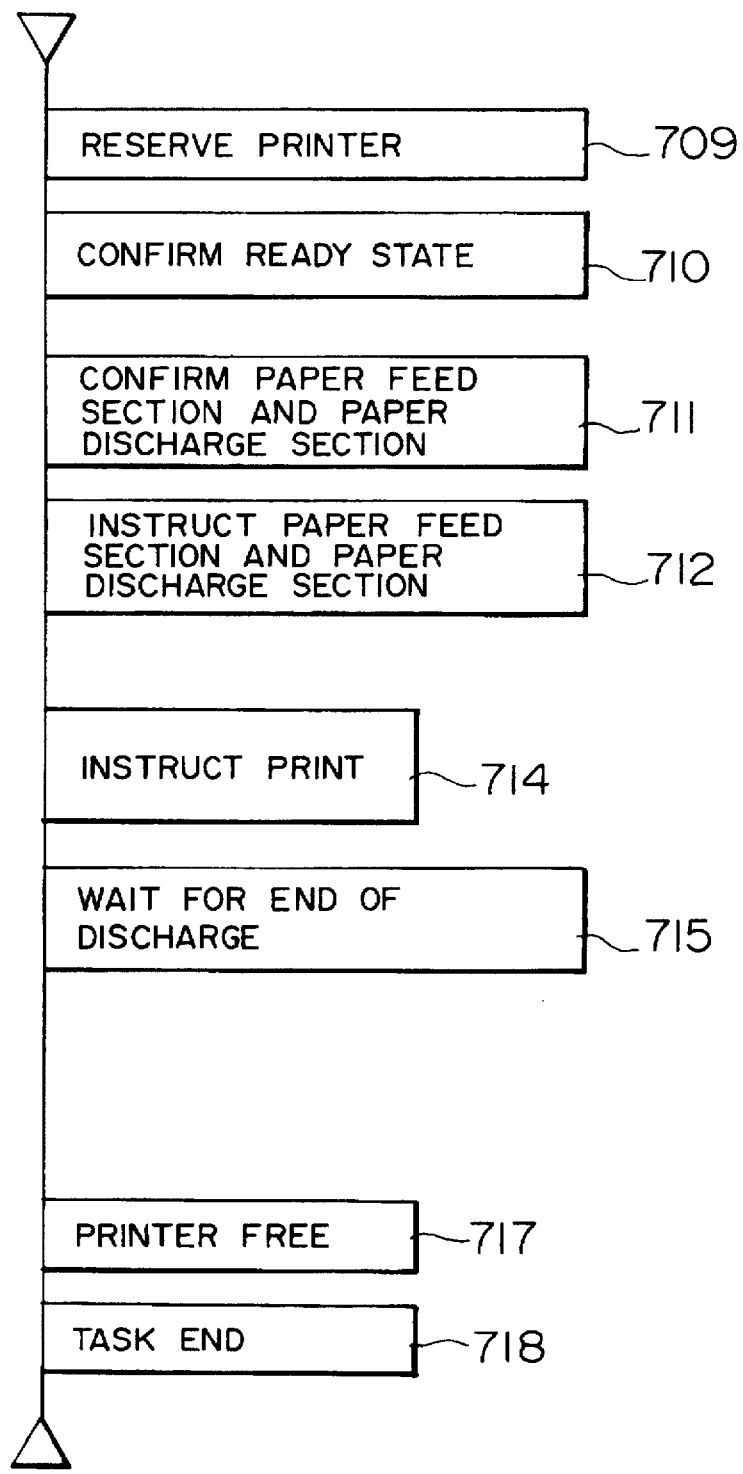
Figure 8:
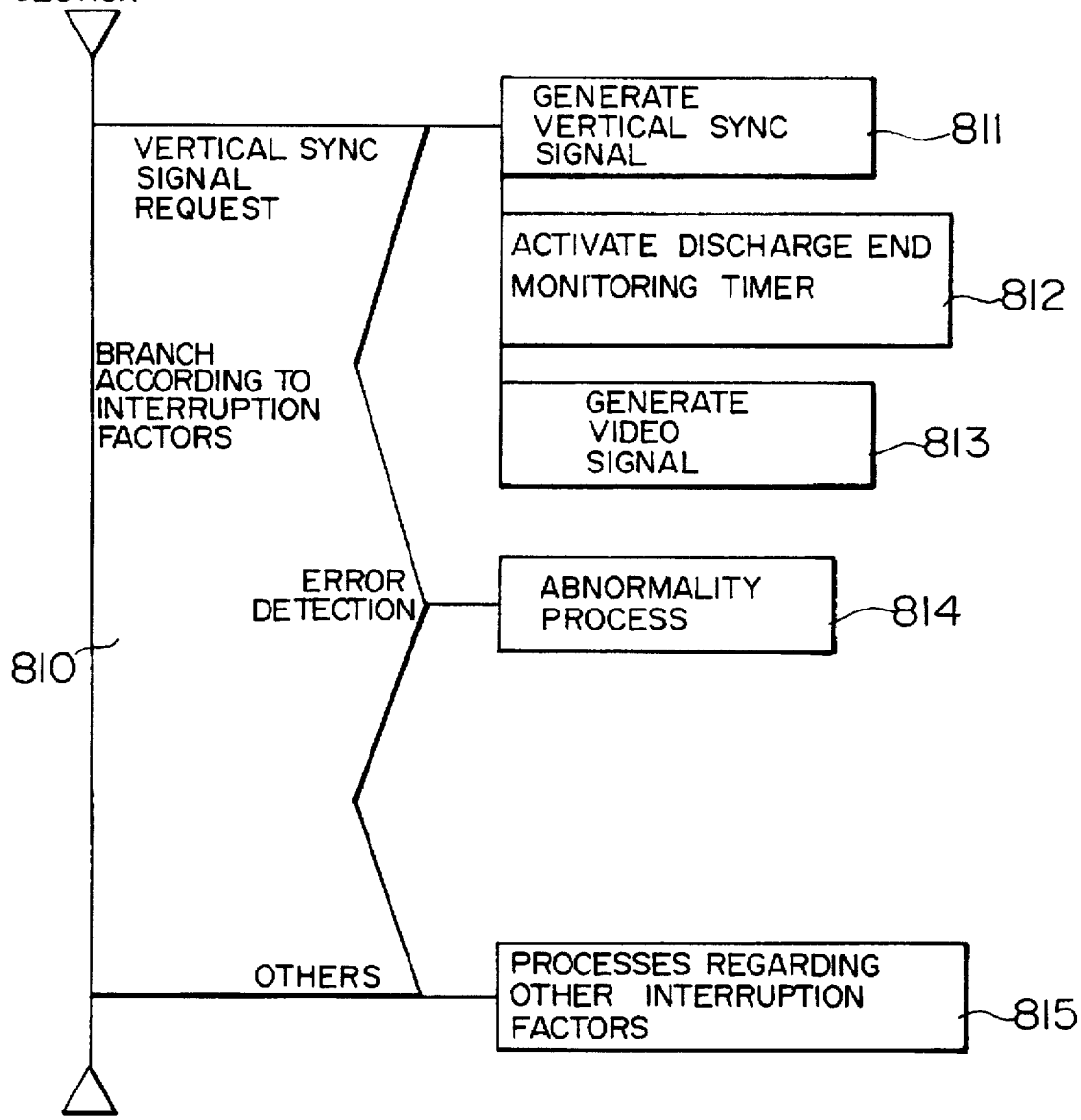

The processing procedure of the print task processing section 26132 (print processing section 2332) and the interrupting processing procedure by the printer control section 236 are substantially the same as those in FIGS. 7 and 8 shown in the first embodiment, respectively. The processing procedure in the timer control section is similar to that in case of FIG. 9 except a point that the discharge end process C is activated in place of the discharge end process A (914 in FIG. 9) when the discharge end monitoring timer has timed out.

Figure 29:
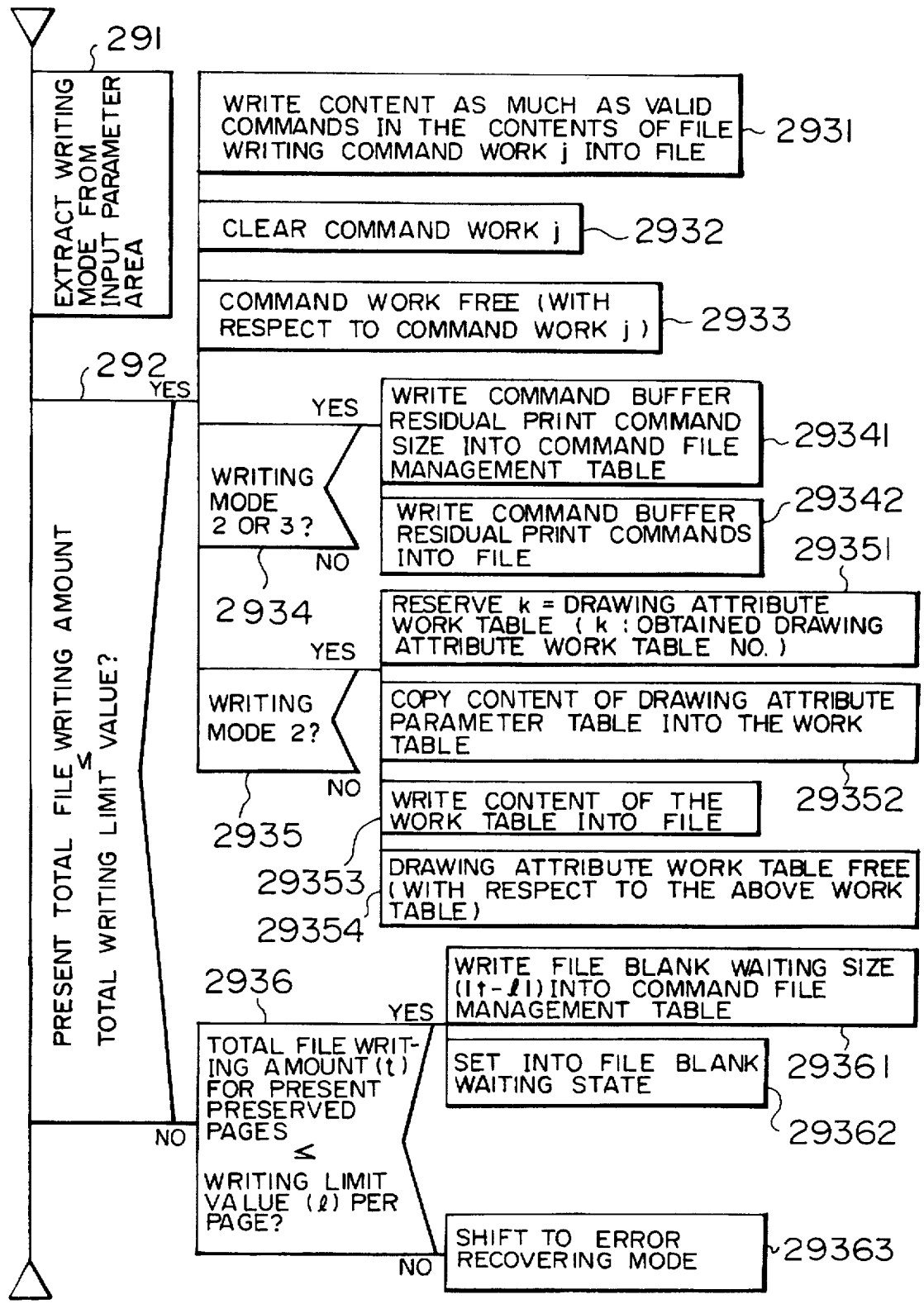

The processing procedure of the command file write task processing section 26134 (command file writing section 23315) will now be described with reference to FIG. 29.

(1) The writing mode is taken out from the input parameter area (291).

Figures 30, 31:
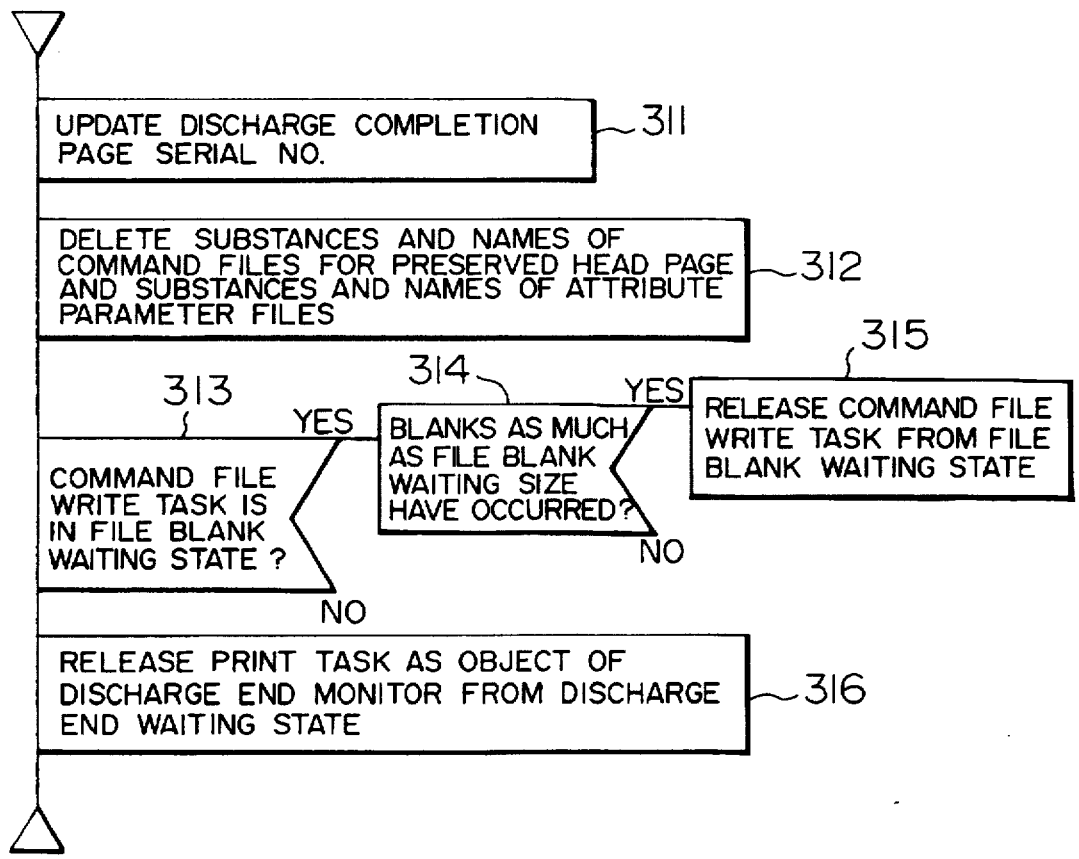
FIG. 30 is a diagram showing the relation between the writing mode and the current total file writing amount in the third embodiment of the invention.
FIGS. 31, 32, 33, 34, 35, and 36 are diagrams for explaining a processing procedure of each section of the print control apparatus in the third embodiment of the invention.

(2) A check is made to see if the current total file writing amount which is determined as shown in FIG. 30 in accordance with the writing mode is equal to the write total limit value or less or not (292). If YES, the process shown in the following item (3) is executed. If NO, the process shown in the following item (4) is executed.

(3) [In the case where the current total file writing amount is equal to or less than the write total limit value]

The following processes (3-1) to (3-3) are executed as processes which are common to the writing modes 1 to 3. In the command work area, the valid amount of command work area in which the commands have been stored is written into the file.

(3-1) In the content of the command work area j for writing the file, only the valid amount of command work area in which the commands have been stored is written into the file by using the foregoing write SVC (2931).

(3-2) The content of the command work area j is cleared to 0 (2932).

(3-3) The command work area j is released by using the command work area free function (2933).

(3-4) In the writing mode 2 or 3, the processes (3-4-1) to (3-4-2) are executed and the commands of the amount which are not yet read out to the command work area in the command buffer (hereinafter, simply referred to command buffer remaining print commands) are written into the file. The size of (3-4-1) command buffer remaining print commands is written into the relevant item 246 in the command file management table section 23314 (29341).

(3-4-2) The command buffer remaining print commands are written into the file (29342).

(3-5) Subsequently, a check is made to see if the writing mode is set to 2 or not (2935). In the writing mode 2, the processes (3-5-1) to (3-5-4) are executed and the content in the drawing attribute parameter table is written into the file.

(3-5-1) The drawing attribute work table is obtained by using the drawing attribute work table reserving function. The derived drawing attribute work table number assumes k. The drawing attribute work table is a buffer memory to assist the storage of the drawing attribute parameter table into the file. Two drawing attribute work tables are prepared here and when data is written into one of the drawing attribute work tables, the data is read out from the other table, thereby enabling the writing and reading operations to be processed in parallel (29351).

(3-5-2) The contents of the drawing attribute parameter tables are copied to the obtained drawing attribute work table k (29352).

(3-5-3) The content of the drawing attribute work table k is written into the file by using the foregoing write SVC (29353).

(3-5-4) The drawing attribute work table k is released by using the drawing attribute work table free function (29354).

(4) [In the case where the current total file writing amount is larger than the total writing limit value]

A check is made to see if a total file writing amount t with respect to the currently preserved pages is equal to or less than the writing limit value 1 per page or not (2936). If YES, the following items (4-1) and (4-2) are executed. If NO, the item (4-3) is executed.

(4-1) As a file blank waiting size, the absolute value of the difference between the above total file writing amount t and the writing limit value 1 per page is written into the relevant item 245 in the command file management table section 23314 (29361).

(4-2) The command file write task processing section 26134 (command file writing section 23315) is set into the file blank waiting state. The setting into such a waiting state and the subsequent release are controlled by using the ECB 244 for waiting the file blank (29362).

(4-3) The error recovering mode is set into another mode from the command file preservation error recovering mode (29363).

The setting to the error recovering mode is executed in the following manner.

(1) With respect to the pages which have been preserved before the file becomes full, the error recovery is executed by using the contents of the preserved files and by using the procedure described so far in the embodiment and the reprint is executed. After completion of the error recovery using the preserved files, the mode is set into the error recovering mode shown at 29363.

(2) The error recovering mode is shifted to either one of (i) the error recovering mode using the main memory such as page buffer preservation error recovering mode, command preservation error recovering mode, or the like, (ii) the error recovering mode using the command retransmission from the host computer, and (iii) the error non-recovering mode.

(3) In a print control apparatus such that the writing limit value 1 per page mentioned above is small and the occurrence probability of the shift to the error recovering mode is large, the mode is set into the mode (i) or (ii). In a print control apparatus such that the writing limit value 1 per page is large and the occurrence probability of the shift to the error recovering mode is very small, the mode is set into the mode (iii).

(4) At a time point when the print control apparatus confirms the completion of the paper discharge with regard to all of the print command trains received from the host computer or one head document among them, the mode is returned from the error recovering mode after it was shifted to either one of the modes (i) to (iii) to the error recovering mode before the mode shift using the preserved files.

The mode shift can be also performed among following arbitrary error recovering modes described above.

(a) Command buffer preservation error recovering mode
(b) Page buffer preservation error recovering mode
(c) Command file preservation error recovering mode
(d) Error recovering mode using the foregoing drawing image file preserving method (e) Error non-recovering mode The processing procedure of the discharge end process C will now be described with reference to FIG. 31. In the processing procedure, after the serial number of the page in which the paper discharge had been completed was updated (311), the substances and names of the command files for the preserved head page are respectively deleted from the secondary memory device 2381 and the command file management table section 23314 with reference to the command file management table section 23314. Further, the substances and names of the attribute parameter files for the preserved head page are also deleted from the secondary memory device 2381 and the command file management table section 23314 (312). Thereafter, a check is made to see if the command file write task processing section 26134 is in the file blank waiting state or not (313). If YES, a check is made to see if the blank for the file blank waiting size 245 has occurred by the above file deletion 312 or not (314). If YES, the command file write task processing section 26134 is released from the foregoing file blank writing state (315). Subsequently, the print task which has activated the discharge end monitor is released from the discharge end writing state (316).

Figure 32:
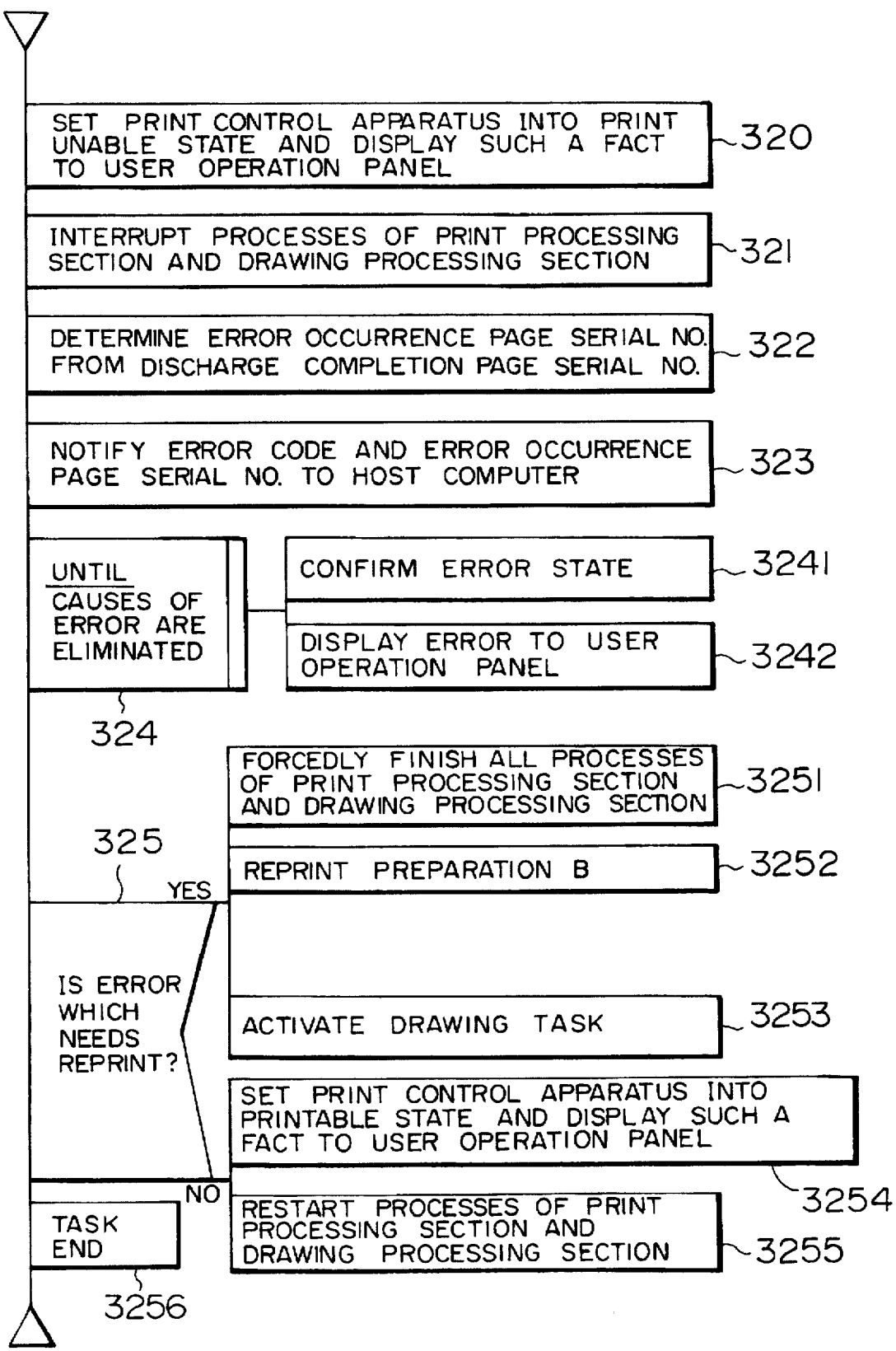

The processing procedure of the abnormality processing section 237 will now be described with reference to FIG. 32. The confirmation of the printer error state (3241) and the display of the confirmed error to the user operation panel section 26107 (3242) after the process (320) to set the print control apparatus to the print disable state and the like until the causes of the errors are eliminated are substantially the same as those in case of the first embodiment. Subsequently, the abnormality processing section 237 executes the following processes.

(1) A check is made to see if the detected error is one such as paper jam or printer door open during the printing operation which needs the reprint or not (325). If YES, the following processes are executed.

(1-1) All of the processes of the print task processing section 26132 (print processing section 2332) and the drawing task processing section 26131 (drawing processing section 2331) are forcedly finished (3251).

Figure 33:
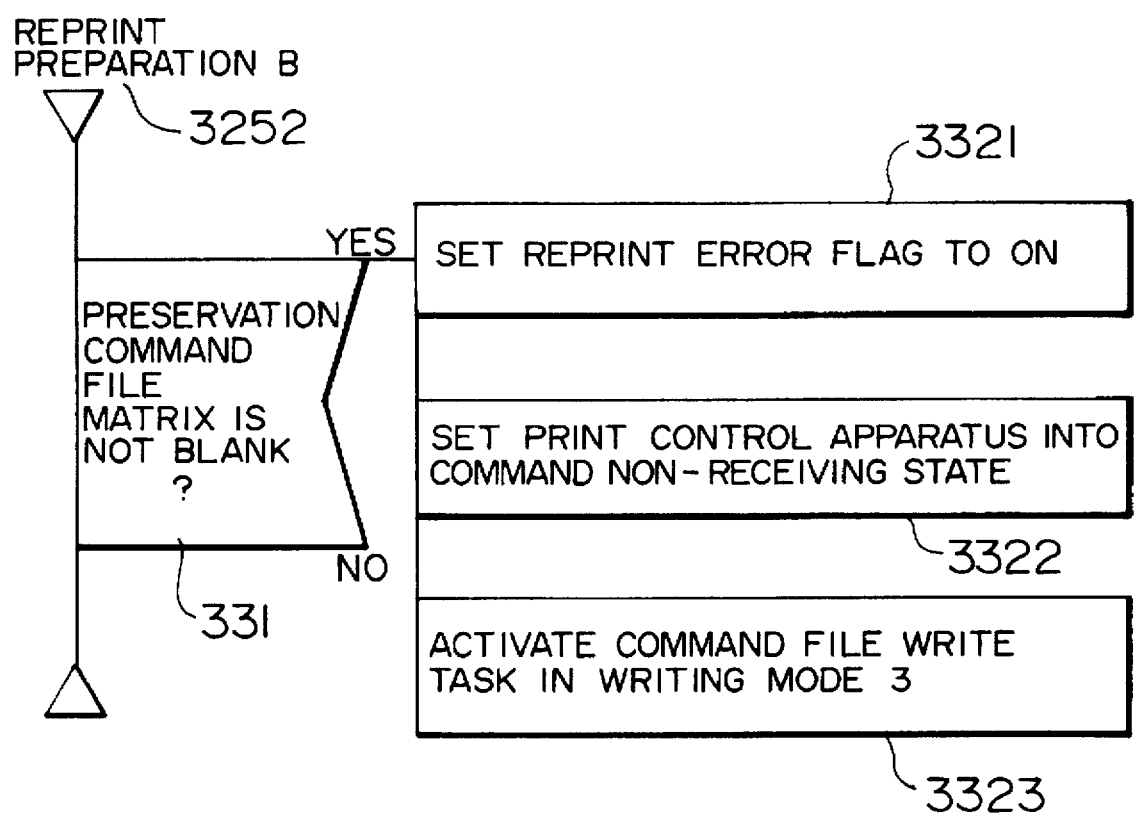
Figure 34:
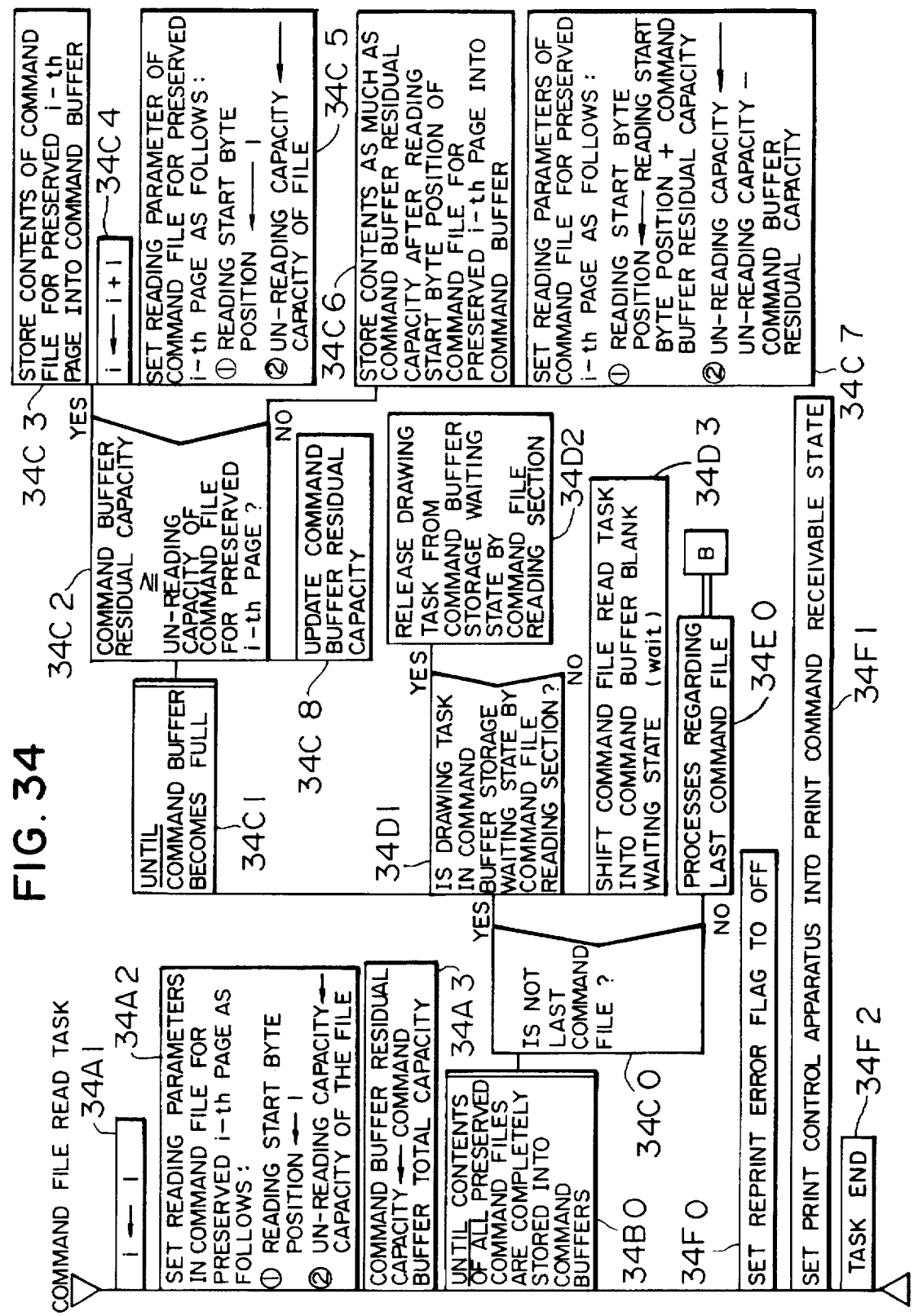

(1-2) The reprint preparation B is executed (3252). In the reprint preparation B, as shown in FIG. 33, a check is made to see if the commands in which the paper discharge is not completed yet have been preserved as command files or not by discriminating whether the preservation command file matrix is not blank or not (331). If they have been preserved, the reprint error flag is set to ON (3321) and the print control apparatus is set into the command non-receiving state (3322). Thereafter, the command file write task processing section 26134 (command file writing section 23315) is activated in the writing mode 3 (3323).

(1-3) Then, the drawing task processing section 26131 (drawing processing section 2331) is activated (3253). As described before, in the activated drawing task processing section 26131, since the reprint error flag has already been set to ON in step 3321, the process 282 for using the preserved command file to prepare redrawing/reprint as shown in FIG. 28 is executed.

(2) When the detected error is not one which needs the reprint, the following processes are executed.

(2-1) The print control apparatuses 2310 and 2610 are set into the printable state (online) and such a fact is displayed on the user operation panel section 26107 (3254).

(2-2) The processes of the print processing section 2332 and the drawing processing section 2331 are restarted (3255).

(3) The task end is generated (3256). The task end is needed in case of realizing the print control apparatus by the multi task configuration.

The processing procedure of the command file read task processing section 26133 (command file reading section 239) will now be described with reference to FIGS. 34 to 37.

(1) In the processing procedure, the following processes are first executed as a pre-process.

(a) "1" is set into the variable i (34A1).

(b) Two parameters as parameters to read the command file for the preserved first page are set as follows (34A2).

(b-1) "1" is set into the read start byte position.

(b-2) The capacity not yet read out is set to the capacity of the file.

(c) The command buffer remaining capacity is set into the command buffer total capacity (34A3).

(2) The following processes are repeated until the contents of all of the preserved command files are completely stored into the command buffer 231 (34B0).

(2-1) A check is made to see if the command file is not the final command file (files 371 to 372 in FIG. 37) or not. When the file is not the final command file, the following processes are executed (34C0).

(a) The following processes are repeated until the command buffer 231 becomes full (34C1).

(a-1) A check is made to see if the command buffer remaining capacity is equal to or larger than the capacity not yet read out of the command file for the i-th preserved page or not (34C2).

(a-2) If YES, the following processes are executed.

(a-2-1) The content of the command file for the i-th preserved page is stored into the command buffer 231 (34C3).

(a-2-2) "1" is added to i (34C4).

(a-2-3) Two parameters as parameters to read out the command file for the i-th preserved page are set as follows (34C5).

(a-2-3-1) "1" is set into the read start byte position.

(a-2-3-2) The capacity not yet read out is set to the capacity of the file.

(a-3) When the command buffer remaining capacity is smaller than the capacity not yet read out in the discriminating step 34C2, the following processes are executed.

(a-3-1) The contents as much as the command buffer remaining capacity after the read start byte position of the command file for the i-th preserved page are stored into the command buffer 231 (34C6).

(a-3-2) Two parameters as parameters for reading out the command file for the i-th preserved page are set as follows (34C7).

(a-3-2-1) The value of the command buffer remaining capacity is added to the value of the read start byte position.

(a-3-2-2) The value of the command buffer remaining capacity is subtracted from the value of the capacity not yet read out.

(a-4) The value of the command buffer remaining capacity is updated to the value which is determined as a result of the process (a-2) or (a-3) (34C8).

(b) When the command buffer becomes full, the following processes are executed.

(b-1) When the drawing task processing section 26131 (drawing processing section 2331) is in the command buffer storage waiting state (34D1) by the command file read task processing section 26133 (command file reading section 239), it is released from such a waiting state (34D2).

(b-2) The command file read task processing section 26133 (command file reading section 239) is set into the command buffer blank waiting state (34D3).

Figure 35:
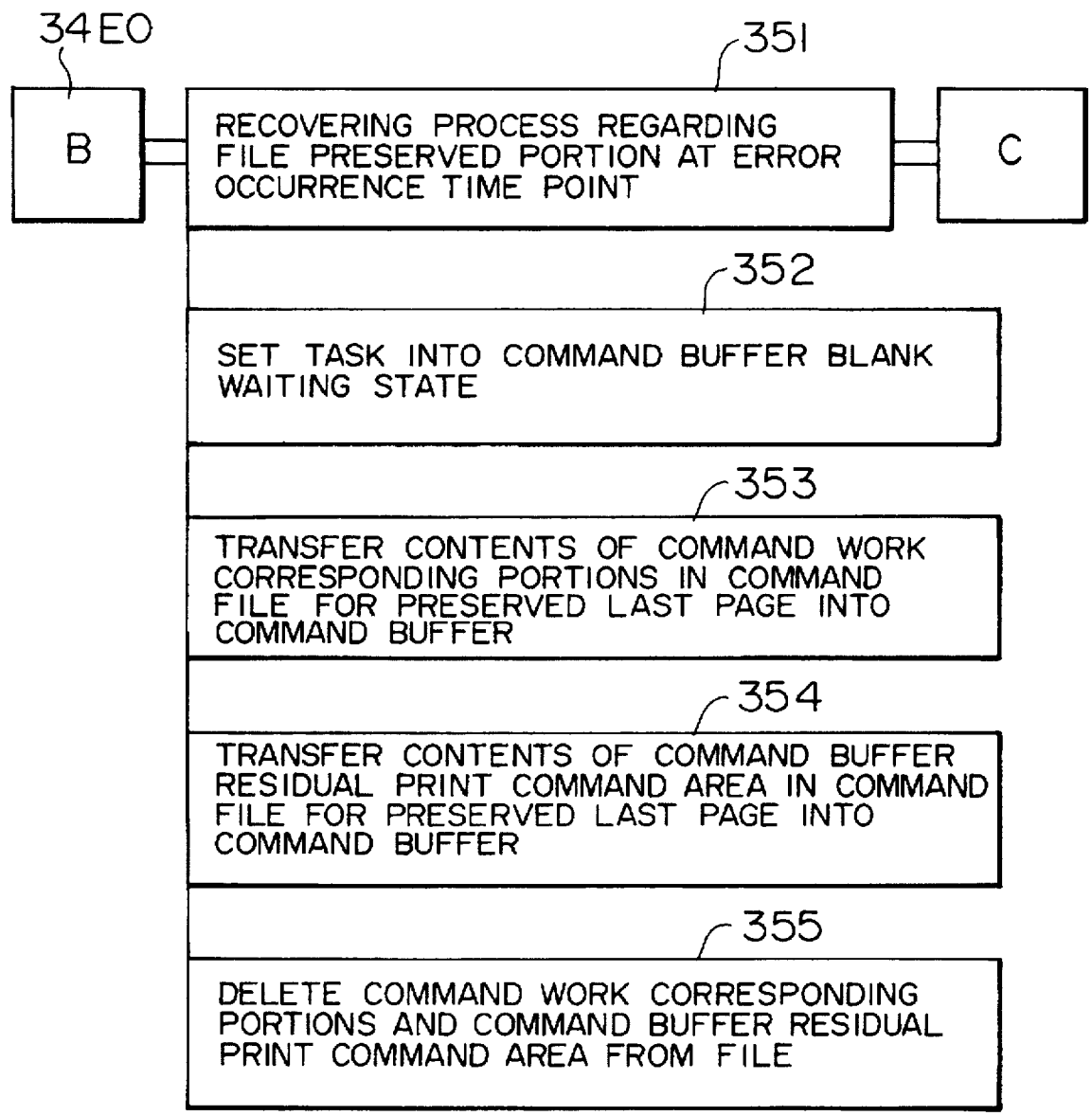

(2-2) When the file is the final command file (file 373 in FIG. 37), the process regarding the final command file (34E0) is executed as shown in FIG. 35.

(3) After the contents of all of the preserved command files were completely stored into the command buffer, the following post-processes are executed and the processes of the command file read task processing section are finished.

(a) The reprint error flag 241 is set to OFF (34F0).

(b) The print control apparatus is set into the print command receivable state (34F1).

(c) The task end is generated (34F2). The task end is also necessary in case of realizing the embodiment as a multi task configuration as mentioned above.

The process (34E0) about the final command file will now be described with reference to FIG. 35.

Figure 36:
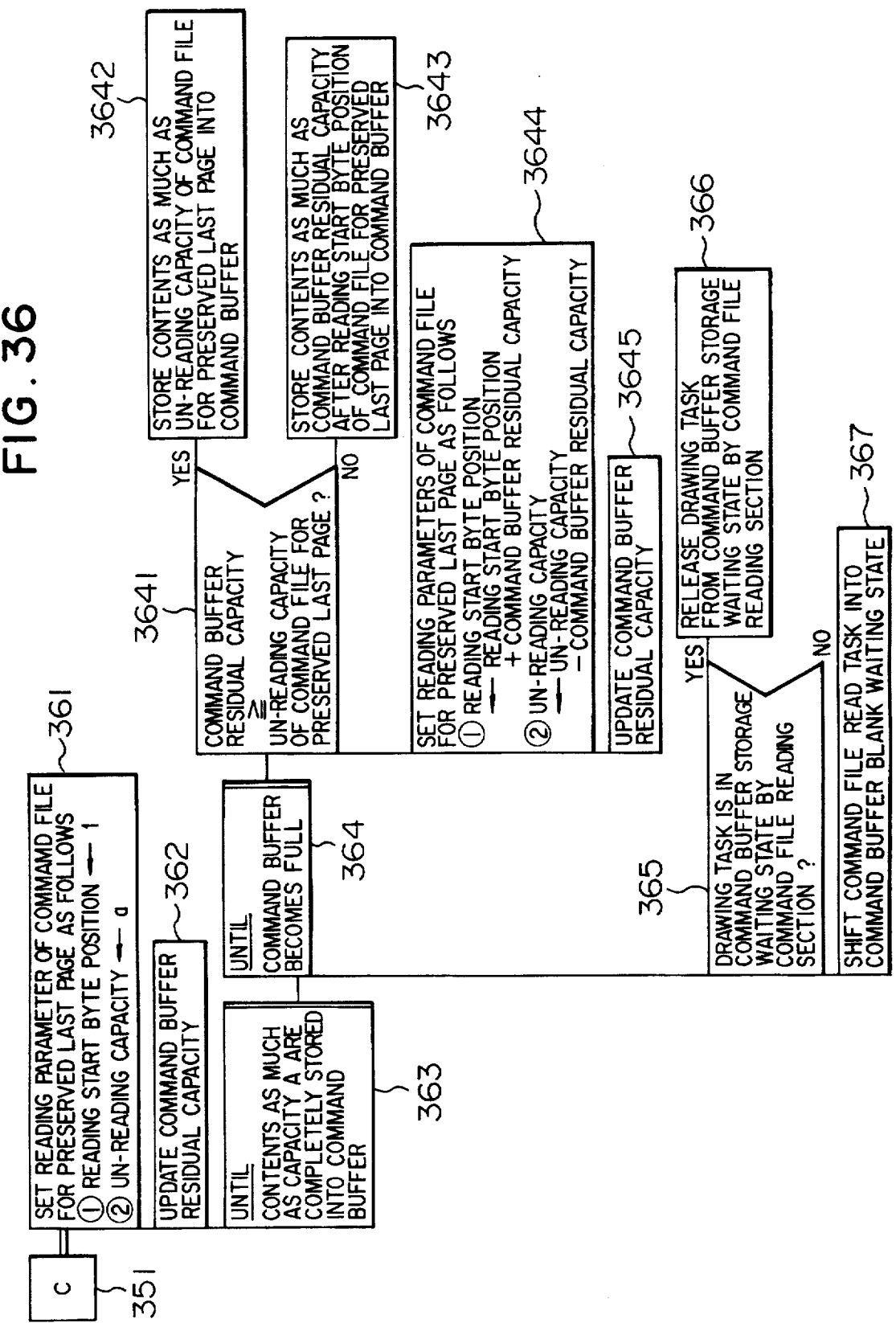

(1) First, the recovering process (351) about the portion (3731 in FIG. 37; capacity a) which has already been preserved in the file at the time point of the occurrence of the error among the command files for the preserved final page is executed in accordance with the procedure of FIG. 36.

(2) The command file read task processing section 26133 (command file reading section 239) is set into the command buffer blank waiting state (352).

(3) The command work area corresponding portion (3732 in FIG. 37; capacity b; the valid command portion in the command work which has been stored and preserved as mentioned above by the command file write task processing section 26134 by the processes in FIG. 29) in the command files for the preserved last page is transferred to the command buffer (353).

(4) The command buffer remaining print command area (3733 in FIG. 37; capacity c) among the command files for the preserved last page is transferred to the command buffer (354).

(5) The command work area corresponding portion 3732 and the portion of the command buffer remaining print command area 3733 are deleted from the command files for the preserved last page (355).

The recovering process (351) about the file preserved portion at the time point of the occurrence of the error will now be described by using FIG. 36.

(1) Two parameters as parameters to read out the command file for the preserved last page are set as follows (34A2).

(1-1) "1" is set into the read start byte position.

(1-2) The capacity not yet read out is set to the capacity a of the file preserved portion at the time point of the occurrence of the error mentioned above.

(2) The command buffer remaining capacity is updated to the current value (362).

(3) The following processes are repeated until the contents as much as the capacity a in the preserved command files are completely stored into the command buffer 231 (363).

(3-1) The following processes are repeated (364) until the command buffer 231 becomes full.

(a) A check is made to see if the command buffer remaining capacity is equal to or larger than the capacity not yet read out of the command files for the preserved last page or not (3641). If it is equal to or larger than the not-yet-read capacity, the contents as much as the not-yet-read capacity of the command files for the preserved last page are stored into the command buffer 231 (3642).

(b) When it is smaller than the not-yet-read capacity, the contents as much as the command buffer remaining capacity after the read start byte position of the command files for the preserved last page are stored into the command buffer 231 (3643).

(c) -Two parameters as parameters to read out the command files for the preserved last page are set as follows (3644).

(c-1) The value of the command buffer remaining capacity is added to the value of the read start byte position.

(c-2) The value of the command buffer remaining capacity is subtracted from the value of the not-yet-read capacity.

(d) The value of the command buffer remaining capacity is updated to the value which is determined as a result of the process 3642 or 3643 (3645).

(3-2) The following processes are executed when the command buffer 231 becomes full.

(a) When the drawing task processing section 26131 (drawing processing section 2331) is in the command buffer storage waiting state (365) by the command file read task processing section 26133 (command file reading section 239) (365), it is released from such a waiting state (366).

(b) The command file read task processing section 26133 (command file reading section 239) is set into the command buffer blank waiting state (367).

The command file read task processing section 26133 (command file reading section 239) deletes only the command buffer remaining print command area in the preserved command files. The other areas are deleted on a page unit basis by executing the processing procedure of FIG. 31 by the discharge end processing section C 23623. It is now assumed that the error which needs the reprint has again occurred during the error recovering process with respect to the pages from the preserved head page to the preserved last page using the file preservation data. In this case, the processing procedure of FIG. 32 by the abnormality processing section 237 is again activated and the processes are again similarly executed. That is, the recovering process is performed by using the file preservation data remaining at the time point of the error detection. The processing procedure of the host computer 100 is similar to that in case of FIG. 13. The hardware constructions of the print control apparatuses 2310 and 2610 are also similar to those in case of FIG. 14.

In the embodiment, the command buffer capacity can be reduced (the apparatus can operate even at most one byte) and there is no need to prepare the special command buffers of the number only for the error recovery as many as the maximum holding number as in the first prior art, so that the C/P (costs to performance) ratio of the print control apparatus can be raised. On the other hand, since the drawing attribute parameters at the start of the drawing of each page have been preserved in the attribute parameter file for each page, even for the command of the type such that the drawing attribute parameters are handed over between the pages, the print result doesn't differ from the inherent print upon error recovery and the reliability and use efficiency of the print control apparatus can be improved. In addition, the increase in processing burden of the host computer and the modification of the program in the second prior art can be also eliminated. Further, since the command read skipping process in the third prior art can be eliminated, an increase in development program amount of the print control apparatus can be eliminated. By commonly using a plurality of kinds of error recovering modes, the error recovering function of the high performance and high reliability can be also provided to the user in accordance with the hardware construction of the print control apparatus and its use situation, particularly, the use situation of the secondary memory device.

The fourth embodiment of the invention will now be described. The fourth embodiment is obtained by devising the preserving method of the registration data for error recovery in the foregoing third embodiment. The registration data denotes fonts/external characters, formats, a painting pattern, a line type pattern, etc., which are used in the drawing process by the print control apparatus and is a kind of drawing attribute parameters mentioned above. However, an amount of registration data is large. In the third embodiment, the registration data is also preserved similar to the other drawing attribute parameters and used for error recovery. That is, the registration data is individually preserved every page. In the embodiment, the registration data can be commonly preserved with respect to a plurality of pages, thereby reducing the file capacity which is required for preservation. In particular, with regard to the fonts/external characters, a plurality of sets (maximum L sets) of them can be registered every page. The other registration data is preserved into one file in a lump with respect to each page every kind such as a format, a painting pattern, a line type pattern, or the like.

Figure 40:
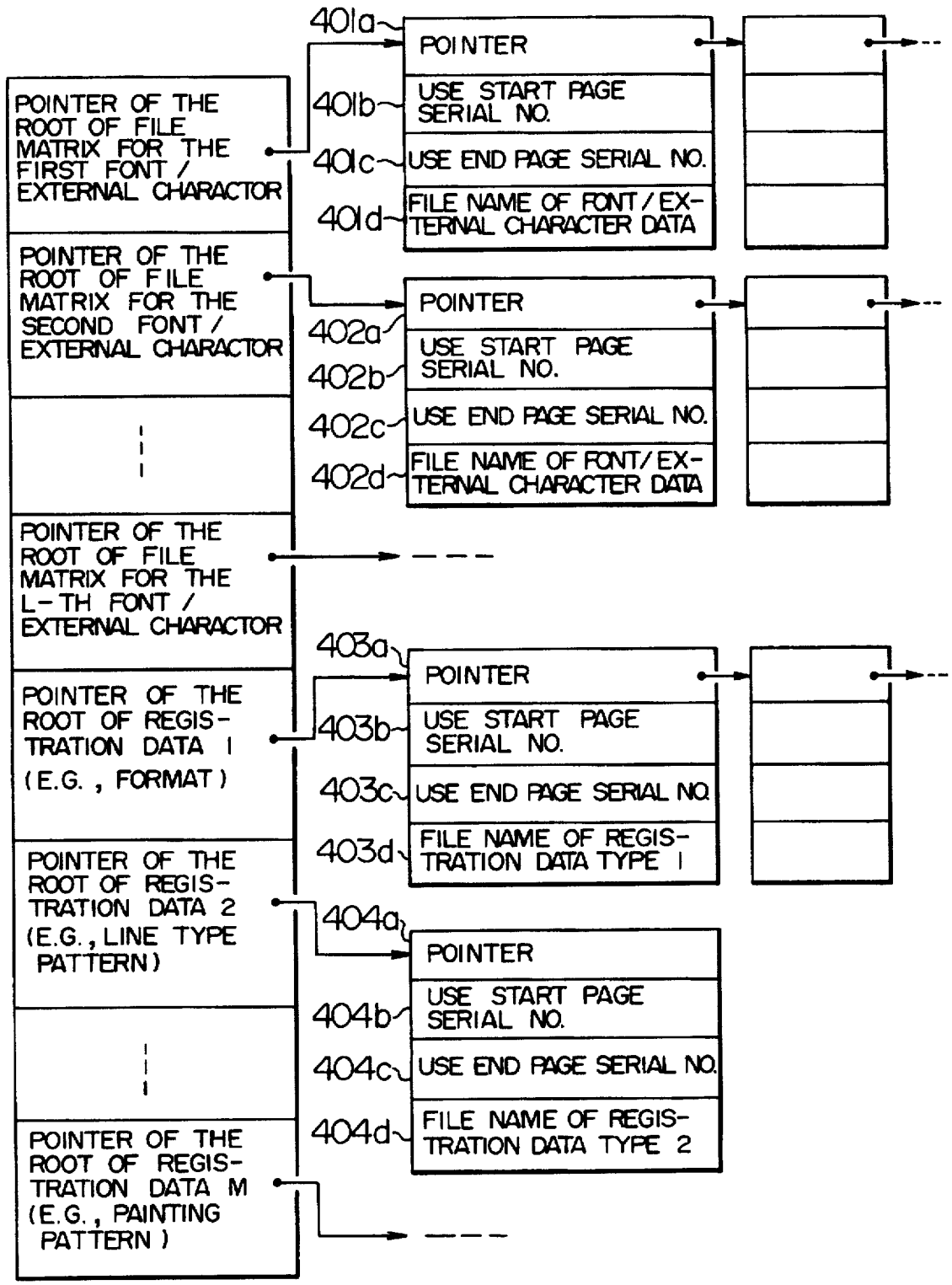
FIGS. 40 and 41 are diagrams for explaining the fourth embodiment of the invention.
Figure 41:
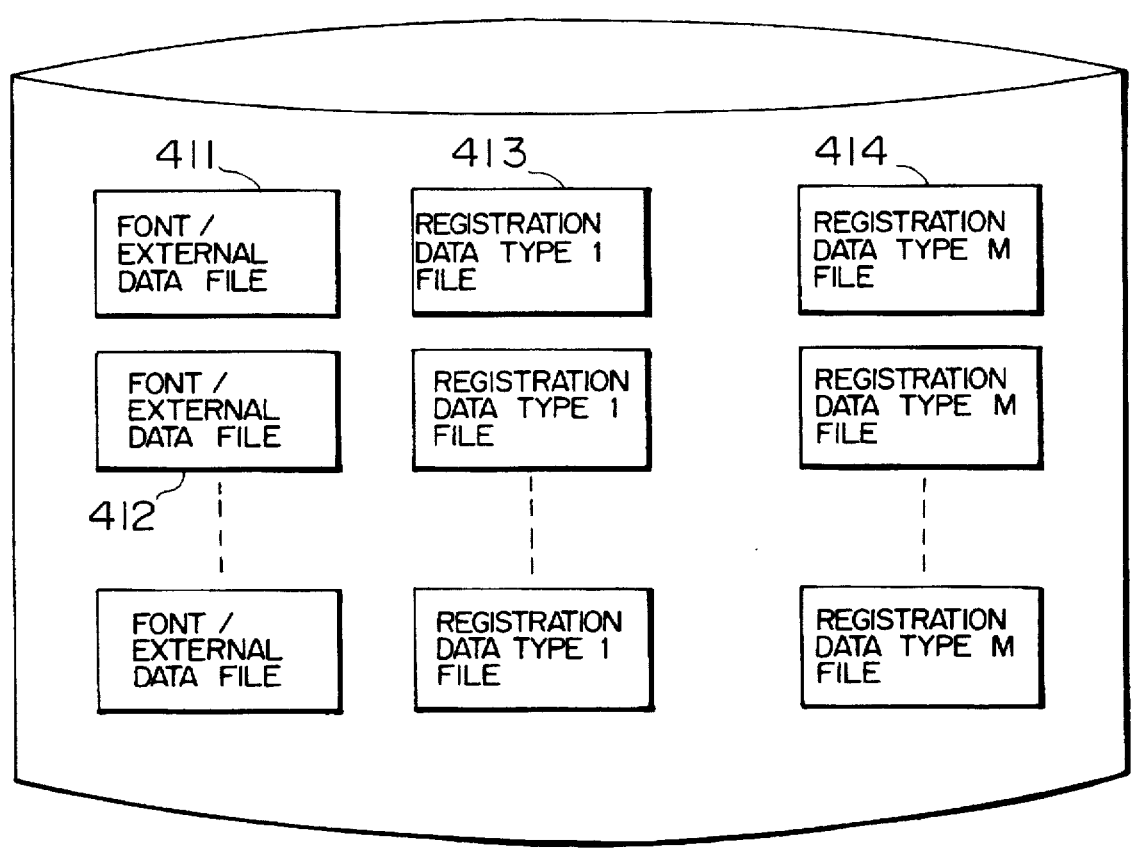

To realize the above construction, a registration data preservation management table shown in FIG. 40 is provided and the registration data is preserved and stored as shown in FIG. 41 while using such a table. For instance, the format data of one page is stored into a file 413 corresponding to a file name 403$d$ and is commonly used between a serial number 403$b$ of the page whose use is started and a serial number 403$c$ of the page whose use has been finished. With respect to the fonts/external characters as well, the first font/external character data file is similarly stored into a file 411 corresponding to a file name 401$d$ and commonly used between a use start page serial number 401$b$ and a use end page serial number 401$c$. With respect to the fonts/external characters, the second font/external character data file is further stored in a file 412 corresponding to a file name 402$d$ and commonly used between a use start page serial number 402$b$ and a use end page serial number 402$c$. In this manner, the maximum L sets of fonts/external characters can be preserved with respect to one page.

According to the embodiment, since the registration data such as fonts/external characters, formats, and the like are commonly used and preserved with respect to a plurality of pages, the file capacity for preservation can be reduced as compared with that of the third embodiment. Therefore, the print control apparatus of a high cost performance can be realized.

In the above embodiments, by using either one of the following methods, the print control apparatus can be also realized as one function of the host computer.

(1) The print control apparatus is realized as one print control adapter in the host computer or a print control board and the error recovering function as mentioned above is installed to the adapter or board.

(2) The print control apparatus is realized as a software process by a main processor of the host computer. In this instance, the error recovering function as mentioned above is installed in the software process.

What is claimed is:

1. A print control apparatus for receiving a print command train from a host computer and for performing a print control to a printer engine, in which said print command train has at least drawing commands which are arranged in accordance with the order of print pages and indicate drawing information such as characters, figures, images, or the like, and attribute parameter setting commands which are arranged at arbitrary positions and indicate a format or the like to draw said drawing information regarding the drawing commands after said arbitrary positions as image data, comprising:

a communication control section to receive said print command train;

a command buffer to store the received print command train;

a drawing processing section for sequentially reading out the print command train from the command buffer and executing a drawing process of drawing dot image data in accordance with the print command train in a normal state and for again sequentially reading out the print command train after a page which is not yet discharged at a time point of the occurrence of an abnormality and executing the drawing process in accordance with the print command train in a state in which the abnormality occurs;

a page buffer to store the dot image data drawn by said drawing processing section;

a print processing section to instruct a printer control section to print with respect to the dot image data stored in said page buffer;

a printer control section for reading out the dot image data from the page buffer and executing the print control to the printer engine in accordance with an instruction from said print processing section;

an abnormality processing section for monitoring an abnormality of the printer engine and for activating a reprinting process of the drawing processing section in the case where an abnormality which needs a reprint has occurred; and an attribute parameter table to store at least current attribute parameters set in accordance with the print command train read out by the drawing processing section until all of the pages regarding said attribute parameters are discharged;

wherein said drawing processing section executes the drawing process by the attribute parameters of the page whose drawing process is again performed which have been stored in said attribute parameter table when the abnormality which needs the reprint occurs.

2. An apparatus according to claim 1, wherein the attribute parameters which are stored into said attribute parameter table are stored in correspondence to memory positions of every page of the print command train in the command buffer.

3. An apparatus according to claim 1, wherein said attribute parameter table is made of a series of command blocks each of which includes:

a pointer to the next command block;

a command page end pointer preserving section indicative of the end of paper discharge waiting page of the command buffer section; and an attribute parameter table preserving section to preserve the attribute parameters at such a time point.

4. An apparatus according to claim 1, wherein processes by said drawing processing section and said print processing section have a multi task construction and are executed in a concurrent or parallel manner.

5. An apparatus according to claim 1, wherein the start of said reprinting process at the time of detection of the error is performed in accordance with an instruction from the host computer.

6. An apparatus according to claim 1, further comprising:
a secondary memory device for storing the print command train received from said command buffer as a plurality of command files such that the print commands of each page are described;
- a command file preservation control section to control the writing and reading operations of the command files; and
- a command file management table to manage the memory positions in said secondary memory device of the command files,
- wherein when said abnormality processing section activates the reprinting process of said drawing processing section, said command file preservation control section reads out the command files of the page which needs the reprint from the secondary memory device to the command buffer by recognizing the memory positions by said command file management table section, and said drawing processing section executes the drawing process to reprint by the print command train newly stored in the command buffer.

7. An apparatus according to claim 6, wherein said command file preservation control section further stores the attribute parameters at the time of the start of the drawing of each page as an attribute parameter file into the secondary memory device.

8. An apparatus according to claim 7, wherein said command file management table section describes command file names and attribute parameter file names with respect to each page as a queue in accordance with the receiving and printing order of the pages.

9. A print control apparatus for receiving a print command train from a host computer and for performing a print control to a printer engine, in which said print command train has at least drawing commands which are arranged in accordance with the order of print pages and indicate drawing information such as characters, figures, images, or the like, and attribute parameter setting commands which are arranged at arbitrary positions and indicate a format or the like to draw said drawing information regarding the drawing commands after said arbitrary positions as image data, comprising:
- a communication control section to receive said print command train;
- a command buffer to store the received print command train;
- a drawing processing section for sequentially reading out the print command train from the command buffer and executing a drawing process of drawing dot image data in accordance with the print command train in a normal state and for again sequentially reading out the print command train after a page which is not yet discharged at a time point of the occurrence of an abnormality and executing the drawing process in accordance with the print command train in a state in which the abnormality occurs;
- a page buffer to store the dot image data drawn by said drawing processing section;
- a print processing section to instruct a printer control section to print with respect to the dot image data stored in said page buffer;
- a printer control section for reading out the dot image data from the page buffer and executing the print control to the printer engine in accordance with an instruction from said print processing section;
- an abnormality processing section for monitoring an abnormality of the printer engine and for activating a reprinting process of the drawing processing section in the case where an abnormality which needs a reprint has occurred; and
- an attribute parameter table to store at least attribute parameters set in accordance with the print command train read out by the drawing processing section until all of the pages regarding said attribute parameters are discharged;
- wherein said drawing processing section executes the drawing process by the attribute parameters of the page whose drawing process is again performed which have been stored in said attribute parameter table when the abnormality which needs the reprint occurs;

the apparatus further comprising:
- a secondary memory device for storing the print command train received from said command buffer as a plurality of command files such that the print commands of each page are described;
- a command file preservation control section to control the writing and reading operations of the command files; and
- a command file management table to manage the memory positions in said secondary memory device of the command files;
- wherein when said abnormality processing section activates the reprinting process of said drawing processing section, said command file preservation control section reads out the command files of the page which needs the reprint from the secondary memory device to the command buffer by recognizing the memory positions by said command file management table section, and said drawing processing section executes the drawing process to reprint by the print command train newly stored in the command buffer; and
- wherein an error recovering function which doesn't use said secondary memory device and an error recovering function which uses the secondary memory device are switched in accordance with the print command received from said host computer or a user's input from an operation panel in the print control apparatus.

10. A print control apparatus for receiving a print command train from a host computer and executing a print control to a printer engine, in which said print command train indicates at least drawing information of characters, figures, images, or the like, and attribute parameter setting information indicative of a format to draw said drawing information as image data, comprising:
- a communication control section to receive said print command train;
- a command buffer to store the received print command train;
- a drawing processing section for sequentially reading out said print command train from said command buffer and executing a drawing process of drawing dot image data of every page in accordance with the print command train;
- a page buffer for storing the dot image data drawn by said drawing processing section until printing of a current page is finished;
- a print processing section to instruct a printer control section to print with respect to the dot image data stored in said page buffer;
- a printer control section for reading out the dot image data from said page buffer and executing a print control to said printer engine in accordance with an instruction from said print processing section;

an abnormality processing section for monitoring an abnormality of the printer engine and for activating a reprinting process of the printer control section in the case where an abnormality which needs a reprint has occurred; and a page buffer number preserving section to preserve page buffer numbers indicative of memory positions in said page buffer of a paper discharge waiting page;

wherein when the abnormality which needs the reprint occurs, said printer control section reads out the dot image data of the page in which the abnormality has occurred based on the page buffer number of the page in which the abnormality has occurred which has been preserved in said page buffer number preserving section and executes the print control of the print engine.

11. An apparatus according to claim 10, wherein said page buffer number preserving section is made of a series of command blocks each of which includes:

a pointer to the next command block;

a page buffer number; and a print task number of the printer control section.

12. An apparatus according to claim 10, wherein the processes by said drawing processing section and said print processing section are set into a multi task construction and are executed in a concurrent or parallel manner.

13. An apparatus according to claim 10, wherein the start of the reprinting process at the time of the error detection is performed in accordance with an instruction from a host computer.

14. A print control method for a printing apparatus in which a print command train is received by a communication control section and is temporarily stored into a command buffer and a drawing process and a print control are executed to a printer engine by the print command train in said command buffer, and said print command train has at least drawing commands which are arranged in accordance with the order of print pages and indicate drawing information such as characters, figures, images, or the like, and attribute parameter setting commands which are arranged at arbitrary positions and indicate a format or the like to draw said drawing information regarding said drawing commands after said arbitrary positions as image data, wherein said method comprises:

a first step of receiving said print command train by said communication control section;

a second step of storing the received print command train into the command buffer;

a third step of sequentially reading out the print command train from the command buffer and interpreting the commands;

a fourth step of storing attribute parameters obtained by the command interpretation of said attribute parameter setting commands in said third step in correspondence to memory positions in said command buffer of the print commands to which said attribute parameters belong;

a fifth step of executing a drawing process of drawing image data in accordance with the command interpretation in said third step;

a sixth step of executing a print control to said printer engine in accordance with the image data which has been drawing-processed in said fifth step;

a seventh step of monitoring an abnormality in said sixth step, and when an abnormality which needs a reprint occurs, sequentially reading out the print command train from the command buffer and interpreting the commands, with respect to a page which needs a reprint, and retrieving the attribute parameters stored in said fourth step in correspondence to the print commands of the page which needs a reprint;

an eighth step of again executing the drawing process of drawing image data in accordance with the command interpretation and the retrieved attribute parameters in said seventh step; and a ninth step of again printing in accordance with the image data which has been drawing-processed in said eighth step.

15. A method according to claim 14, wherein the storage of the attribute parameters in said sixth step is executed in correspondence to the memory positions of every page of the print command train in said command buffer.

16. A method according to claim 15, wherein the processes in the seventh to ninth steps are executed in accordance with instructions from the host computer which transmits said print command train.

17. A print control method for a printing apparatus in which a print command train is received by a communication control section, said print command train indicates drawing information such as characters, figures, images, or the like, and attribute parameter setting information indicative of a format or the like to draw said drawing information as image data, a drawing process of drawing image data is executed by said print command train, the image data obtained by said drawing process is temporarily stored into a page buffer, and a print control of the image data of said page buffer is performed to a printer engine, wherein said method comprises:

a first step of receiving the print command train from a host computer by said communication control section;

a second step of storing the received print command train into a command buffer;

a third step of sequentially reading out the print command train from the command buffer and interpreting the commands;

a fourth step of executing a drawing process of drawing image data of every page in accordance with the command interpretation in said third step;

a fifth step of temporarily storing the image data which has been drawing-processed in said fourth step into the page buffer and preserving memory positions of the image data of every page in said page buffer;

a sixth step of reading out the image data stored in said fifth step and executing the print control to said printer engine;

a seventh step of monitoring an abnormality in said sixth step and, when an abnormality which needs a reprint occurs, again reading out the image data of a page which needs a reprint from the page buffer by said preserved memory positions and again executing the print control to said printer engine; and an eighth step of confirming the end of printing of a relevant page in said sixth or seventh step and, thereafter, erasing or updating the image data at the memory positions of the relevant page in said page buffer.

18. A method according to claim 17, wherein the process in said seventh step is executed in accordance with an instruction from the host computer to transmit said print command train.

19. An apparatus according to claim 6, wherein when the abnormality processing section activates the reprinting process of the drawing processing section and an amount of data in the command files stored in the secondary memory device exceeds a predetermined amount of data, the reprinting process is performed in a command buffer preservation error recovering mode or a page buffer preservation error recovering mode until the amount of data in the command files stored in the secondary memory device no longer exceed the predetermined amount of data, and is then performed in a command file preservation error recovering mode by the command file preservation control section.

20. An apparatus according to claim 1, further comprising a secondary memory device for storing the dot image data drawn by the drawing processing section for a plurality of pages.

21. An apparatus according to claim 1, wherein the attribute parameters include registration data; and wherein the attribute parameter table stores at least some of the registration data commonly with respect to a plurality of pages.

* * * * *